US008000548B2

(12) United States Patent
Fukuhara et al.

(10) Patent No.: US 8,000,548 B2
(45) Date of Patent: Aug. 16, 2011

(54) WAVELET TRANSFORMATION DEVICE AND METHOD, WAVELET INVERSE TRANSFORMATION DEVICE AND METHOD, PROGRAM, AND RECORDING MEDIUM FOR PERFORMING WAVELET TRANSFORMATION AT A PLURALITY OF DIVISION LEVELS

(75) Inventors: Takahiro Fukuhara, Kanagawa (JP);
Katsutoshi Ando, Kanagawa (JP);
Naoto Nishimura, Kanagawa (JP);
Yuuki Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 1058 days.

(21) Appl. No.: 11/760,951

(22) Filed: Jun. 11, 2007

(65) Prior Publication Data
US 2008/0013845 A1    Jan. 17, 2008

(30) Foreign Application Priority Data
Jul. 14, 2006 (JP) ................................. 2006-193669

(51) Int. Cl.
*G06K 9/46* (2006.01)
(52) U.S. Cl. ........ 382/248; 382/232; 382/234; 382/240; 382/276; 375/240; 375/240.11; 375/240.18; 375/240.19
(58) Field of Classification Search .................. None
See application file for complete search history.

(56) References Cited

U.S. PATENT DOCUMENTS

| 5,384,869 A | * | 1/1995 | Wilkinson et al. | 382/240 |
| 5,550,597 A | * | 8/1996 | Wada et al. | 348/708 |
| 5,610,775 A | * | 3/1997 | Wilkinson et al. | 360/24 |
| 5,748,786 A | * | 5/1998 | Zandi et al. | 382/240 |
| 5,838,377 A | * | 11/1998 | Greene | 375/240.11 |
| 5,984,514 A | * | 11/1999 | Greene et al. | 708/203 |
| 6,222,941 B1 | * | 4/2001 | Zandi et al. | 382/232 |
| 6,738,523 B1 | * | 5/2004 | Small et al. | 382/240 |
| 6,891,895 B1 | * | 5/2005 | Onno et al. | 375/260 |
| 6,978,048 B1 | * | 12/2005 | Higginbottom et al. | 382/240 |
| 2004/0021587 A1 | * | 2/2004 | Hashirano | 341/50 |

FOREIGN PATENT DOCUMENTS

| JP | 10-283342 | 10/1998 |
| JP | 2001-197498 | 7/2001 |
| JP | 2001-231042 | 8/2001 |
| JP | 2002-515699 | 5/2002 |

OTHER PUBLICATIONS

Wim Sweldens, "The Lifting Scheme: A Custom-Design Construction of Biorthogonal Wavelets," Applied and Computational Harmonic Analysis, vol. 3, No. 2, Article No. 15, 1996, pp. 186-200.
Christos Chrysafis, et al., "Line Based, Reduced Memory, Wavelet Image Compression," IEEE Transactions on Image Processing, vol. 9, No. 3, Mar. 2000, pp. 378-389.
U.S. Appl. No. 11/767,743, filed Jun. 25, 2007, Fukuhara, et al.

* cited by examiner

*Primary Examiner* — Sath V Perungavoor
*Assistant Examiner* — Jason Heidemann
(74) *Attorney, Agent, or Firm* — Oblon, Spivak, McClelland, Maier & Neustadt, L.L.P.

(57) ABSTRACT

A wavelet transformation device for performing wavelet transformation at a plurality of division levels as to image signals. A horizontal filtering unit subjects the image signals to horizontal direction lowband analysis filtering and highband analysis filtering. Buffers which are independent for each of the division levels, hold frequency components, which are generated as the results of the horizontal direction analysis filtering by the horizontal filtering unit, for each of the division levels. Interleaving devices comprising at least one interleaving unit interleaving brightness components and color difference components of the image signals and interleaving highband components and lowband components of buffered filter results.

26 Claims, 30 Drawing Sheets

FIG. 6
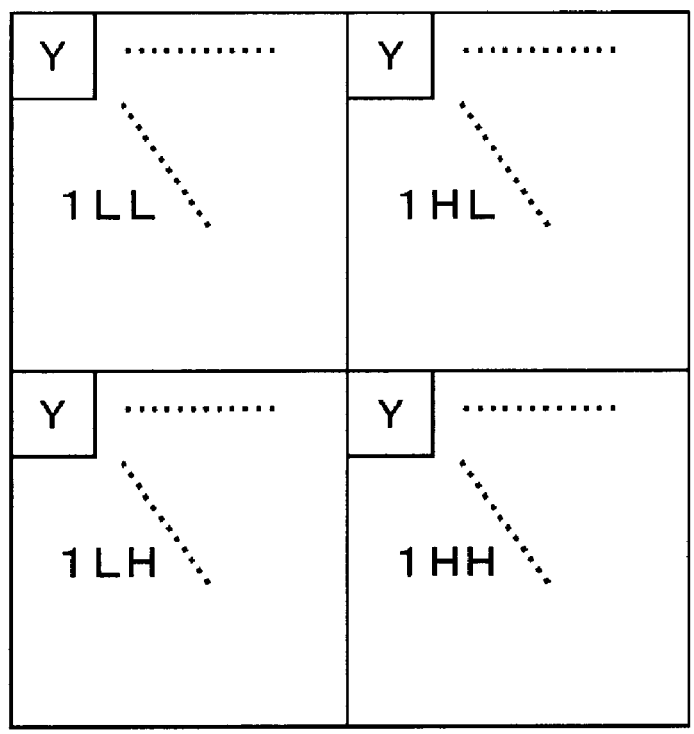
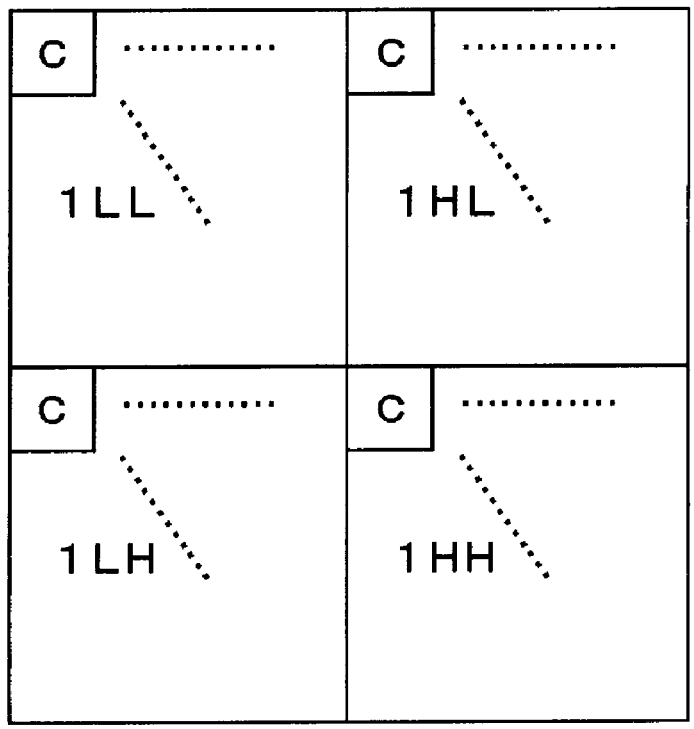

FIG. 30
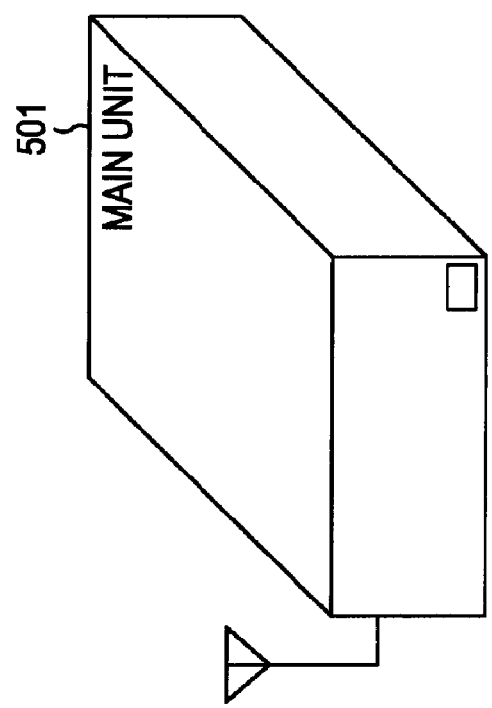
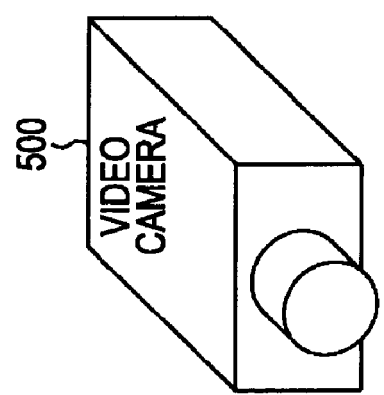

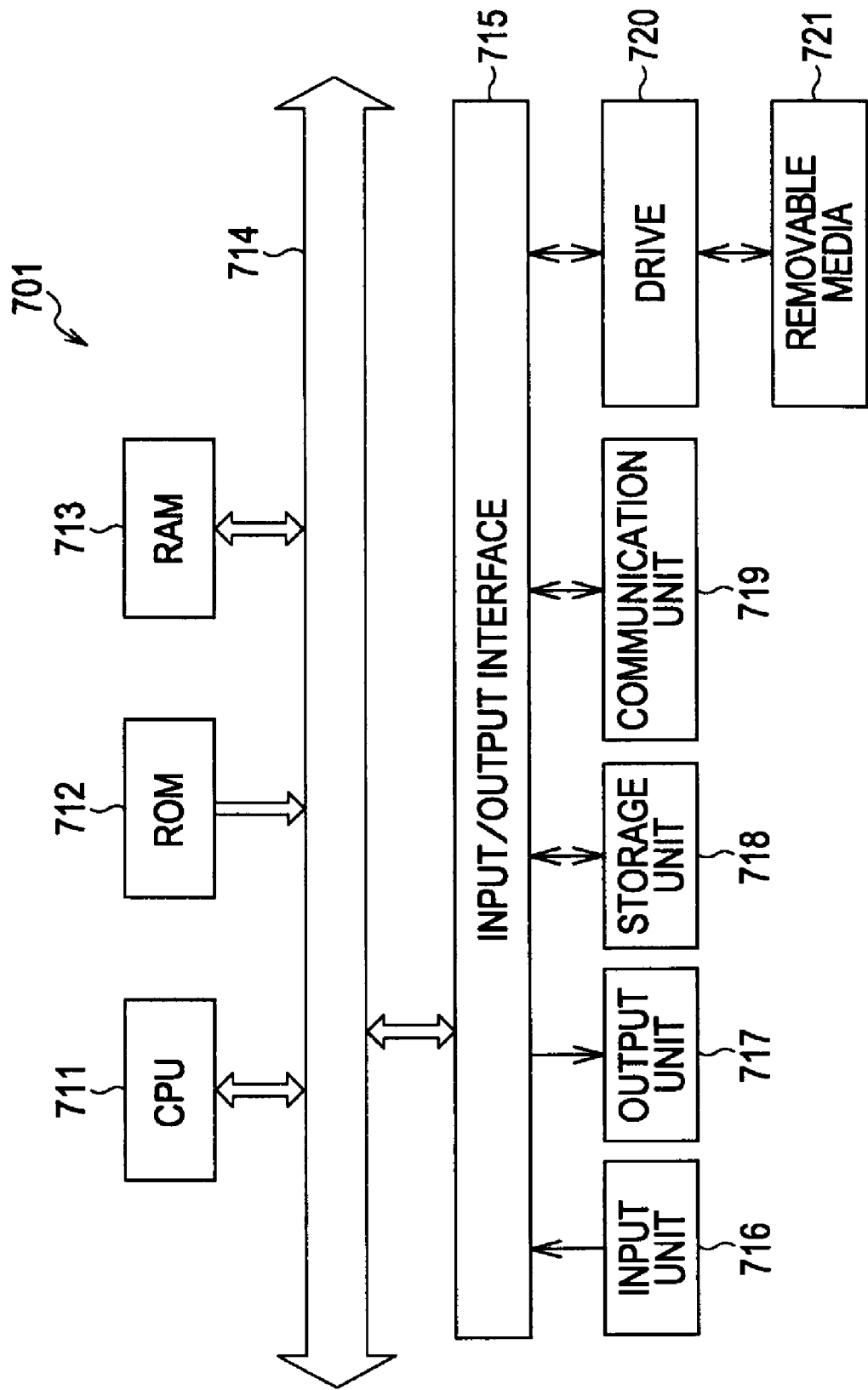

WAVELET TRANSFORMATION DEVICE AND METHOD, WAVELET INVERSE TRANSFORMATION DEVICE AND METHOD, PROGRAM, AND RECORDING MEDIUM FOR PERFORMING WAVELET TRANSFORMATION AT A PLURALITY OF DIVISION LEVELS

CROSS REFERENCES TO RELATED APPLICATIONS

The present invention contains subject matter related to Japanese Patent Application No. 2006-193669 filed in the Japanese Patent Office on Jul. 14, 2006, the entire contents of which are incorporated herein by reference.

BACKGROUND OF THE INVENTION

1. Field of the Invention

The present invention relates to a wavelet transformation device and method, a wavelet inverse transformation device and method, a program, and a recording medium, and more particularly relates to a wavelet transformation device and method, a wavelet inverse transformation device and method, a program, and a recording medium, enabling high-speed wavelet transformation to be performed by exchanging data with internal memory.

2. Description of the Related Art

An image compression method representative of known methods is the JPEG (Joint Photographic Experts Group) method that has been standardized by the ISO (International Standards Organization). This is known to provide excellent coded images and decoded images in the event that DCT (Discrete Cosine Transform) is used and a relatively great number of bits are appropriated. However, reducing coding bits beyond a certain level results in marked block distortion characteristic of DCT, and deterioration can be subjectively observed.

On the other hand, in recent years, there has been much research performed on a method wherein images are divided into multiple bands (sub-bands) with filters called filter banks, wherein high-pass filters and low-pass filters are combined, and coding is performed for each band. Particularly, wavelet transformation coding is viewed as a new technology which is a likely candidate to replace DCT, since it does not have the problem that DCT has, i.e., marked block distortion at high compression rates.

International standardization of JPEG 2000 was completed January 2001. JPEG 2000 combines wavelet transformation and high-efficiency entropy coding (bit-plane based bit modeling and arithmetic encoding), and realizes marked improvements over JPEG with regard to coding efficiency.

Wavelet transformation uses a technique wherein, basically, image data is taken as input which is subjected to horizontal direction filtering and vertical direction filtering, in which lowband components are hierarchically divided. At this time, reading and writing of data to and from memory, such as readout of image data, writing of frequency coefficients generated as the result of filtering, readout of frequency coefficients once more, and so forth, need to be performed at a high frequency.

There has been recognized the need for a technique by which to perform wavelet transformation at high speeds, since image signals have a great amount of data. Also, a great number of techniques for externally writing frequency coefficients to memory and reading these in again have been proposed (See Japanese Unexamined Patent Application Publication No. 10-283342).

SUMMARY OF THE INVENTION

However, techniques wherein frequency coefficients are written out to external memory and read in again have the problem than sufficient bandwidth cannot be obtained since data is exchanged between the external memory an wavelet transformation unit, so it has been difficult to perform wavelet transformation at high speeds.

Also, raising the clock (operating frequency) is effective in increasing the speed of data between the external memory and wavelet transformation unit, but simple increasing of the clock not only results in the problem of increased power consumption; this is not readily handled by hardware such as FPGA (Field Programmable Gate Array) and PLD (Programmable Logic Device).

It has been recognized that there is a need to enable high-speed wavelet transformation without requiring external memory.

A wavelet transformation device according to an embodiment of the present invention, for performing wavelet transformation at a plurality of levels as to image signals, comprises: a horizontal filtering unit for subjecting the image signals to horizontal direction lowband analysis filtering and highband analysis filtering; and buffers which are independent for each of the levels, for holding frequency components, which are generated as the results of the horizontal direction analysis filtering by the horizontal filtering unit, for each of the levels.

The lowband components and highband components in the frequency components obtained as the results of the horizontal direction analysis filtering may be reordered and held in the buffer.

The wavelet transformation device may further comprise a reordering unit for performing reordering of brightness signals and color difference signals, which are elements of the image signals; with the horizontal filtering unit subjecting the image signals reordered by the reordering unit to horizontal direction lowband analysis filtering and highband analysis filtering.

The frequency components of the brightness signals and the frequency components of the color difference signals generated as a result of the horizontal analysis filtering performed by the horizontal filtering unit may each be held separately in the buffers.

The wavelet transformation device may further comprise: a vertical filtering unit for subjecting the frequency components, generated as a result of the horizontal direction analysis filtering, that are held in the buffers, to vertical direction lowband analysis filtering and highband analysis filtering.

The vertical filtering unit may further comprise: a brightness signal vertical filtering unit for subjecting frequency components of brightness signals, which are elements of the image signals, to vertical direction lowband analysis filtering and highband analysis filtering; and a color difference signal vertical filtering unit for subjecting frequency components of color difference signals, which are elements of the image signals, to vertical direction lowband analysis filtering and highband analysis filtering.

The brightness signal vertical filtering unit and the color difference signal vertical filtering unit may be operated in parallel.

The wavelet transformation device may further comprise: a reordering unit for performing reordering of the lowband components of the frequency components of the brightness signals generated as a result of the vertical direction analysis filtering performed by the brightness signal vertical filtering unit, and the frequency components of the color difference signals generated as a result of the vertical direction analysis filtering performed by the color difference signal vertical filtering unit; with the horizontal filtering unit subjecting the lowband components reordered by the reordering unit to horizontal direction lowband analysis filtering and highband analysis filtering.

Prior to reordering by the reordering unit, one of the brightness signal vertical filtering unit and the color difference signal vertical filtering unit may stand by until the analysis filtering of the other ends.

The horizontal filtering unit may perform the horizontal direction lowband analysis filtering and highband analysis filtering to a predetermined number of levels.

The frequency components of the brightness signals and the frequency components of the color difference signals generated as a result of the horizontal direction analysis filtering performed by the horizontal filtering unit may be separately held in the buffers.

The horizontal filtering unit and the vertical filtering unit may perform analysis filtering on the lowest band frequency components in a hierarchical manner.

The horizontal filtering unit and the vertical filtering unit may be realized by a lifting scheme of the wavelet transformation.

The horizontal filtering unit may input the image signals in increments of lines, and perform the horizontal direction lowband analysis filtering and highband analysis filtering each time the number of samples in the horizontal direction reaches a predetermined number; with the vertical filtering unit performing the vertical direction lowband analysis filtering and highband analysis filtering each time the number of lines in the vertical direction of the frequency component in the results of the horizontal direction analysis filtering performed by the horizontal filtering unit reach a predetermined number.

The image signals may be video signals comprising a plurality of pictures, with the wavelet transformation device further comprising a detecting unit for detecting the end of each picture by detecting vertical synchronization signals of the video signals, and the horizontal filtering unit and the vertical filtering unit performing analysis filtering for each picture.

According to an embodiment of the present invention, a wavelet transformation method of a wavelet transformation device for performing wavelet transformation at a plurality of levels as to image signals, comprises the steps of: subjecting the image signals to horizontal direction lowband analysis filtering and highband analysis filtering; and holding frequency components, which are generated as the results of the horizontal direction analysis filtering, for each of the levels, in buffers which are independent for each of the levels.

With the above configuration, image signals are subjected to horizontal direction lowband analysis filtering and highband analysis filtering. Frequency components, which are generated as the results of the horizontal direction analysis filtering, are held for each of the levels, in buffers which are independent for each of the levels. Thus, high speed wavelet transformation can be performed without requiring external memory.

According to an embodiment of the present invention, a wavelet inverse transformation device for performing wavelet inverse transformation as to frequency components, generated by a plurality of levels of wavelet transformations having been performed as to image signals, thereby reconstructing an image, comprises: horizontal filtering unit for subjecting the frequency components to horizontal direction lowband synthesizing filtering and highband synthesizing filtering; and buffers which are independent for each of the levels except for the lowest band, for holding frequency components, which are generated as the results of the horizontal direction synthesizing filtering by the horizontal filtering unit, for each of the levels.

The wavelet inverse transformation device may further comprise: a vertical filtering unit for subjecting the frequency components to vertical direction lowband analysis filtering and highband analysis filtering; with the horizontal filtering unit subjecting the frequency components generated as a result of the vertical direction synthesizing filtering to the horizontal direction lowband synthesizing filtering and highband synthesizing filtering.

The vertical filtering unit and the horizontal filtering unit may be realized by a lifting scheme of the wavelet inverse transformation.

The horizontal filtering unit may input the frequency components in increments of lines, and perform the horizontal direction lowband synthesizing filtering and highband synthesizing filtering each time the number of samples in the horizontal direction reaches a predetermined number; with the vertical filtering unit performing the vertical direction lowband synthesizing filtering and highband synthesizing filtering each time the number of lines in the vertical direction of the frequency component in the results of the horizontal direction synthesizing filtering performed by the horizontal filtering unit reach a predetermined number.

The image signals may be video signals comprising a plurality of pictures, divided into a plurality of frequency components by performing analysis filtering on the lowest band frequency components in a hierarchical manner; with the vertical filtering unit and the horizontal filtering unit perform synthesizing filtering in a hierarchical manner from, of a plurality of frequency components, a predetermined number of frequency components including the lowest band frequency components, ultimately generating a picture.

The wavelet inverse transformation device may further comprise a vertical synchronizing signal insertion unit for inserting vertical synchronizing signals between the pictures generated by the vertical filtering unit and the horizontal filtering unit, thereby generating video signals.

The vertical filtering unit, the horizontal filtering unit, and the buffers, may be provided separately for brightness signals and for color difference signals, which are elements of the image signals; with the vertical filtering unit, the horizontal filtering unit, and the buffers, for brightness signals, and the vertical filtering unit, the horizontal filtering unit, and the buffers, for color difference signals, being operated in parallel.

According to an embodiment of the present invention, a wavelet inverse transformation method for performing wavelet inverse transformation as to frequency components generated by a plurality of levels of wavelet transformations being performed as to image signals, thereby reconstructing an image, comprises the steps of: subjecting the frequency components to horizontal direction lowband synthesizing filtering and highband synthesizing filtering; and holding frequency components, which are generated as the results of the horizontal direction synthesizing filtering by the horizontal filtering unit, for each of the levels, in buffers which are independent for each of the levels except for the lowest band.

With the above configuration, frequency components generated by a plurality of levels of wavelet transformations being performed as to image signals are subjected to horizontal direction lowband synthesizing filtering and highband synthesizing filtering. The frequency components, which are generated as the results of the horizontal direction synthesizing filtering by the horizontal filtering unit, are held for each of the levels, in buffers which are independent for each of the levels except for the lowest band. Thus, high speed wavelet inverse transformation can be performed without requiring external memory.

BRIEF DESCRIPTION OF THE DRAWINGS

FIG. 6 is a diagram illustrating the results of performing analysis filtering to division level 1, for Y and C separately.

FIG. 30 is a schematic drawing illustrating an example of applying the wireless transmission system shown in FIG. 29 to a home gaming console; and FIG. 31 is a block diagram illustrating a configuration example of an embodiment a computer to which an embodiment of the present invention has been applied.

DESCRIPTION OF THE PREFERRED EMBODIMENTS

Figure 1:
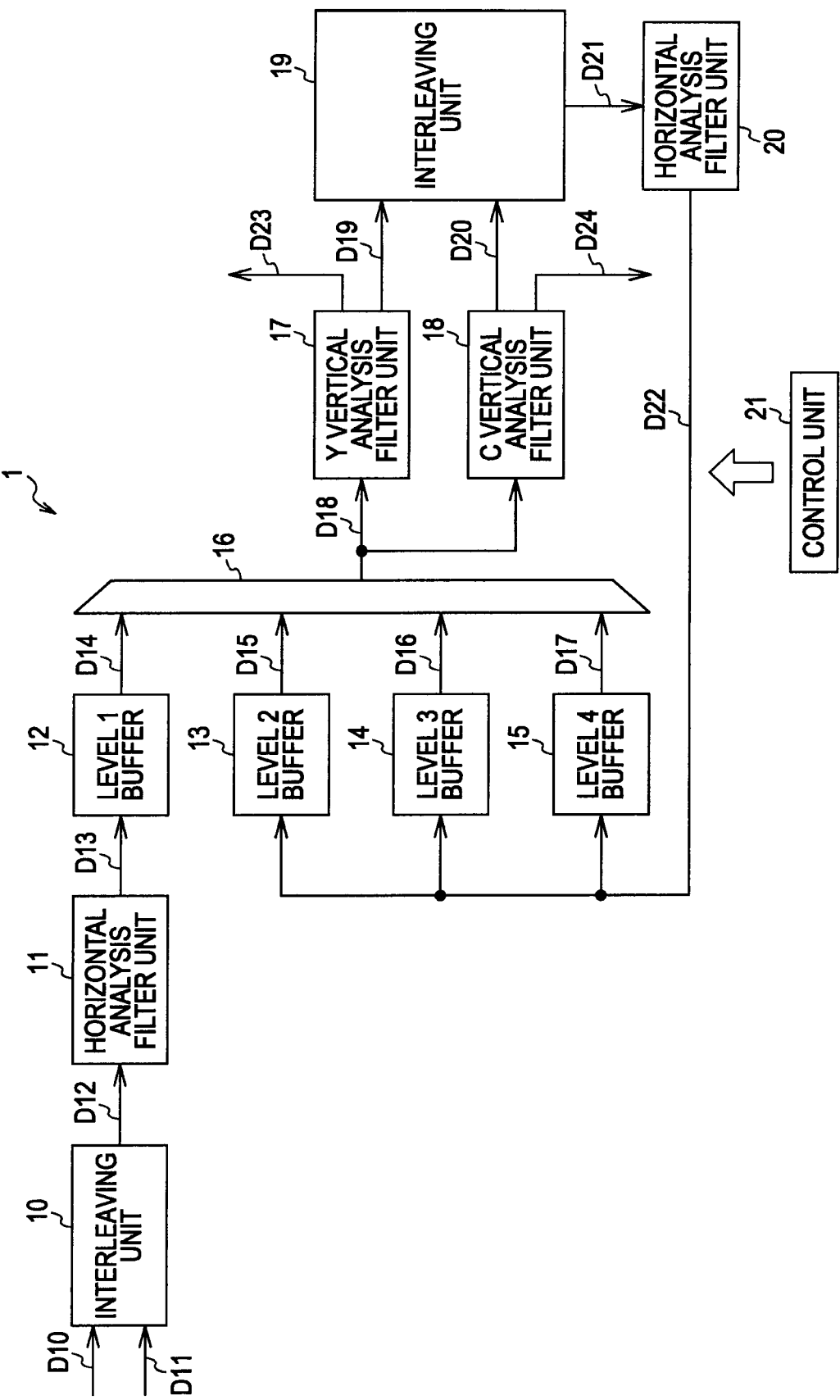
FIG. 1 is a diagram illustrating a configuration example of an embodiment of a wavelet transformation device to which an embodiment of the present invention has been applied.

FIG. 1 is a diagram illustrating a configuration example of an embodiment of a wavelet transformation device to which an embodiment of the present invention has been applied. The wavelet transformation device 1 is a band analysis device which takes image data as input, and performs horizontal direction filtering and vertical direction filtering, in which lowband components are hierarchically divided to a predetermined division level (in the example shown in FIG. 1, to division level 4).

The wavelet transformation device 1 shown in FIG. 1 is configured of an interleaving unit 10, a horizontal analysis filter unit 11, level 1 buffer 12, level 2 buffer 13, level 3 buffer 14, level 4 buffer 15, selector 16, Y (brightness) vertical analysis filter unit 17, C (color difference) vertical analysis filter unit 18, interleaving unit 19, horizontal analysis filter unit 20, and control unit 21.

Brightness signals (brightness components signals) D10 and color different signals (color difference component signals) D11, which are elements of image signals, are input to the interleaving unit 10. Note that hereinafter, brightness (components) may be referred to as "Y" as appropriate, and color difference (components) as "C". The interleaving unit 10 interleaves the brightness signals D10 and color difference signals D11. In the event of image signals wherein Y and C have already been interleaved are input, as with the video signals described later with reference to FIG. 12, there is no need to the processing by the interleaving unit 10, as a matter of course. The interleaved image signals D12 are input to the horizontal analysis filter unit 11.

The horizontal analysis filter unit 11 subjects the image signals D12, wherein Y and C have been interleaved, to lowband analysis filtering and highband analysis filtering in the horizontal direction of the division level 1, and generates frequency components coefficients made up of lowband component coefficients and highband component coefficients obtained as the result of the horizontal analysis filtering (hereafter also referred to as lowband component, highband component and frequency components, as appropriate).

Now, the horizontal analysis filter unit 11 performs lowband analysis filtering and highband analysis filtering in the horizontal direction on the Y or C data, while alternately reading out the Y and C data situated on the baseband in stepping stone fashion, from an unshown internal memory (or register).

The level 1 buffer 12 stores and holds the results of the division level 1 horizontal analysis filtering. That is to say, the level 1 buffer 12 separately stores and holds the Y frequency components (lowband components and highband components) and the C frequency components (lowband components and highband components), obtained as results of the division level 1 horizontal analysis filtering by the horizontal analysis filter unit 11. Once data (frequency components) for a predetermined number of vertical lines enabling vertical direction analysis filtering has been accumulated in the level 1 buffer 12, the number of vertical lines worth of frequency components D14 are read out via the selector 16.

The level 2 buffer 13 stores and holds the results of the division level 2 horizontal analysis filtering. That is to say, the level 2 buffer 13 separately stores and holds the Y frequency components (lowband components and highband components) and the C frequency components (lowband components and highband components), obtained as results of the division level 2 horizontal analysis filtering by the horizontal analysis filter unit 20. Once data for a predetermined number of vertical lines enabling vertical direction analysis filtering has been accumulated in the level 2 buffer 13, the number of vertical lines worth of frequency components D15 are read out via the selector 16.

The level 3 buffer 14 stores and holds the results of the division level 3 horizontal analysis filtering. That is to say, the level 3 buffer 14 separately stores and holds the Y frequency components (lowband components and highband components) and the C frequency components (lowband components and highband components), obtained as results of the division level 3 horizontal analysis filtering by the horizontal analysis filter unit 20. Once data for a predetermined number of vertical lines enabling vertical direction analysis filtering has been accumulated in the level 3 buffer 14, the number of vertical lines worth of frequency components D16 are read out via the selector 16.

The level 4 buffer 15 stores and holds the results of the division level 4 horizontal analysis filtering. That is to say, the level 4 buffer 15 separately stores and holds the Y frequency components (lowband components and highband components) and the C frequency components (lowband components and highband components), obtained as results of the division level 4 horizontal analysis filtering by the horizontal analysis filter unit 20. Once data (frequency components) for a predetermined number of vertical lines enabling vertical direction analysis filtering has been accumulated in the level 4 buffer 15, the number of vertical lines worth of frequency components D17 are read out via the selector 16.

Under control of the Y vertical analysis filter unit 17 and C vertical analysis filter unit 18, the selector 16 selects from the level 1 buffer 12 through level 4 buffer 15, the output of the corresponding division level buffer, and outputs the selected output to the Y vertical analysis filter unit 17 and C vertical analysis filter unit 18 as frequency components D18.

The Y vertical analysis filter unit 17 and C vertical analysis filter unit 18 perform Y and C vertical analysis filtering on the predetermined number of vertical lines worth of frequency components D18 from the selector 16.

That is to say, the Y vertical analysis filter unit 17 reads out the predetermined number of vertical lines worth of frequency components D18 for Y from the buffer of the corresponding level, performs Y vertical direction lowband analysis filtering and highband analysis filtering, and of the frequency components obtained as a result of the Y vertical analysis filtering, outputs only the lowband component D19 which is lowband in both the horizontal direction and vertical direction for Y, to the interleaving unit 19, and outputs other highband components D23 of Y externally from the wavelet transformation device 1 (hereafter referred to simply as "external").

Also, the C vertical analysis filter unit 18 reads out the predetermined number of vertical lines worth of frequency components D18 for C from the buffer of the corresponding division level, performs C vertical direction lowband analysis filtering and highband analysis filtering, and of the frequency components obtained as a result of the C vertical analysis filtering, outputs only the lowband component D20 which is lowband in both the horizontal direction and vertical direction for C, to the interleaving unit 19, and outputs other highband components D24 of C externally.

The interleaving unit 19 interleaves the Y lowband components D19 from the Y vertical analysis filter unit 17 and the C lowband components D20 from the C vertical analysis filter unit 18. The interleaved lowband components D21 are input to the horizontal analysis filter unit 20.

The horizontal analysis filter unit 20 has basically the same configuration as that of the horizontal analysis filter unit 11, except that the division level of the frequency components to be processed differs. That is to say, with the horizontal analysis filter unit 20, Y and C lowband components D21 existing on the baseband in steppingstone fashion are alternately read out by the horizontal analysis filter unit 20 from unshown built-in memory, and horizontal direction lowband analysis filtering and highband analysis filtering are performed alternately on the Y and C lowband components D21.

The horizontal analysis filter unit 20 then stores and holds frequency components (lowband components and highband components) D22 which are results of the horizontal analysis filtering, in the corresponding level buffer (one of the level 2 buffer 13 through level 4 buffer 15).

The control unit 21 is configured of a microcomputer or the like including, for example, a CPU (Central Processing Unit), ROM (Read Only Memory), and RAM (Random Access Memory), and controls the processing of the units of the wavelet transformation device 1 by executing various types of programs.

Figure 2:
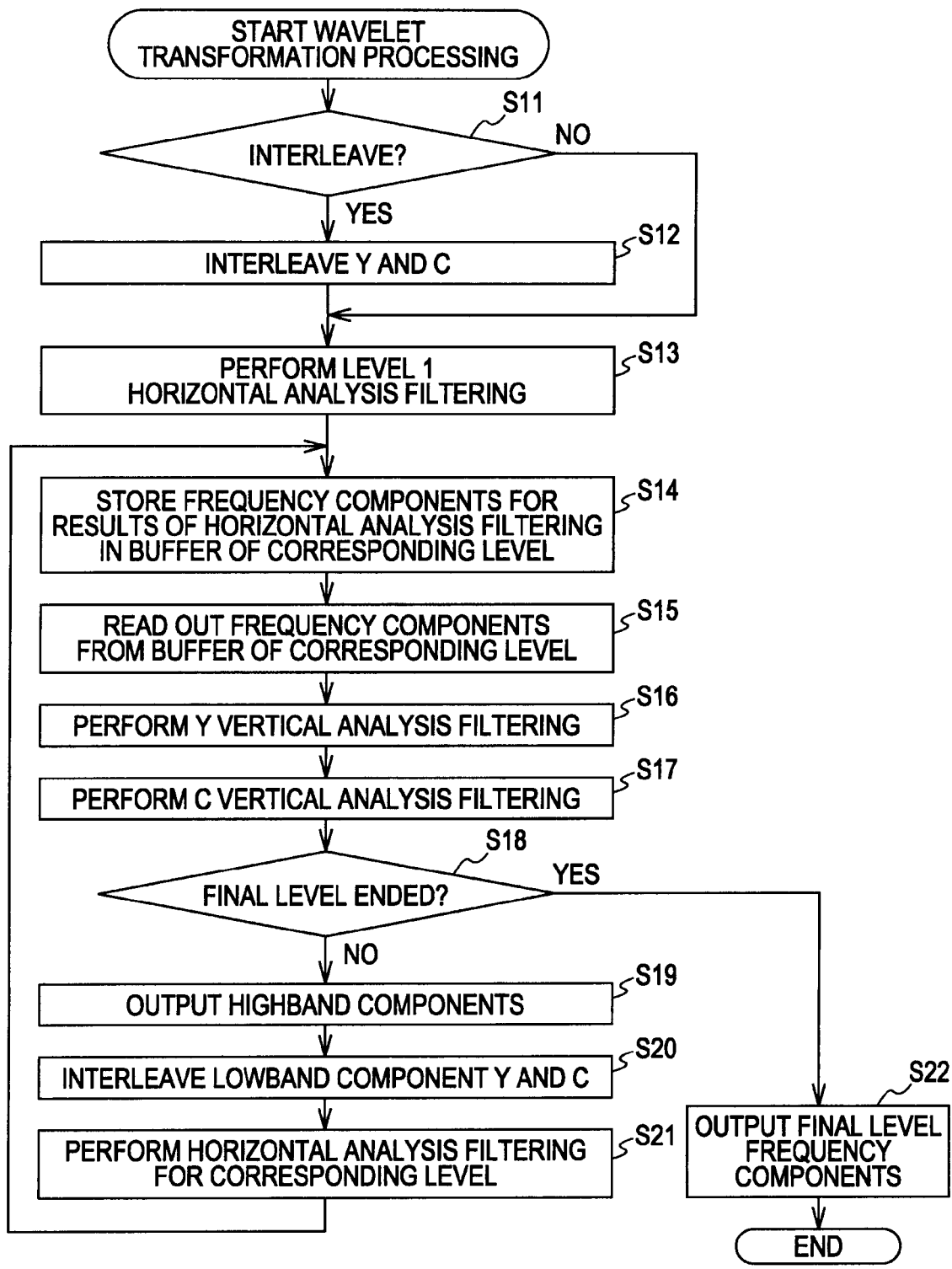
FIG. 2 is a flowchart for describing wavelet transformation processing with the wavelet transformation device shown in FIG. 1.

Next, the operations of the wavelet transformation device 1 shown in FIG. 1 will be described with reference to the flowchart in FIG. 2. That is to say, FIG. 2 illustrates the wavelet transformation processing executed by the wavelet transformation device 1.

Image signals are input to the interleaving unit 10 externally (e.g., from a later-described video camera unit 303 shown in FIG. 28). In step S11, the interleaving unit 10 determines whether or not to perform interleaving. For example, in the event that brightness signals D10 and color difference signals D11 which are elements of the image signals are input, in step S11 determination is made to perform interleaving, the flow proceeds to step S12, and the interleaving unit 10 interleaves the brightness signals D10 and color difference signals D11 in internal memory. The interleaved image signals D12 are input to the horizontal analysis filter unit 11.

Figure 12:
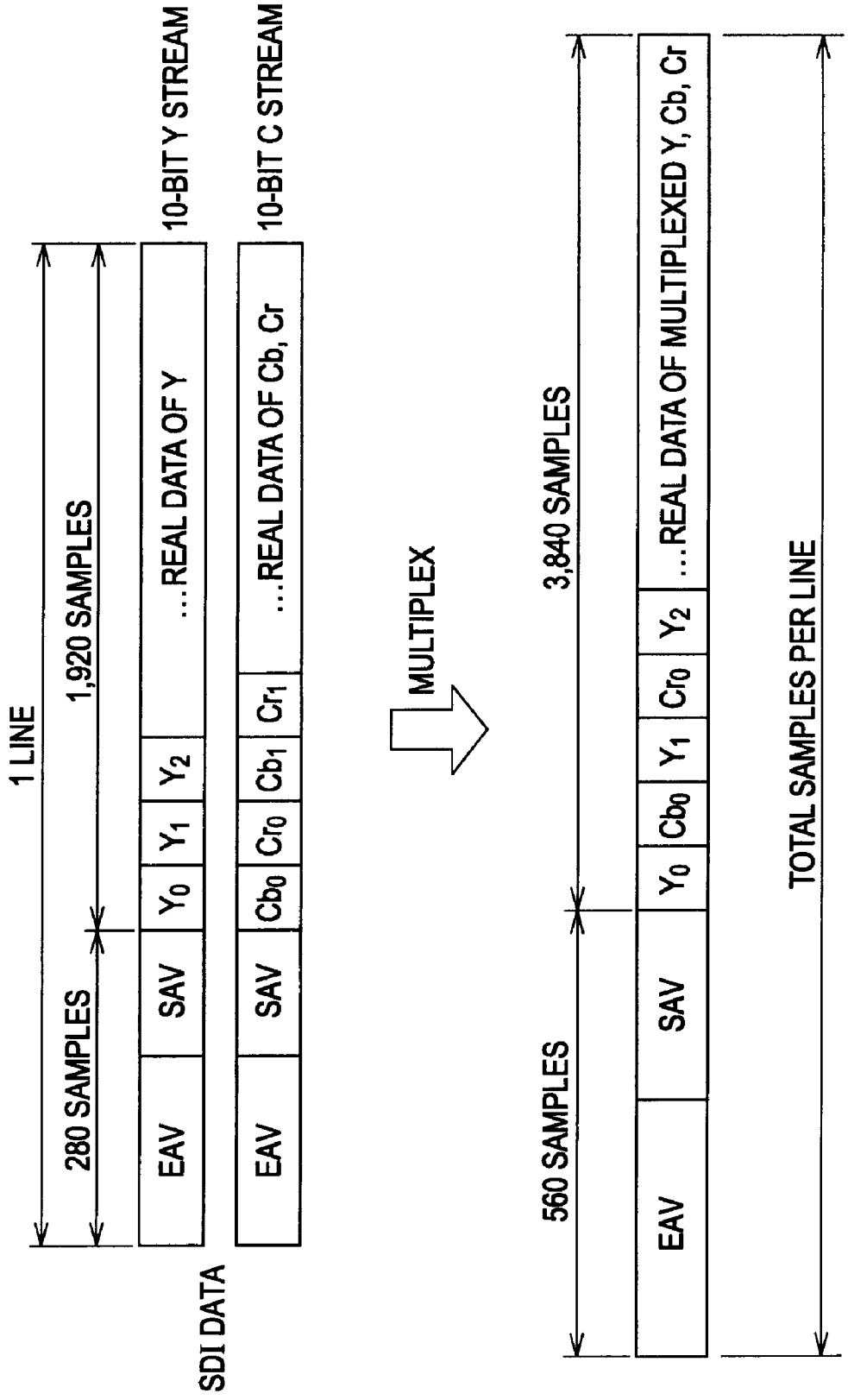
FIG. 12 is a diagram illustrating an example of a data array of brightness and color difference signals with the HDTV standard.

Also, in the event that image signals wherein Y and C are interleaved, as with the video signals described later with reference to FIG. 12, are input (i.e., signals equivalent to image signals D12), in step S11 determination is made to not perform interleaving, and the image signals D12 wherein Y and C are interleaved are input to the horizontal analysis filter unit 11 via the interleaving unit 10 without change. The flow then skips step S12, and proceeds to step S13. In step S13, the horizontal analysis filter unit 11 performs division level 1 horizontal analysis filtering on the image signals D12 wherein Y and C are interleaved.

Figure 3:
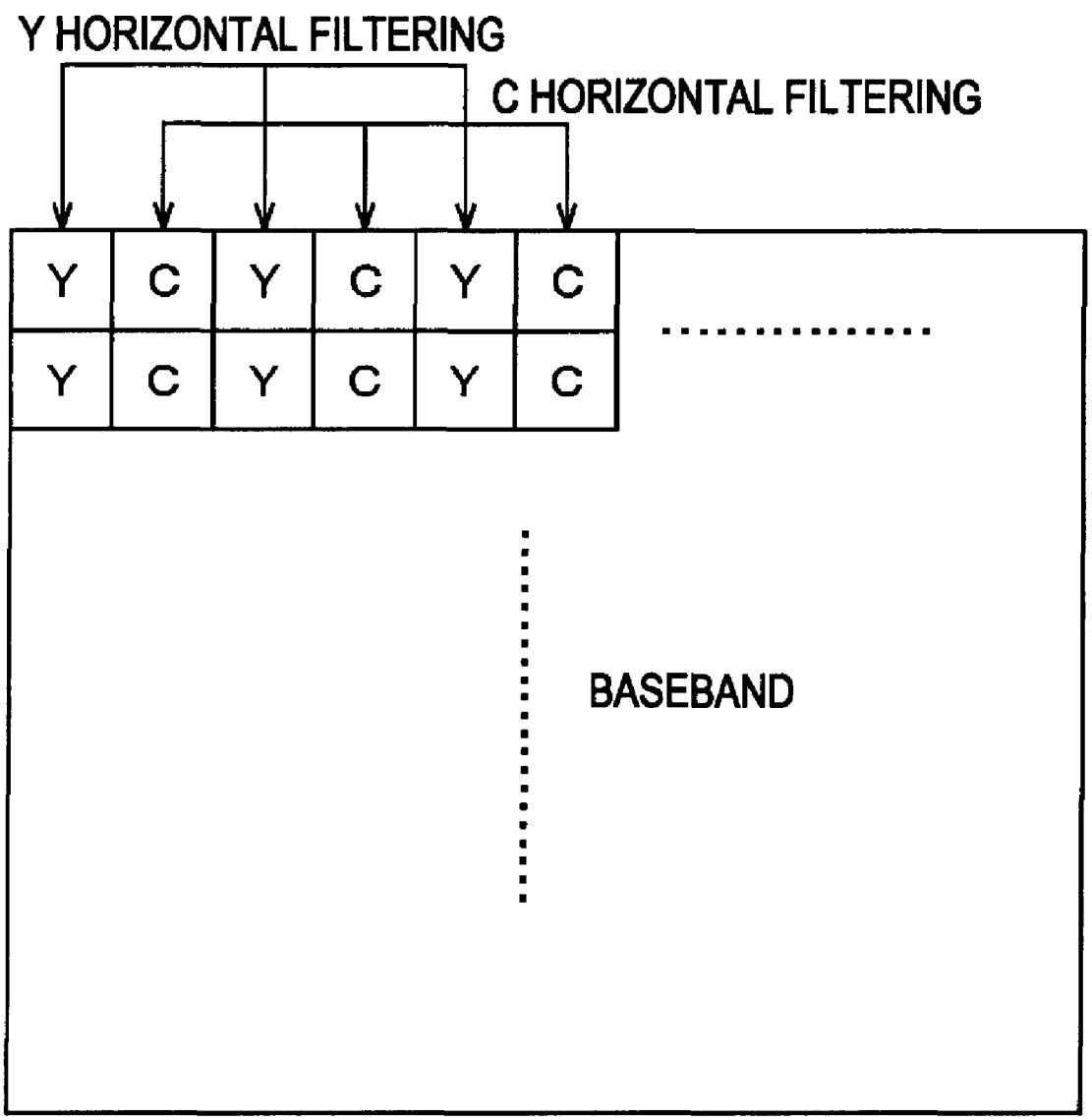
FIG. 3 is a diagram for describing an example of horizontal analysis filtering of image signals wherein Y and C have been interleaved.

That is to say, the horizontal analysis filter unit 11 has unshown internal memory (or a register), and the input image signals wherein Y and C have been interleaved are rendered in the internal memory as shown in FIG. 3. Note that with the example in FIG. 3, a baseband image of image signals wherein Y and C, represented by squares, are alternately rendered in memory, is illustrated.

The horizontal analysis filter unit 11 reads out Y data of a predetermined number (3 samples in the case of FIG. 3) or C data of a predetermined number situated in steppingstone fashion on the baseband rendered in the internal memory, while shifting the position, and alternately performs Y horizontal direction lowband analysis filtering and highband analysis filtering, and C horizontal direction lowband analysis filtering and highband analysis filtering.

The horizontal direction data is readily rendered to memory addresses. Accordingly, horizontal analysis filtering is readily executed in order at the horizontal analysis filter unit 11 while alternately reading out Y data and C data from the memory.

In step S14, the horizontal analysis filter unit 11 stores the frequency components obtained as a result of the division level 1 horizontal analysis filtering to the corresponding level buffer (in this case, the level 1 buffer 12).

Figure 4:
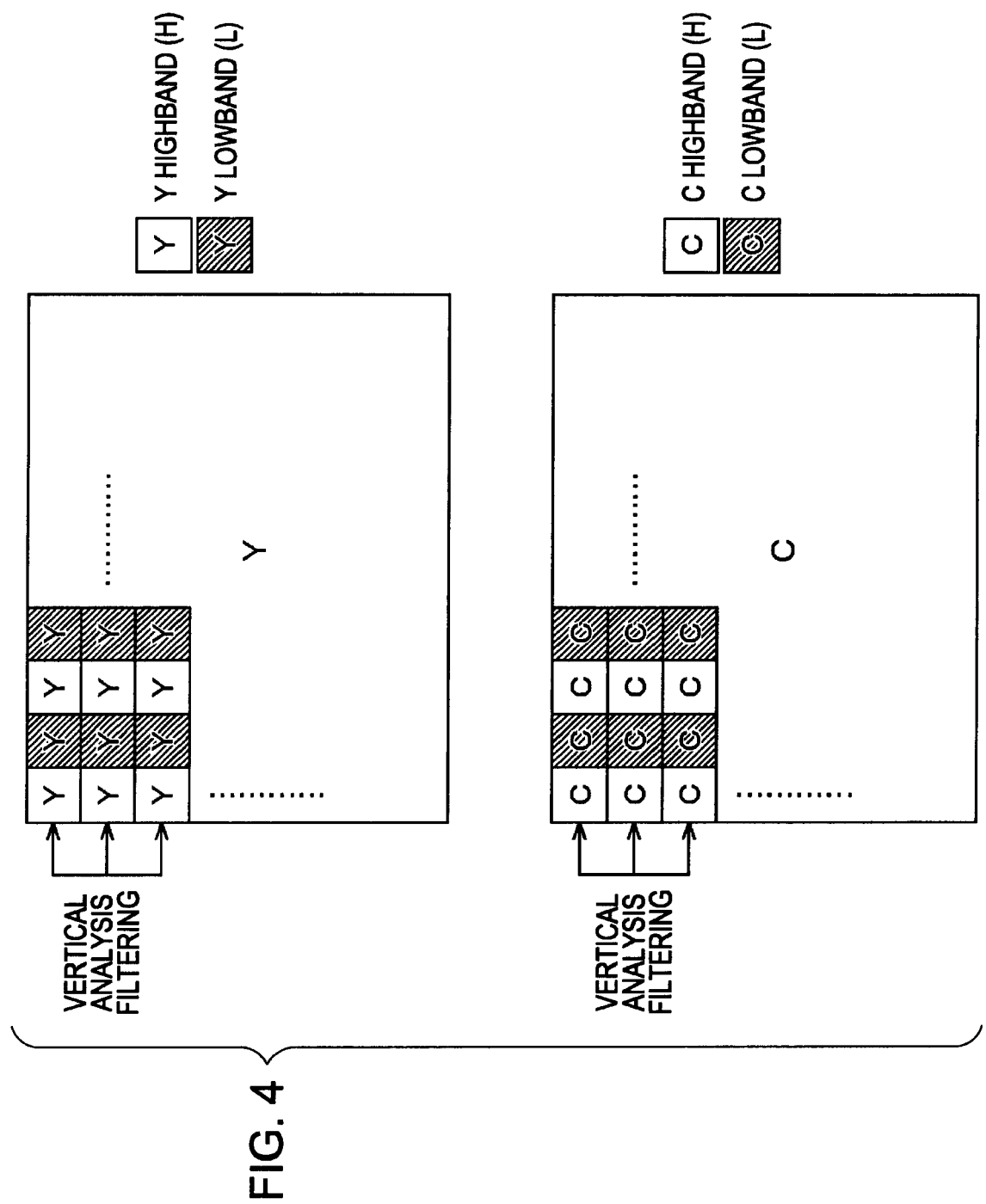
FIG. 4 is a diagram for describing an example of performing vertical analysis filtering separately for Y and C.

At this time, the horizontal analysis filter unit 11 interleaves the Y highband components (H) and lowband components (L) which are the results of the Y horizontal analysis filtering, and stores in the level 1 buffer 12 separately from C, and then interleaves the C highband components and lowband components which are the results of the C horizontal analysis filtering, and stores in the level 1 buffer 12 separately from Y, as shown in FIG. 4.

Figure 5:
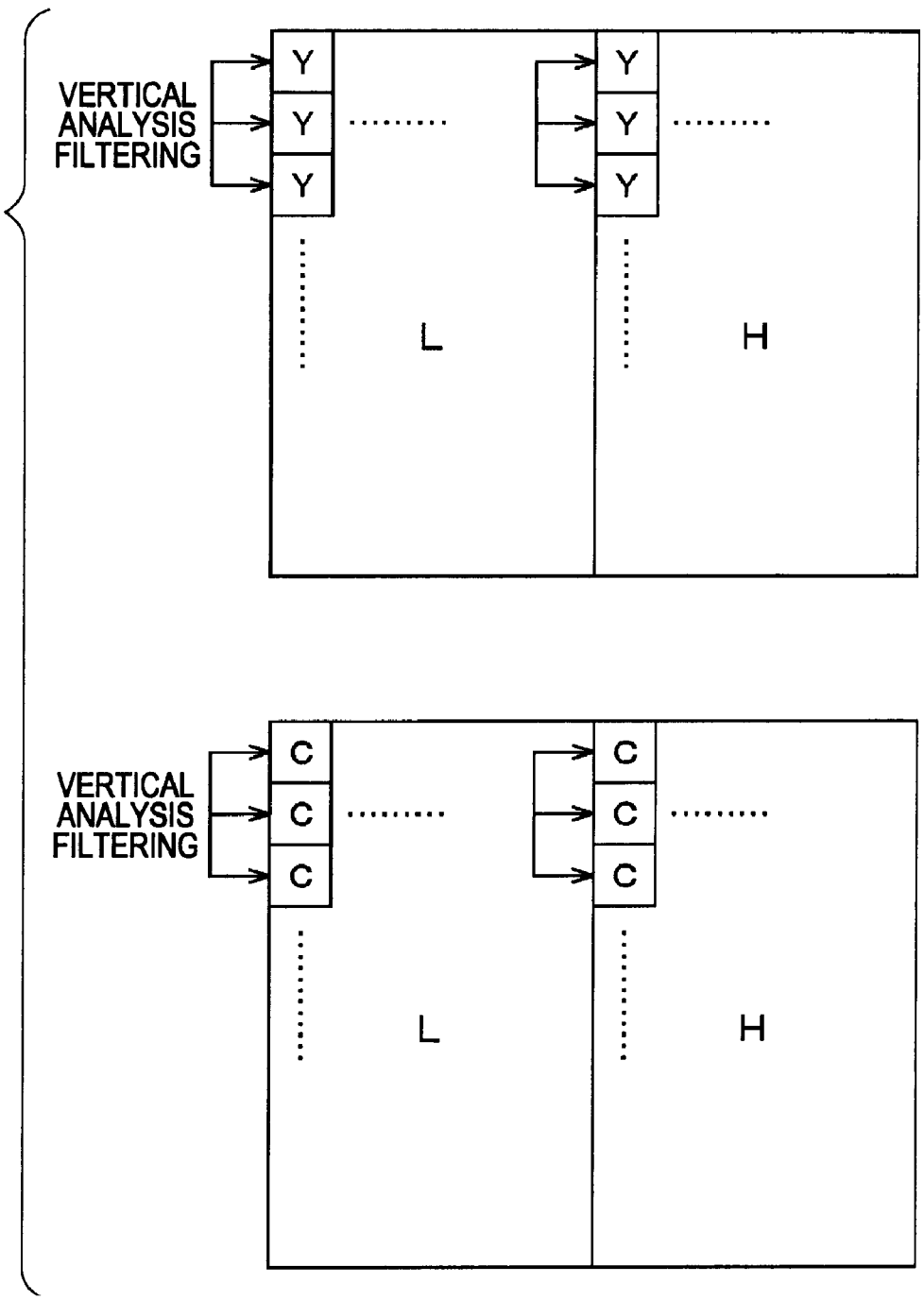
FIG. 5 is a diagram for describing an example of performing vertical analysis filtering of Y and C, divided into lowband and highband as previously known, for the sake of comparison with FIG. 4.

With known arrangements, the results of the horizontal analysis filtering were divided into the highband components and lowband components, and thus stored in the buffer, for both Y and for C, as shown in FIG. 5. However, mapping the highband components and lowband components to different addresses in the buffer as with the known arrangements requires a separate controller for distribution thereof.

Conversely, with the example shown in FIG. 4 according to the present embodiment, the Y highband components (H) and lowband components (L) are alternately stored in the level 1 buffer 12, and the C highband components (H) and lowband components (L) are alternately stored at addresses different from Y. That is to say, the highband components and lowband components which are the results of the horizontal analysis filtering are stored in the level 1 buffer 12 in an interleaved manner by the horizontal analysis filter unit 11 for Y and C each, so at the time of reading out the frequency components stored in the level 1 buffer 12, all that is to necessary is to read out from the front of the level 1 buffer 12, thereby simplifying control.

Now, returning to FIG. 2, upon the frequency components obtained as a result of the horizontal analysis filtering being accumulated in the level 1 buffer 12 shown in FIG. 4 for a predetermined number of vertical lines (three lines in the case shown in FIG. 4) whereby vertical analysis filtering can be performed, for example, in step S15 the Y vertical analysis filter unit 17 and C vertical analysis filter unit 18 read out the frequency components of the necessary number of vertical lines from the level 1 buffer 12, by controlling the selector 16 so as to select the output of the level 1 buffer 12. The frequency components read out are input to the Y vertical analysis filter unit 17 and C vertical analysis filter unit 18 as Y and C frequency components D18, via the selector 16.

In step S16, the Y vertical analysis filter unit 17 performs Y vertical analysis filtering of the corresponding division level (in the current case, the division level 1) on a predetermined number of vertical lines worth of Y frequency components (three lines worth in the case of FIG. 4). In step S17, the C vertical analysis filter unit 18 performs C vertical analysis filtering of the corresponding division level (in the current case, the division level 1) on a predetermined number of vertical lines worth of C frequency components (three lines worth in the case of FIG. 4). The processing of steps S16 and S17 are executed in parallel; these will be described later in detail with reference to FIG. 8.

As a result of the division level 1 Y and C vertical analysis filtering (i.e., the results of division level 1 Y and C analysis filtering), frequency components of four frequency components are generated for Y and C, made up of the lowband component (1LL) coefficient and highband component (1HH, 1LH, 1HL) coefficients, as shown in FIG. 6. Note that in the example shown in FIG. 6, the order of "L" and "H" indicate the bandwidth (lowband or highband) as the result of performing horizontal analysis filtering previously, and the bandwidth (lowband or highband) as the result of performing vertical analysis filtering, in that order. Further, the numeral in front of the "L" or "H" indicates the division level.

This is the division level 1 analysis filtering, whereby Y lowband components (1LL) D19 and highband components (1HH, 1LH, 1HL) D23 are generated at the Y vertical analysis filter unit 17, and C lowband components (1LL) D20 and highband components (1HH, 1LH, 1HL) D24 are generated at the C vertical analysis filter unit 18, as a result. Of these, only the lowband components (1LL) are analyzed again to the set division level (final level), but the highband components are not analyzed any further. That is to say, the lowband components are further divided to the final level, so the final level can also be said to be the lowest band level outputting the lowest band.

In step S18, the Y vertical analysis filter unit 17 and C vertical analysis filter unit 18 determine whether or not the analysis filtering has been computed to the final level of the set division levels (in the case shown in FIG. 1, division level 4). In the case of division level 1, the flow has not reached the final level yet, so the processing proceeds to step S19.

In step S19, the Y vertical analysis filter unit 17 and C vertical analysis filter unit 18 output the Y highband components (1HH, 1LH, 1HL) D23 and C highband components (1HH, 1LH, 1HL) D24 externally (e.g., to the quantizing unit 112 described later, shown in FIG. 24).

Figure 7:
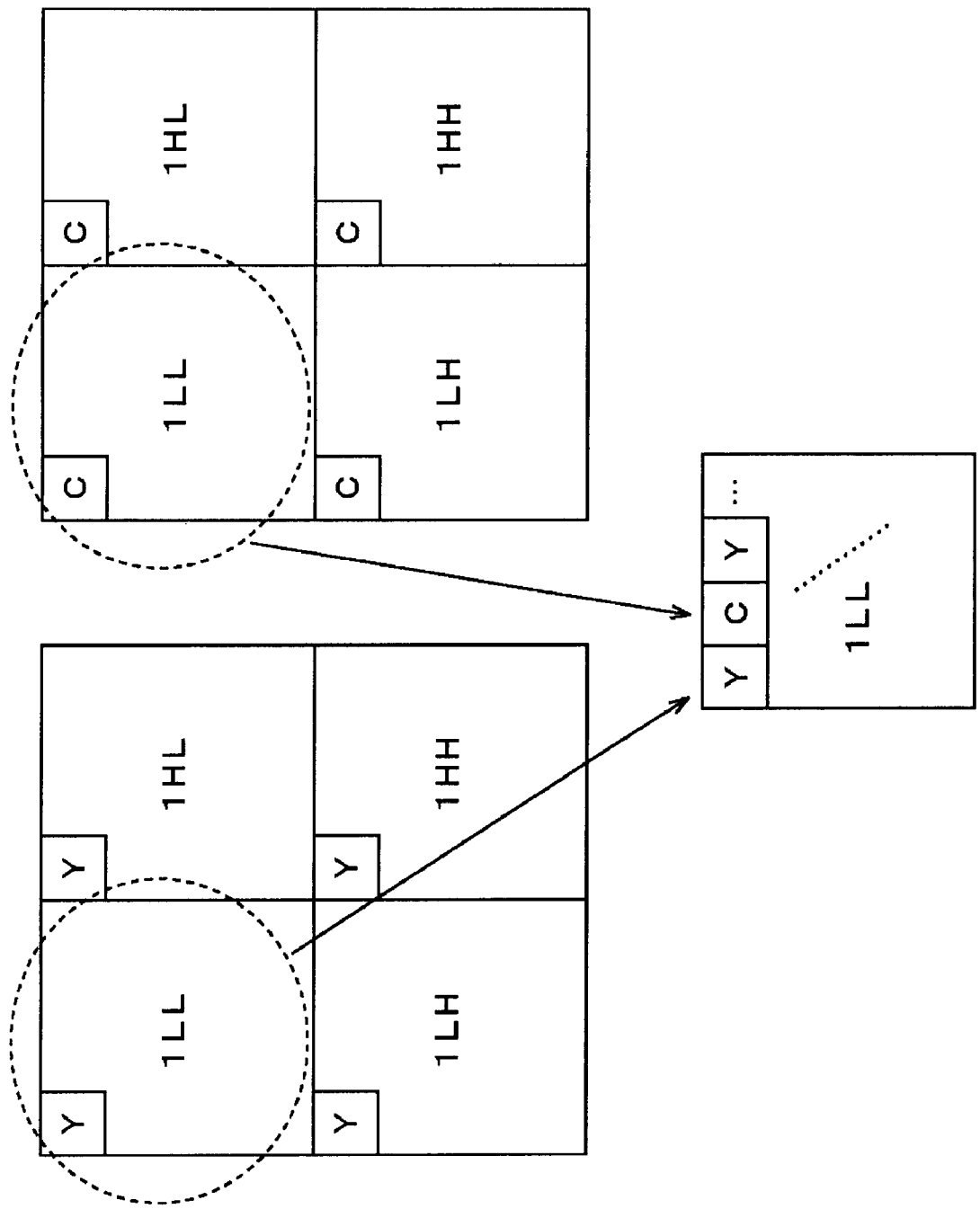
FIG. 7 is a diagram for describing an example of interleaving Y and C for division level 1 lowband components.

On the other hand, the Y lowband components (1LL) D19 and C lowband components (1LL) D20 are output to the interleaving unit 19. Accordingly, in step S20, the interleaving unit 19 interleaves the Y lowband components (1LL) D19 and C lowband components (1LL) D20, and inputs the interleaved lowband components D21 to the horizontal analysis filter unit 20.

that is to say, as shown in FIG. 7, the lowband components (1LL) D19 of the Y frequency components and the lowband components (1LL) D20 of the C frequency components are alternately interleaved and synthesized. Note that in the example shown in FIG. 7, the size of the lowband components (1LL) following interleaving of Y and C shown toward the bottom is illustrated as being the same size as the lowband components (1LL) of Y or C alone before interleaving, indicated by the dotted line, but in reality, the size is twice that of the lowband components of Y or C alone.

In step S21, the horizontal analysis filter unit 20 performs horizontal analysis filtering (horizontal direction lowband analysis filtering and highband analysis filtering) of the corresponding division level (in this case, division level 2) on the lowband components D21 wherein Y and C have been interleaved, and generates lowband components and highband components which are the results of the horizontal analysis filtering. Note that the processing in step S21 is basically the same as the processing in the above-described step S13, with the only difference being the division level of the frequency components to be processed.

Following step S21, the flow returns to step S14, and the subsequent processing is repeated. That is to say, in step S14, the horizontal analysis filter unit 20 stores and holds the frequency components (lowband and highband components) D22 obtained as the result of horizontal analysis filtering, in the buffer of the corresponding level (in this case, level 2 buffer 13).

Upon the frequency components obtained as a result of the horizontal analysis filtering being accumulated in the level 2 buffer 13 for a predetermined number of vertical lines whereby vertical analysis filtering can be performed, in step S15 the frequency components of the necessary number of vertical lines are read out from the level 2 buffer 13, and are input to the Y vertical analysis filter unit 17 and C vertical analysis filter unit 18, via the selector 16. In step S16, division level 2 Y vertical analysis filtering is performed as to the Y frequency components of the predetermined number of lines, and in step S17, division level 2 C vertical analysis filtering is performed as to the C frequency components of the predetermined number of lines.

As a result of the division level 2 Y and C vertical analysis filtering, four frequency components are generated, made up of the lowband component (2LL) coefficient and highband component (2HH, 2LH, 2HL) coefficients, for Y and C each. In step S18, determination is made that the flow has not reached the final level yet, so in step S19 the highband components (2HH, 2LH, 2HL) D23 are externally output. In step S20, the Y and C of the lowband components (2LL) are interleaved, and in step S21, division level 2 horizontal analysis filtering is performed on the lowband components (2LL) wherein the Y and C have been interleaved, thereby generating lowband components and highband components which are the results of the horizontal analysis filtering, the flow returns to step S14 again, the generated lowband components and highband components are stored and saved in the level 3 buffer 14, and the subsequent processing is repeated until the final level of the preset division levels.

The above-described series of processing is performed in the same manner up to the Y and C vertical analysis filtering at the final level (division level 4) of the preset division levels. Subsequently, in step S18, determination is made that the final level has finished, and the flow proceeds to step S22.

In step S22, the Y vertical analysis filter unit 17 and C vertical analysis filter unit 18 externally output the final level brightness frequency components (4LL, 4HL, 4LH, 4HH) D23 and the final level color difference frequency components (4LL, 4HL, 4LH, 4HH) D24. Thus, the division level 4 image signal wavelet transformation ends.

As described above, the wavelet transformation device 1 shown in FIG. 1 has buffers for each division level from level 1 to a predetermined number of levels, and stores the horizontal analysis filtering results in buffers of each division level while performing the horizontal analysis filtering. Accordingly, vertical direction filtering can be performed while reading out the results of the horizontal analysis filtering from the buffer of each division level. That is to say, horizontal direction and vertical direction analysis filtering can be performed simultaneously in parallel.

Thus, wavelet transformation can be performed at high speed for moving images and images with high resolution, as well.

Also, internal memory handles the buffers for each division level from level 1 to a predetermined level, so there is no need to configure external memory as with the arrangement described in Japanese Unexamined Patent Application Publication No. 10-283342.

Accordingly, there is no need to exchange data with external memory, and wavelet transformation can be performed at higher speeds than when accessing external memory. Consequently, there is no need to raise the clock frequency in order to increase speed of data between the external memory and the wavelet transformation device, thereby conserving electric power.

Also, horizontal direction analysis filtering is performed as to frequency components wherein Y and C are interleaved, so the horizontal analysis filter unit can be a single configuration, markedly contributing to reduction in the size of the hardware. This data interleaved in the horizontal direction can be readily rendered to registers or memory, and further, can be read and written at high speed, thereby contributing to higher speed of wavelet transformation.

Further, as described above with reference to FIGS. 4 and 5, the highband components and lowband components which are the results of the horizontal analysis filtering are interleaved for each of Y and C, and stored in buffers of corresponding levels, Y and C being stored separately, so at the time of reading out, all that is necessary is to read out from the front of the buffer of that level, thereby simplifying control.

Figure 8:
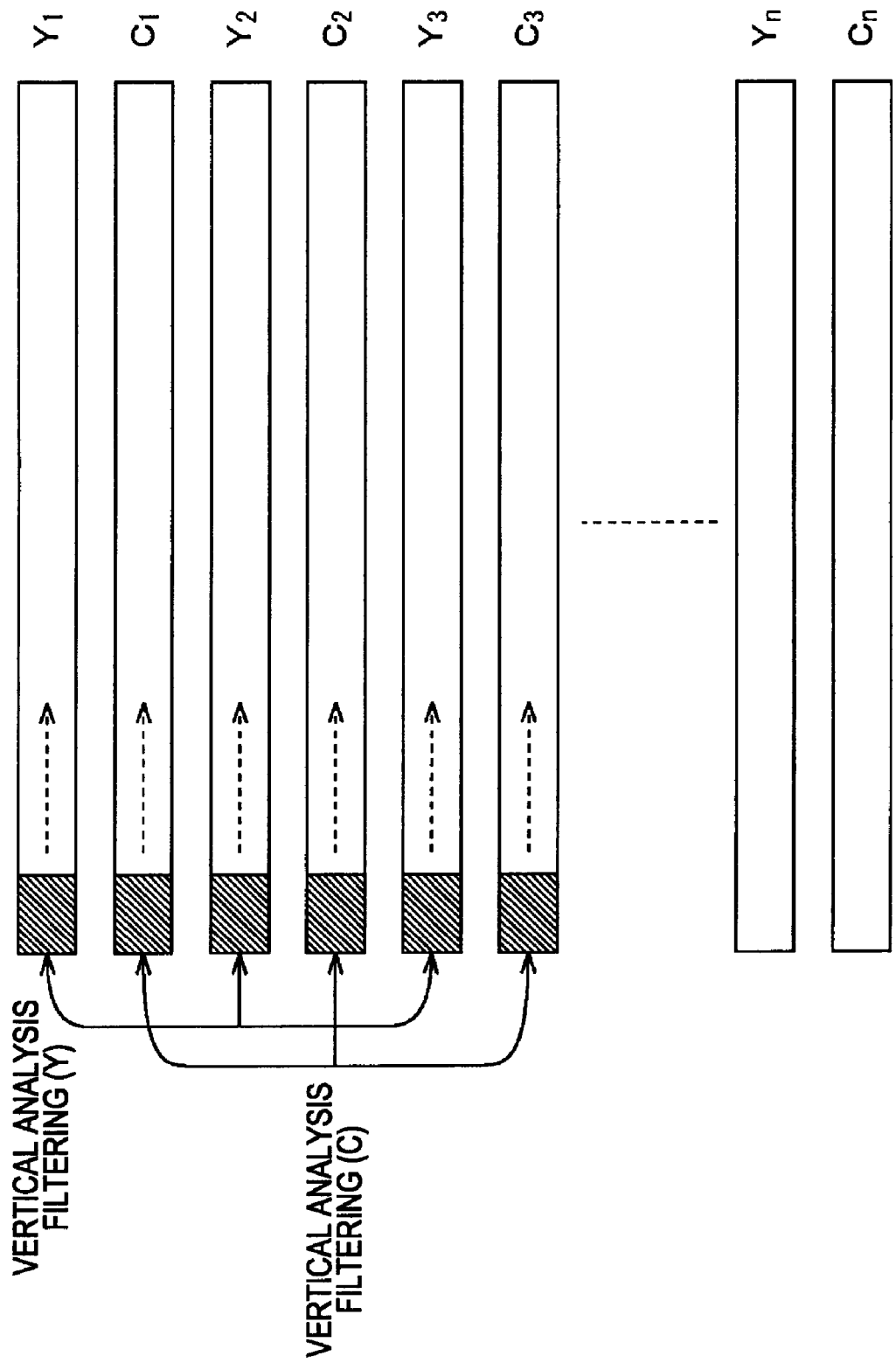
FIG. 8 is a diagram for describing an example of executing vertical analysis filtering with Y and C interleaved, for the sake of comparison with FIG. 4.

Also, vertical direction analysis filtering is performed separately for Y and C, so there is no need for the massive memory capacity which is necessary in the event of not performing the vertical direction analysis filtering shown in FIG. 8 separately for Y and C, and drastic increases in cost can be prevented. Further, the need for extra processing time can be prevented, as well.

Now, FIG. 8 will be used to describe a case wherein the vertical direction analysis filtering is not performed separately for Y and C, i.e., wherein Y and C are interleaved as with the horizontal analysis filter units 11 and 19, and then Y and C vertical analysis filtering is alternately performed while shifting, in order to compare such an arrangement with that of an embodiment of the present invention.

In the example in FIG. 8 is shown an example of a line buffer where interleaved Y and C are rendered. In the event that the image is configured of n lines for example, first, the brightness component Y1 of the first line is rendered at the line buffer, next, the color difference component C1 of the first line is rendered, the brightness component Y2 of the second line is rendered, next, the color difference component C2 of the second line is rendered, the brightness component Y3 of the third line is rendered, next, the color difference component C3 of the third line is rendered, and so on, until the brightness component Yn of the n'th line is rendered, and next, the color difference component Cn of the n'th line is rendered, and so the interleaved Y and C are rendered to the line buffer.

That is to say, in the case of processing Y and C separately as with the Y vertical analysis filter unit 17 and C vertical analysis filter unit 18 shown in FIG. 1, all that is necessary is to read out Y and C separately, but in order to process Y and C together, there is the need to interleave and render Y and C, requiring an extra line buffer for C (or for Y).

Also, the vertical analysis filtering is performed at the point that the number of lines necessary for vertical analysis filtering to be performed (e.g., 3 lines) is accumulated, so in the example in FIG. 8, in actual operations, Y vertical analysis filtering is performed at the point that the brightness component Y3 the fifth line from the top is accumulated, C vertical analysis filtering is performed at the point that the color difference component C3 the sixth line from the top is accumulated, and so on, with Y and C vertical analysis filtering being alternately performed.

Conversely, with the case of the Y vertical analysis filter unit 17 and C vertical analysis filter unit 18 shown in FIG. 1, Y and C vertical analysis filtering are performed in parallel, so the processing speed per time unit is faster than that of the example in FIG. 8.

AS described above, an arrangement wherein Y and C vertical analysis filtering is performed after interleaving Y and C is advantageous in that only one vertical analysis filter unit is needed, but this requires an extra line buffer for C (or for Y) as compared with an embodiment of the invention. In the even of configuring this line buffer with built-in memory, an extremely great amount of memory is necessary of images with high horizontal resolution (e.g., 1920 pixels in the case of HDTV (High Definition TeleVision), markedly increasing costs. Also, in the example shown in FIG. 8, Y and C must be alternately processed with a single vertical analysis filter unit, so more processing time is required as compared to the case of performing processing with two vertical analysis filter units, one for Y and one for C as with an embodiment of the invention.

Thus, an arrangement wherein Y and C vertical analysis filtering is performed after interleaving Y and C is more disadvantageous than advantageous. Conversely, the case of performing processing with two vertical analysis filter units, one for Y and one for C, as with an embodiment of the invention, an extra line buffer is not necessary, so marked increases in cost can be suppressed, and further, the processing can be performed in parallel with the two vertical analysis filter units, so processing time can be sped up.

As described above, Y vertical analysis filtering with the Y vertical analysis filter unit 17, and C vertical analysis filtering with the C vertical analysis filter unit 18, are performed in parallel, but generally, the brightness components have a greater data amount than color difference components, so the filtering execution time tends to be longer, and accordingly, even if these two are started at the same time, they will not end at the same time.

Figure 9:
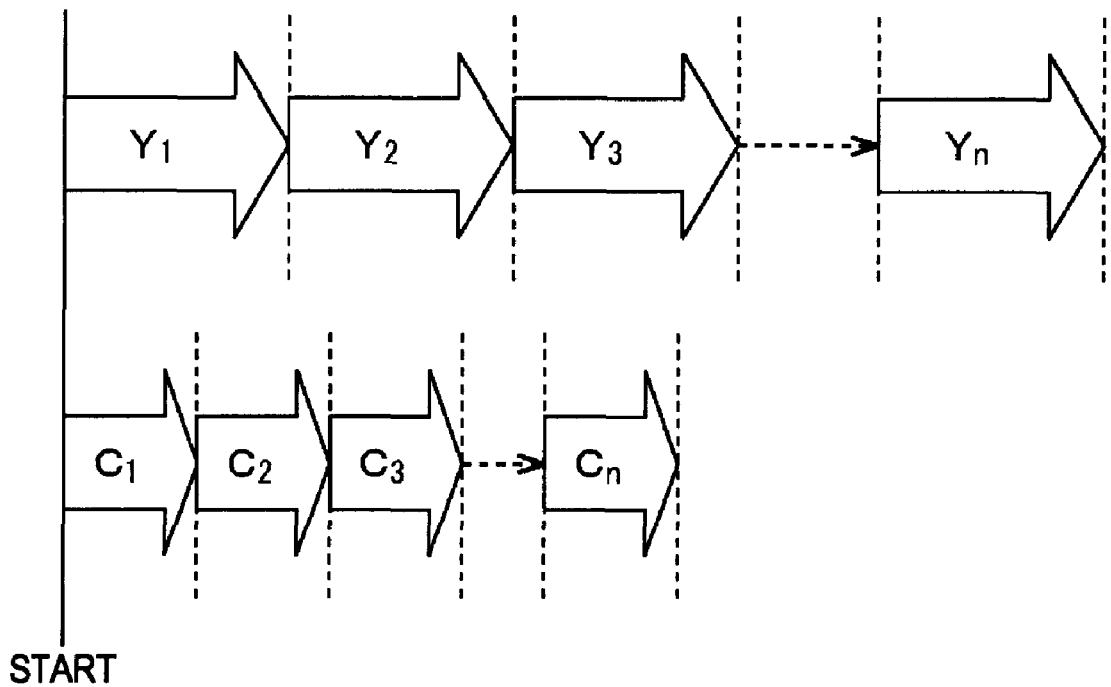
FIG. 9 is a diagram illustrating an example of a timing chart in a case wherein vertical analysis filtering is performed separately for Y and C.

Accordingly, of the vertical analysis filtering results of Y and C, the highband components D23 and D24 are not subjected to horizontal analysis filtering again, so as shown in FIG. 9, one keeps waiting for the other.

That is to say, in the example shown in FIG. 9, after the processing of the first line of brightness components Y1 started at the same time as the processing of first line of color difference components C1, processing of the second line of brightness components Y2, processing of the third line of brightness components Y3, and so on through processing of the n'th line of brightness components Yn, is sequentially performed, thereby completing the Y vertical analysis filtering.

Also, processing of the second line of color difference components C2 starts after the processing of the first line of color difference components C1 without waiting for the processing of the first line of brightness components Y1, which started at the same time, to end, and then after the processing of the second line of color difference components C2, processing of the third line of color difference components C3, and so on, is performed to the processing of the n'th line of color difference components Cn, so consequently, the C vertical analysis filtering is ended before the Y vertical analysis filtering ends.

Figure 10:
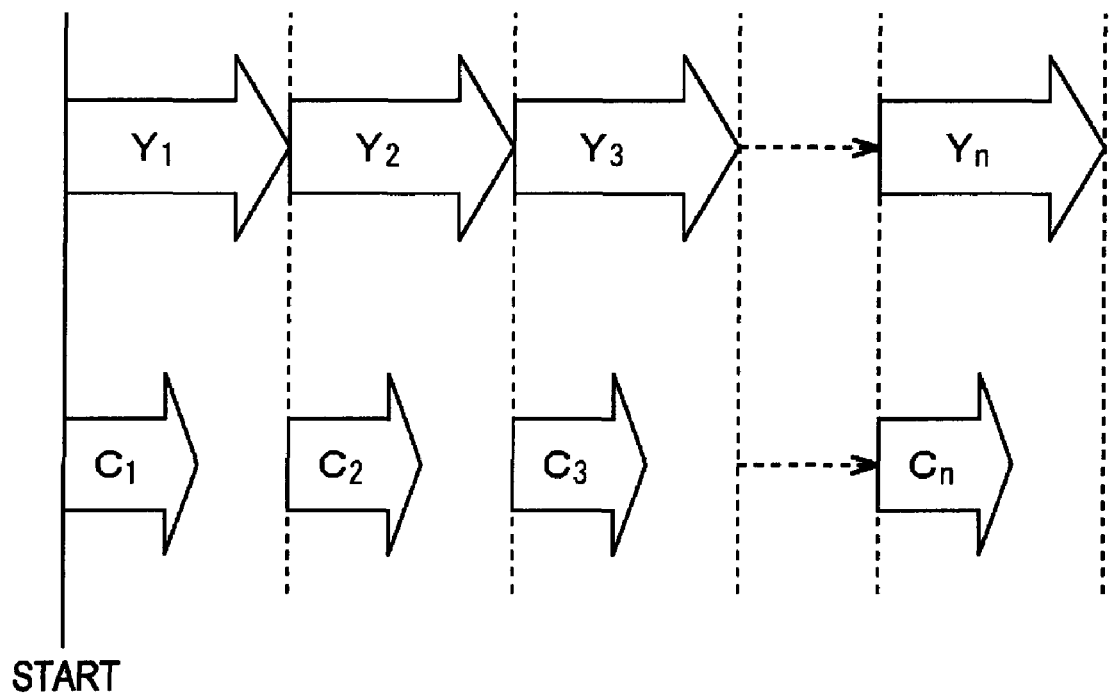
FIG. 10 is a diagram illustrating another example of a timing chart in a case wherein vertical analysis filtering is performed separately for Y and C.

On the other hand, of the Y and C vertical analysis filtering results, the lowband components D19 and D20 then need to be interleaved at the interleaving unit 19, so there is the need to match the output timing of both of the data, as shown in FIG. 10.

That is to say, in the example shown in FIG. 10, as with the example shown in FIG. 9, after the processing of the first line of brightness components Y1 started at the same time as the processing of first line of color difference components C1, processing of the second line of brightness components Y2, processing of the third line of brightness components Y3, and so on through processing of the n'th line of brightness components Yn, is sequentially performed, thereby completing the Y vertical analysis filtering.

Conversely, processing of the second line of color difference components C2 is not performed immediately after processing of the first line of color difference components C1, but after awaiting the processing of the first line of brightness components Y1 started at the same time as the processing of the first line of color difference components C1 to end. Processing of the third line of color difference components C3 is not performed immediately after processing of the second line of color difference components C2, but after awaiting the processing of the second line of brightness components Y2 started at the same time as the processing of the second line of color difference components C2 to end. Finally, processing of the n'th line of color difference components Cn is not performed immediately after processing of the n−1'th line of color difference components C n−1, but after awaiting the processing of the n−1'th line of brightness components Y n−1 started at the same time as the processing of the n−1'th line of color difference components C n−1 to end.

As described above, in order to perform the vertical direction analysis filtering of Y and C separately (in parallel), there is the need to match the output time of the lowband components obtained as results of Y and C. Thus, interleaving of the Y and C lowband components described above with reference to FIG. 7 can be made to proceed smoothly.

Next, the computation method in the above-described analysis filtering will be described in detail. The most common computation method in analysis filtering computation methods is a method called convolution computation. This convolution computation the most basic way to realize digital filters, with convolution multiplication being performed on actual input data on filter tap coefficients. However, with convolution computation, if the tap length is great, there cases wherein the calculation load increases accordingly.

Wavelet transformation lifting, introduced in the paper "W. Swelden, 'The lifting scheme: A custom-design construction of biorthogonal wavelets', Appl. Comput. Harmon. Anal., Vol 3, No. 2, pp. 186-200, 1996", is a known technique for handling this.

Figure 11:
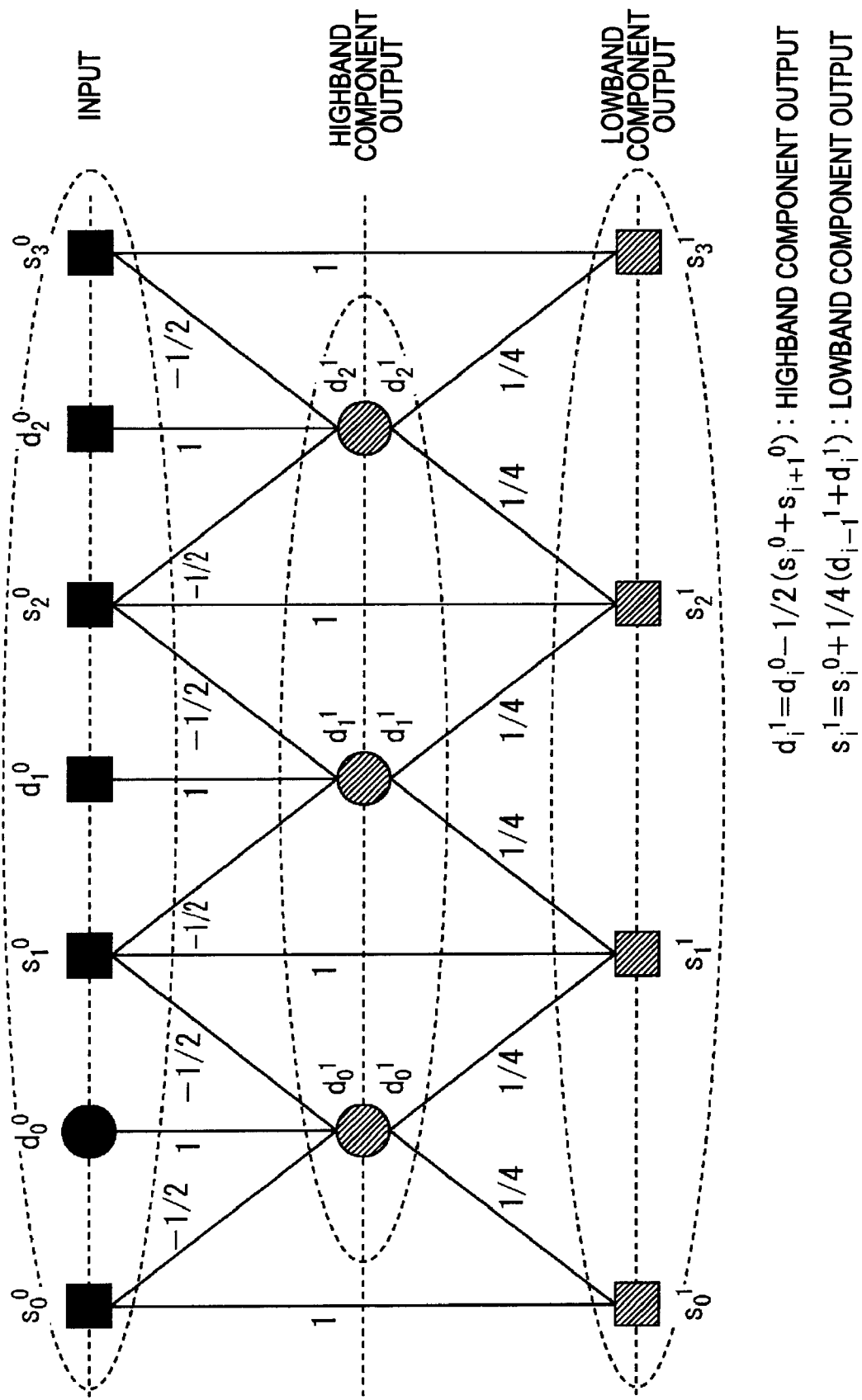
FIG. 11 is a diagram for describing an example of a lifting scheme with a 5×3 analysis filter.

FIG. 11 illustrates a lifting scheme of a 5×3 analysis filter used with the JPEG (Joint Photographic Experts Group) 2000 standard as well. Analysis lifting in a case of applying the lifting technique to this 5×3 analysis filter will be described.

In the example shown in FIG. 11, the top tier, middle tier, and bottom tier respectively represent a pixel row of an input image, highband component output, and lowband component output. The top tier is not restricted to a pixel row of an input image, and may be coefficients (frequency components) obtained from previous analysis filtering. Note that here, top tier is a pixel row of an input image, with the solid squares representing even pixels or lines, and the solid circles representing odd pixels or lines.

As the first stage, highband component coefficients are generated from the input pixel row, as shown in the following Expression (1).

$$\text{coefficient } d_i^1 = d_i^0 - 1/2(s_i^0 + s_{i+1}^0) \qquad (1)$$

Next, as the second stage, the lowband component coefficients are generated using the generated highband component coefficients and odd-numbered pixels of the input pixel row, as shown in the following Expression (2).

$$\text{coefficient } s_i^1 = s_i^0 + 1/4(d_{i-1}^1 + d_i^1) \qquad (2)$$

Thus, with the analysis filtering, first, highband component coefficients are generated, following which lowband component coefficients are generated. The tow types of filter banks used at this time can be realized with addition and shift computations alone, as can be seen from Expression (1) and Expression (2). Also, with a Z transformation expression, the filter has no more than two taps, as shown in the following Expression (3). In other words, two taps can suffice where five were necessary, and accordingly, the amount of calculations can be markedly reduced. Thus, this lifting technique will be applied to the horizontal analysis filtering and the vertical analysis filtering with the wavelet transformation device 1 as well.

$$P(z) = (1 + z^{-1})/2, \; U(z) = (1 + z^{-1})/4 \qquad (3)$$

Now, while the above description has been made regarding the configuration and operations of the wavelet transformation device 1 shown in FIG. 1 using common image signals; next, a case will be described wherein video signals, which are moving images, are input to the wavelet transformation device 1.

Video signals are normally stipulated by standards, and television broadcast signals which are generally used in Japan, the USA, and several other countries, are NTSC (National Television Standards Committee) signals. Also, HDTV signals are standardized under a standard known as SMPTE274M, by a USA standardization entity, SMPTE (The Society of Motion Picture and Television Engineers). Description will be made here regarding HDTV signals (resolution of 1920×1080).

FIG. 12 illustrates the components of HDTV video signal data. Of the video signals, the number of real sample data of brightness component Y is 1920 samples per line, with sample data of EAV (End of Active Video), SAV (Start of Active Video) being positioned before the Y real sample data. These are made up of a total of 280 samples. This configuration is also the same for color difference components Cb and Cr, but the format is 4:2:2 with the number of real sample data of Cb and Cr each being half of Y, so the total of Cb and Cr is the same as Y.

Multiplexing the Y and CB, Cr generates data of a total of 560 samples for EAV and SAV, and a total of 3840 samples for Y, Cb, and Cr. Thus, HDTV SMPTE274M standard (normally called "HD-SDI (High Definition Serial Data Interface) standard") video signals already have Y and C interleaved. Accordingly, this multiplexed sample data is equivalent to the image signals D12 shown in the example in FIG. 1. That is opt say, the image signals D12 are input to the interleaving unit 10 shown in FIG. 1, and as described above with step S11 in FIG. 2, the image signals D12 are input to the horizontal analysis filter unit 11 with no change thereto. Description will be made below assuming this situation.

In the event that video signals are input as image signals to the wavelet transformation device 1, the video signals are input as 60 fields being input per second, or each picture being input at 1/60 seconds, so the wavelet transformation processing described earlier with reference to FIG. 2 must be completed in this short time. That is to say, wavelet transformation must be completed at high speed.

Figure 13:
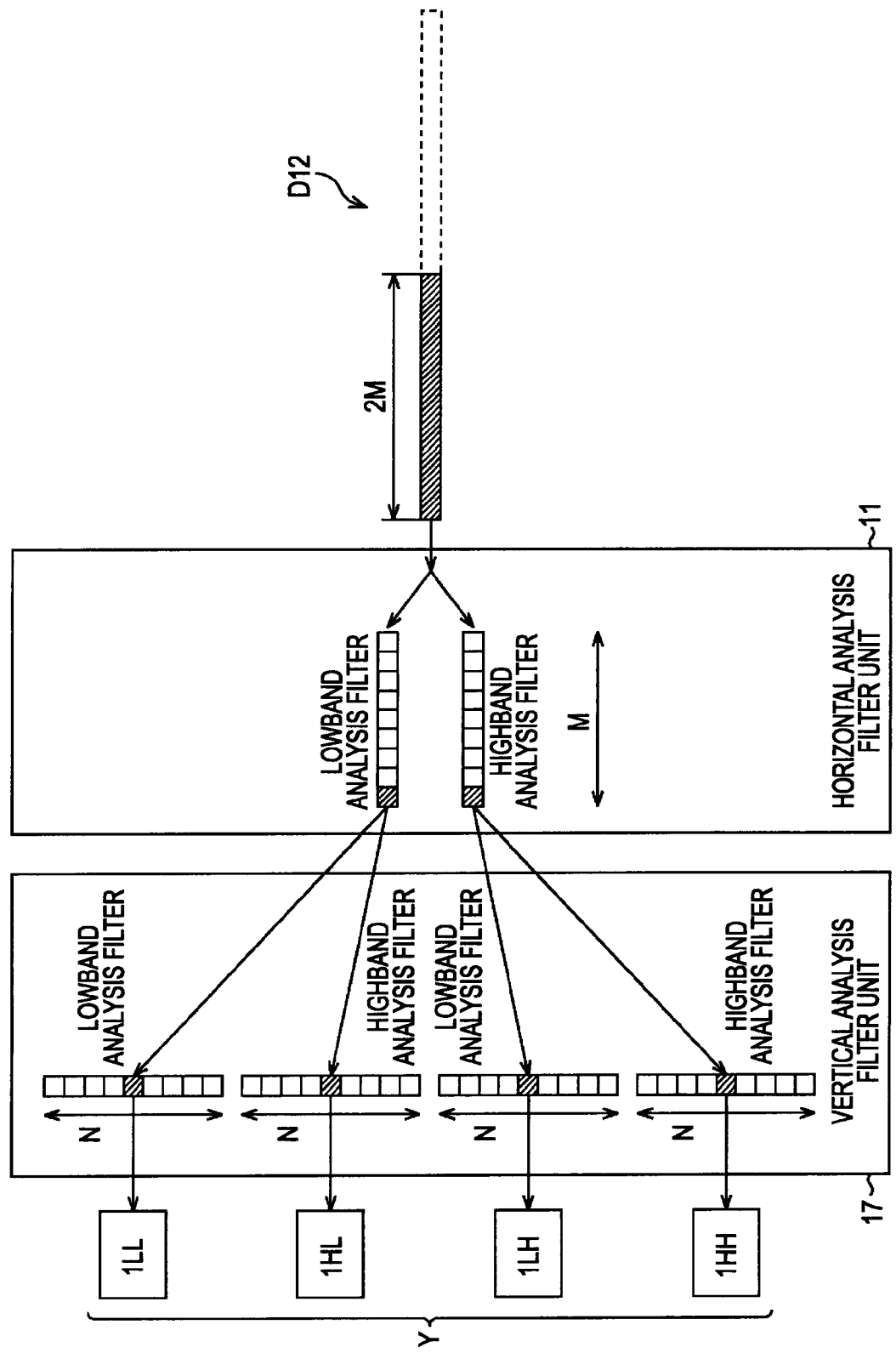
FIG. 13 is a diagram for describing analysis filtering in increments of lines.

One way of dealing with this is to input video signals (image signals D12) at the horizontal analysis filter unit 11, and at the point that the number of columns in the horizontal direction (number of samples) reach the predetermined number, to immediately perform horizontal direction lowband analysis filtering and highband analysis filtering. Note that while the example shown in FIG. 13 is a case regarding brightness signals Y, color difference signals C are also processed in the same way. Further, while description will be omitted, this holds true for the horizontal analysis filter unit 20 as well.

For example, the horizontal analysis filter unit 11 stands by until 2 M columns of image signals D12 wherein Y and C have been interleaved is input and rendered at the internal memory. The value of M corresponds to the number of taps for horizontal analysis filtering, and the greater the number of taps is, the greater the value of M is, accordingly. Note that the image signals D12 have Y and C interleaved, so storing of twice the number of columns of M is awaited.

The horizontal analysis filter unit 11 immediately performs horizontal analysis filtering at the point that M columns worth of Y signals are accumulated in the built-in memory. That is to say, the horizontal analysis filter unit 11 sequentially reads out the M columns worth (e.g., M=3 in the case of FIG. 3) of Y from the built-in memory, and performs Y horizontal direction lowband analysis filtering and highband analysis filtering. The Y lowband components and highband components which are the results of the horizontal analysis filtering are interleaved, and stored in the level 1 buffer 12. The Y lowband components and highband components which are stored in the level 1 buffer 12 are read out and input to the Y vertical analysis filter unit 17 at the point that the number of lines reaches N lines.

Figure 14:
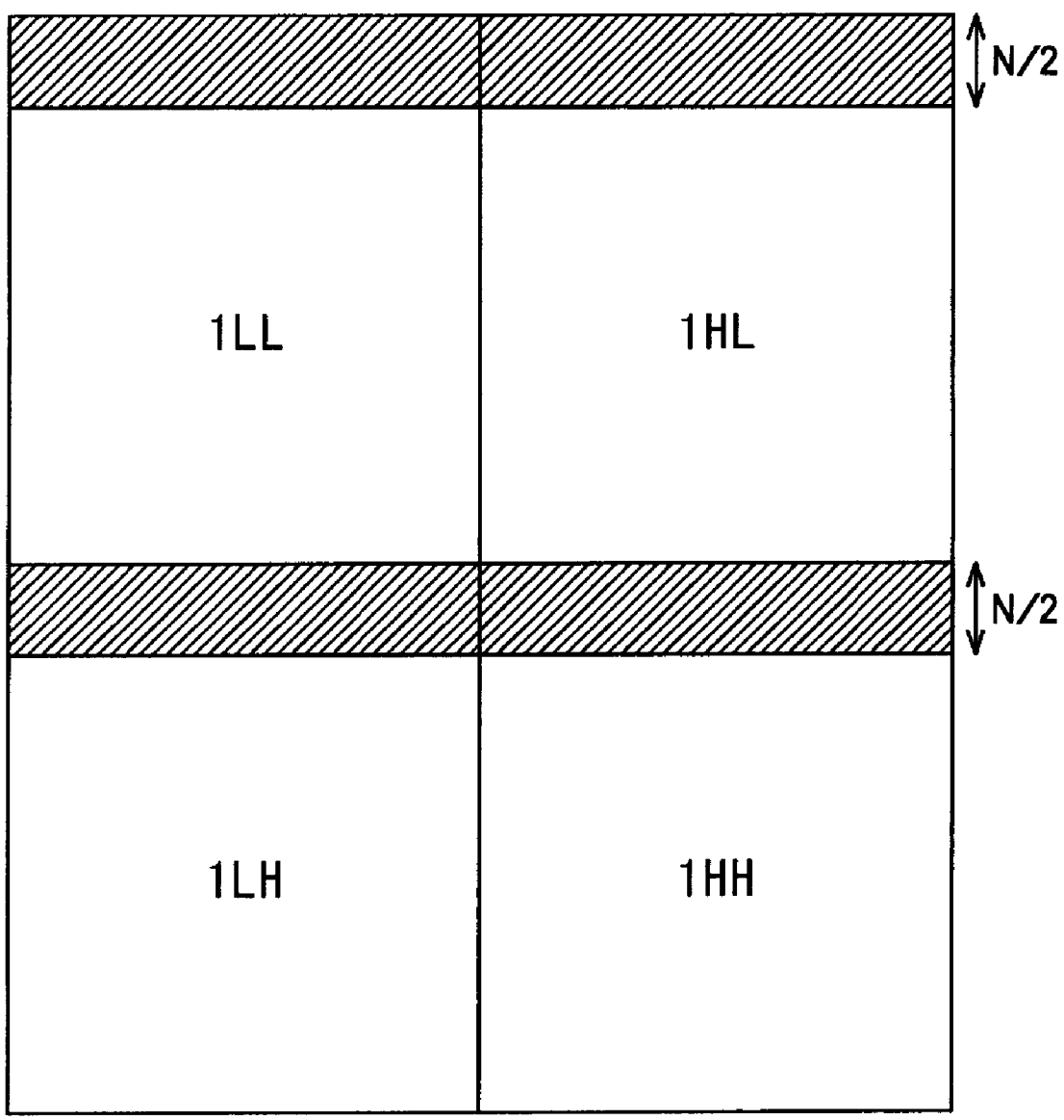
FIG. 14 is a diagram for describing vertical filtering in division level 1 analysis filtering.

The Y vertical analysis filter unit 17 immediately performs vertical direction lowband analysis filtering and highband analysis filtering at the point that N lines worth (e.g., N=3 in the case of FIG. 4) of Y lowband and highband components are accumulated. The value of N corresponds to the number of taps for vertical analysis filtering, and the greater the number of taps is, the greater the value of N is, accordingly. As shown in FIGS. 13 and 14, this Y vertical analysis filtering generates, as the results of the vertical analysis filtering, lowband components (1LL) D19, and highband components (1HL, 1LH, 1HH) D23.

Now, while description will be omitted, following the Y horizontal analysis filtering, the horizontal analysis filter unit 11 performs C horizontal analysis filtering while shifting position in the same way as the Y horizontal analysis filtering, and the C vertical analysis filter unit 18 performs C vertical analysis filtering on the results of horizontal analysis filtering in the same way as with the Y vertical analysis filtering, in parallel to the processing of the Y vertical analysis filter unit 17, thereby generating the lowband components (1LL) D20 and highband components (1HL, 1LH, 1HH) D24 which are the C vertical analysis filtering results.

Following the vertical analysis filtering, The Y lowband components D19 and the C lowband components D20 are interleaved at the interleaving unit 19, and at the point that as many columns as necessary to enable horizontal direction analysis filtering of the lowband components D21 wherein Y and C have been interleaved are accumulated in the memory of the interleaving unit 19, the horizontal analysis filter unit 20 immediately performs division level 2 horizontal analysis filtering. The reason that the lowband components are repeatedly analyzed in this way is that the greater portion of energy of image signals are concentrated in the lowband components.

The horizontal analysis filter unit 20 sequentially reads out M columns from the internal memory, and performs Y horizontal direction lowband analysis filtering and highband analysis filtering, as the division level 2 horizontal analysis filtering. The Y lowband components and highband components which are the results of the horizontal analysis filtering are interleaved, and stored in the level 2 buffer 13. While description will be omitted here, this is also true for C.

Figure 15:
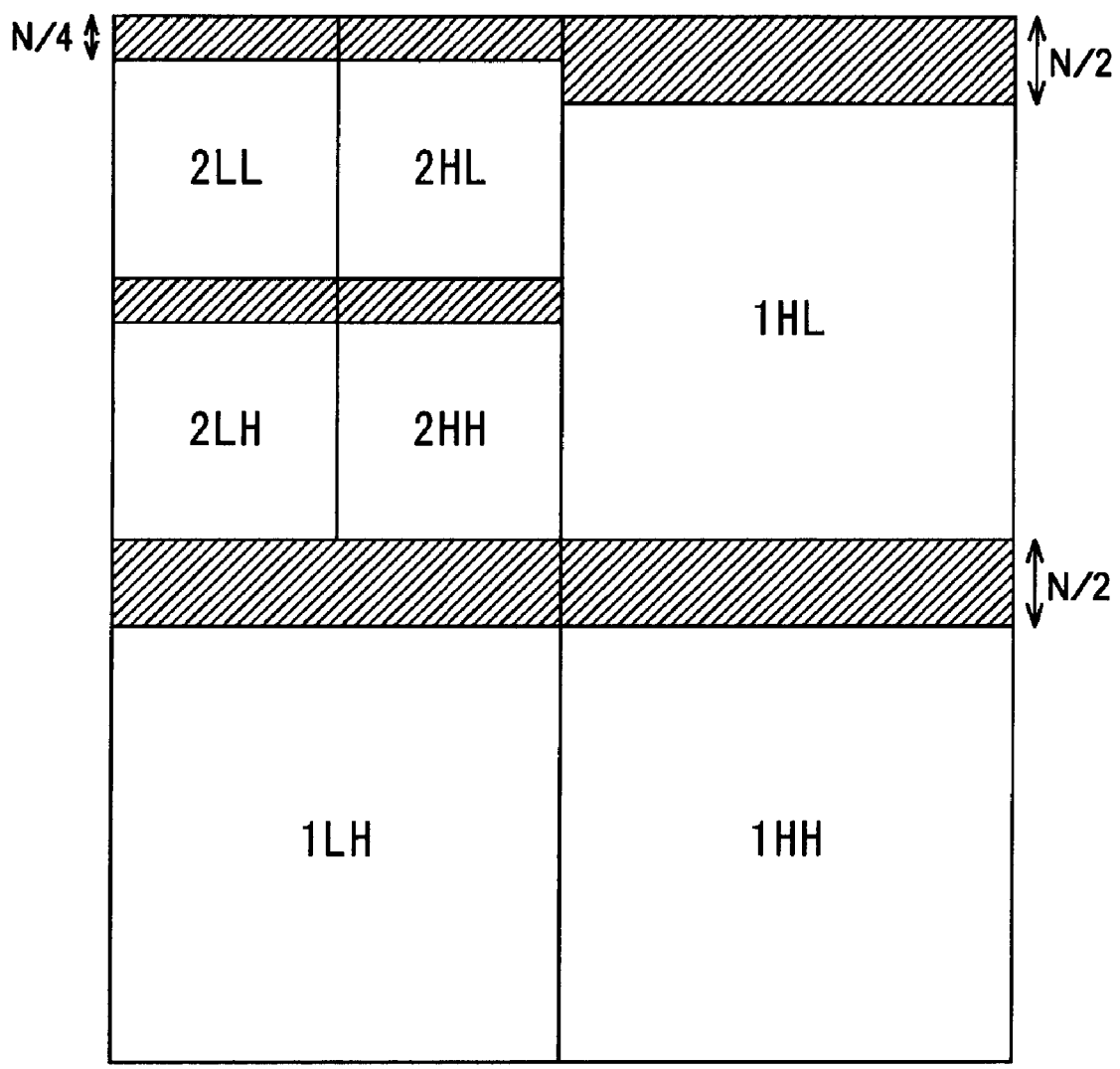
FIG. 15 is a diagram illustrating the results of performing analysis filtering to division level 2.

The vertical analysis filter unit 18 immediately performs Y vertical direction lowband analysis filtering and highband analysis filtering at the point that N/2 lines worth of lowband and highband components are accumulated at the level 2 buffer 13, as shown in FIG. 14. As shown in FIG. 15, this vertical filtering generates lowband components (2LL) and highband components (2HL, 2LH, 2HH). That is to say, in the example shown in FIG. 15, the frequency components of the division level 1 1LL are divided into the four frequency components of 2LL, 2HL, 2LH, AND 2HH.

As described above, wavelet transformation which is repeatedly performed unit a predetermined division level is repeatedly performed while inputting subsequently video signals to the end of one picture of video signals, whereby one image is subjected to band division to a predetermined division level.

Figure 16:
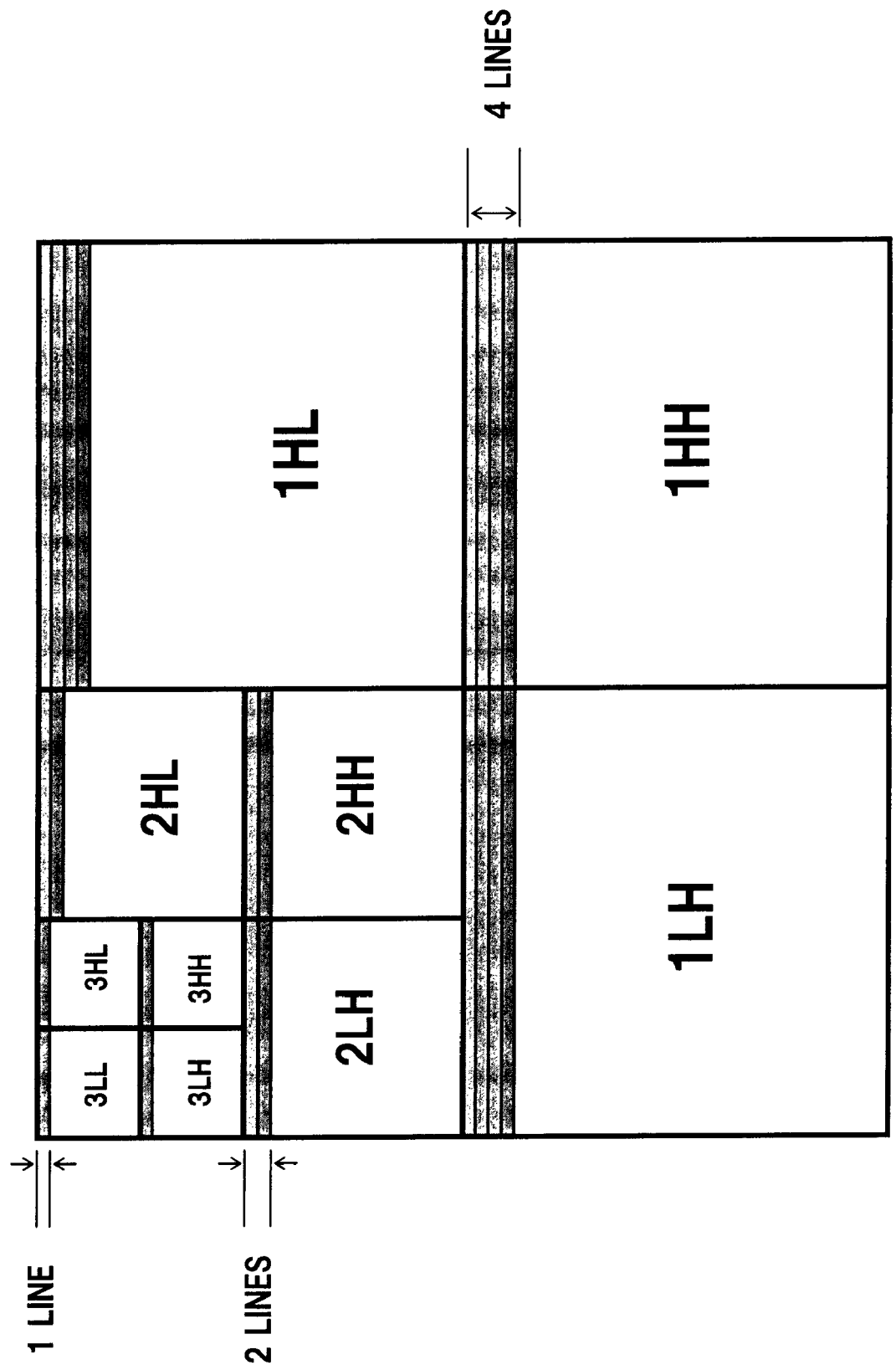
FIG. 16 is a diagram illustrating the results of performing analysis filtering to division level 3 with an actual image.

In the event of further increasing the number of division levels, analysis filtering can be repeatedly performed on the lowband components. FIG. 16 is a diagram illustrating an example wherein an actual image has been divided to division level 3 by analysis filtering wherein N=4.

That is to say, with this image, in the division level 1 vertical analysis filtering, as soon as four lines worth of frequency components are accumulated, vertical analysis filtering is performed; in the division level 2 vertical analysis filtering, as soon as two lines worth of frequency components are accumulated, vertical analysis filtering is performed; and in the division level 3 vertical analysis filtering, as soon as one line worth of frequency components are accumulated, vertical analysis filtering is performed; whereby it can be understood that division has been performed to division level 3.

As described above, analysis filtering is performed as soon as a predetermined number of columns or a predetermined number of lines worth of frequency components are accumulated, so analysis filtering of video pictures of one picture worth can be effectively performed. That is to say, wavelet transformation can be performed at high speed.

Also, performing analysis filtering for obtaining coefficient data for at least one line of lowband components, multiple times in stages for all lines of the entire screen, enables decoded image to be obtained with little delay in a system wherein, for example, post-wavelet-transformation frequency components are encoded and transferred, and decoded, as described later with reference to FIG. 28.

Also, analysis filtering performed on video signals as described above is performed in increments of pictures (fields or frames) making up video signals, so there is the need to detect the end of a picture, and stop and reset the analysis filtering operations. In this case, while illustrating in the drawings will be omitted, the wavelet transformation device 1 is configured having a vertical synchronizing signal detecting unit built in for detecting vertical synchronizing signals in the video signals, provided to the interleaving unit 10, for example.

Figure 17:
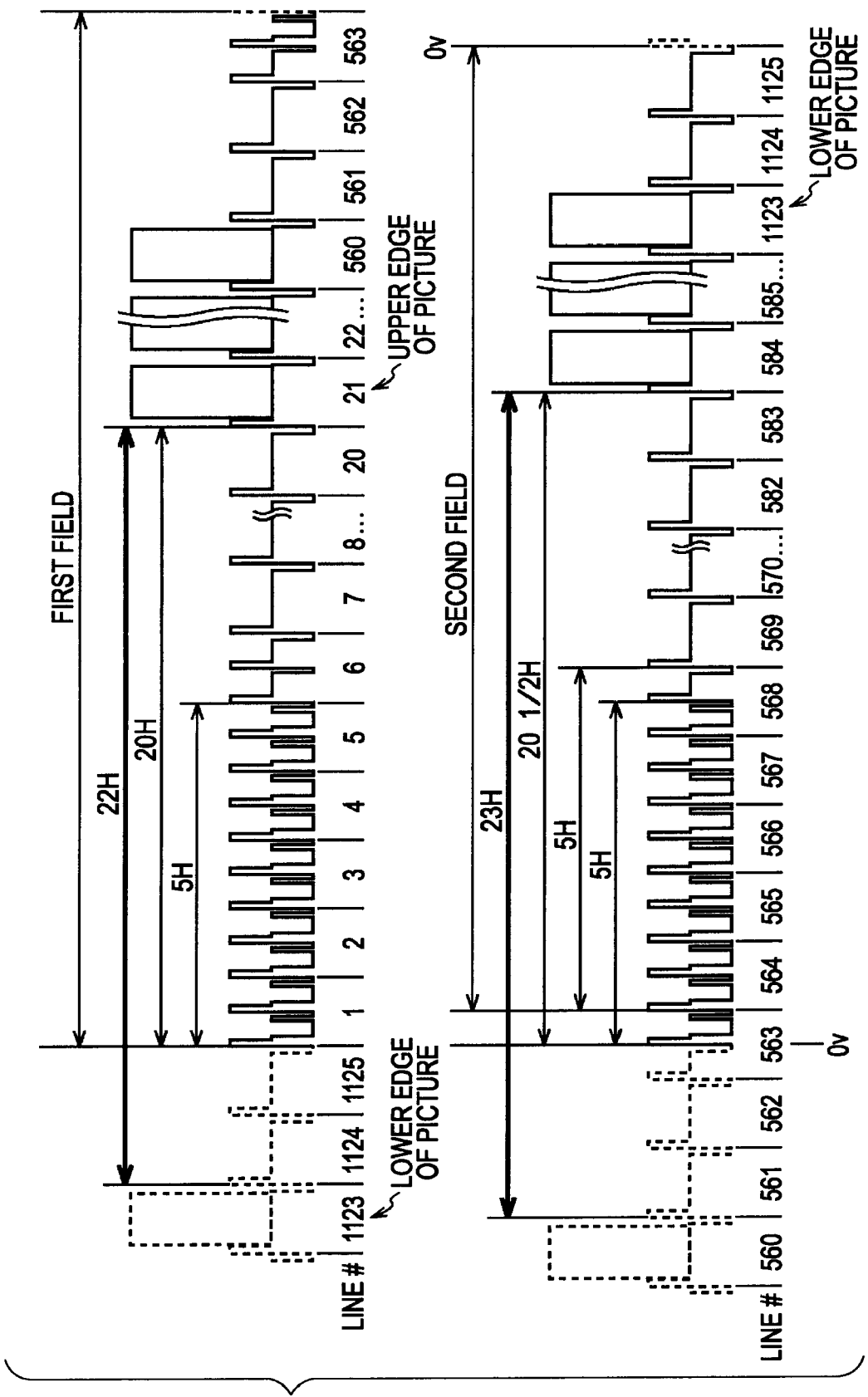
FIG. 17 is a diagram for describing vertical synchronizing signals in video signals.

FIG. 17 is a signal distribution diagram of SMPTE274M standard interlaced signals. The upper half shows the first field, and the lower half shows the second field. There are 22 lines worth of vertical synchronizing signals are at the front of the first field, and 23 lines worth of vertical synchronizing signals are at the front of the second field.

Accordingly, the wavelet transformation device 1 has a vertical synchronizing signal detecting unit for detecting vertical synchronizing signals in the video signals, built in a the interleaving unit 10 for example, and detects the vertical synchronizing signals with the built-in vertical synchronizing signal detecting unit.

Thus, the end of a picture can be readily detected, and analysis filtering operations can be stopped upon detection. That is to say, analysis filtering can be performed on video signals in increments of pictures (fields or frames) making up the video signals.

Figure 18:
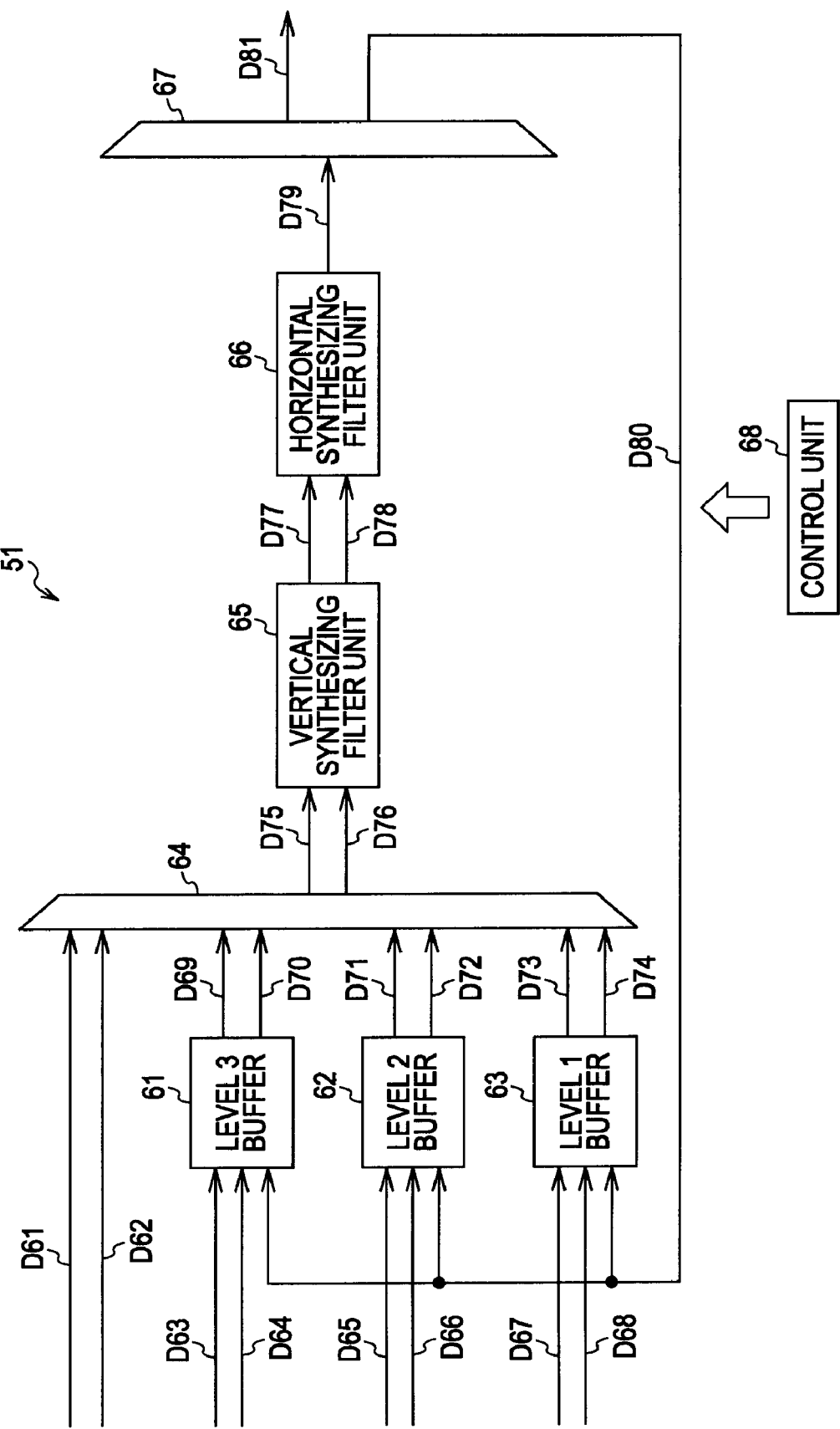
FIG. 18 is diagram illustrating a configuration example relating to a wavelet inverse transformation device corresponding to the wavelet transformation device shown in FIG. 1.

FIG. 18 is a diagram illustrating a configuration example of an embodiment of a wavelet inverse transformation device corresponding to the wavelet transformation device shown in FIG. 1. The wavelet inverse transformation device 51 is a band synthesizing device which takes frequency components obtained by image signals being subjected to wavelet transformation and divided to a predetermined level (in the case shown in FIG. 18, division level 4) by the wavelet transformation device 1 shown in FIG. 1. Of course, if the number of wavelet transformation division levels differs, wavelet inverse transformation is performed corresponding to the number of division levels.

The wavelet inverse transformation device 51 shown in FIG. 18 is configured of a level 3 buffer 61, level 2 buffer 62, level 1 buffer 63, selector 64, vertical synthesizing filter unit 65, horizontal synthesizing filter unit 66, selector 67, and control unit 68. That is to say, the wavelet inverse transformation device 51 has buffers (level 3 buffer 61 through level 1 buffer 63) independent for each level other than the lowest band level (division level 4).

The division level 4 frequency components (4LH, 4HH) D61 and division level 4 frequency components (4LL, 4HL) D62 are input to the selector 64 from an unshown external source (e.g., from a digital decoding unit 313 shown in FIG. 28, which will be described later). The division level 3 frequency components (3LH, 3HH) D63 and division level 3 frequency components (3HL) D64 are input to the level 3 buffer 61. The division level 2 frequency components (2LH, 2HH) D65 and division level 2 frequency components (2HL) D66 are input to the level 2 buffer 62. The division level 1 frequency components (1LH, 1HH) D67 and division level 1 frequency components (1HL) D68 are input to the level 1 buffer 63.

The level 3 buffer 61 stores and holds the coefficient (3LL) D80 of the division level 3 lowband components obtained as a result of horizontal synthesizing filtering performed on the vertical synthesizing filtering results of the division level 4, and the externally obtained division level 3 frequency components (3LH, 3HH) D63 and division level 3 frequency components (3HL) D64. The division level 3 lowband component coefficient (3LL) D80 and the division level 3 frequency components (3HL) D64 are combined at the level 3 buffer 61, and output from the level 3 buffer 61 as division level 3 frequency components (3LL, 3HL) D70, with the division level 3 frequency components (3LH, 3HH) D63 being output from the level 3 buffer 61 as division level 3 frequency components (3LH, 3HH) D69 without change.

The level 2 buffer 62 stores and holds the division level 2 lowband components (2LL) D80 obtained as a result of horizontal synthesizing filtering performed on the vertical synthesizing filtering results of the division level 3, and the externally obtained division level 2 frequency components (2LH, 2HH) D65 and division level 2 frequency components (2HL) D66. The division level 2 lowband components (2LL) D80 and the frequency components (2HL) D66 are combined at the level 2 buffer 62, and output from the level 2 buffer 62 as division level 2 frequency components (2LL, 2HL) D72, with the division level 2 frequency components (2LH, 2HH) D65 being output from the level 2 buffer 62 as division level 2 frequency components (2LH, 2HH) D71 without change.

The level 1 buffer 63 stores and holds the division level 1 lowband components (1LL) D80 obtained as a result of horizontal synthesizing filtering performed on the vertical synthesizing filtering results of the division level 2, and the externally obtained division level 1 frequency components (1LH, 1HH) D67 and division level 1 frequency components (1HL) D68. The division level 1 lowband component coefficient (1LL) D80 and the frequency components (1HL) D68 are combined at the level 1 buffer 63, and output from the level 1 buffer 63 as division level 1 frequency components (1LL, 1HL) D74, with the division level 1 frequency components (1LH, 1HH) D67 being output from the level 1 buffer 63 as division level 1 frequency components (1LH, 2HH) D73 without change.

Under control of the vertical synthesizing filter unit 65, the selector 64 selects from an external source and from the level 3 buffer 61 through level 1 buffer 63, the external source or the output of the corresponding division level buffer, and outputs the selected output to the vertical analysis filter unit 65 as frequency components (LH, HH) D75 and frequency components (LL, HL) D76.

The vertical synthesizing filter unit 65 refers to coefficients at the same position in both the frequency components LL and frequency components LH having the horizontal direction band L in common, collects a predetermined number in the vertical direction (a number whereby vertical synthesizing filtering can be executed), and performs vertical synthesizing filtering. In the same way, the vertical synthesizing filter unit 65 refers to coefficients at the same position in both the frequency components HL and frequency components HH having the horizontal direction band H in common, collects a predetermined number in the vertical direction (a number whereby vertical synthesizing filtering can be executed), and performs vertical synthesizing filtering. The horizontal direction lowband (L) component D77 and horizontal direction highband (H) component D78 generated as a result of the vertical synthesizing filtering are output to the horizontal synthesizing filter unit 66.

The horizontal synthesizing filter unit 66 refers to coefficients at the same position in the horizontal direction lowband (L) component D77 and horizontal direction highband (H) component D78, collects a predetermined number in the horizontal direction (a number whereby horizontal synthesizing filtering can be executed), and performs horizontal synthesizing filtering. Consequently, lowband components lines are generated in order from the top line of the image, and the generated lowband component (or image) D79 is output to the selector 67.

Under control of the control unit 68, in the event of proceeding to the next division level the selector 67 outputs the lowband components D80 to the buffer side of the level corresponding to the next division level, so as to store in the buffer of the level corresponding to the next division level, and in the event that wavelet inverse transformation has ended as far as the initial division level in the wavelet transformation (i.e., the division level 1), the baseband image D81 is externally output.

The control unit 68 is configured of a microcomputer or the like including, for example, a CPU, ROM, and RAM, and controls the processing of the units of the wavelet inverse transformation device 51 by executing various types of programs.

Note that while the wavelet transformation device 1 shown in FIG. 1 performs horizontal analysis filtering with Y and C interleaved, the wavelet inverse transformation device 51 shown in FIG. 18 performs processing with Y and C completely separated. That is to say, the wavelet inverse transformation device 51 actually has two separate configurations shown in FIG. 18, one each for Y and C.

The reason that the wavelet inverse transformation device 51 does not interleave Y and C as with the wavelet transformation device 1 is that the vertical analysis filtering is first performed, following which horizontal analysis filtering is performed. That is to say, as described above with reference to FIG. 8, the vertical analysis filtering requires an extra line buffer and also takes more processing time.

Figure 19:
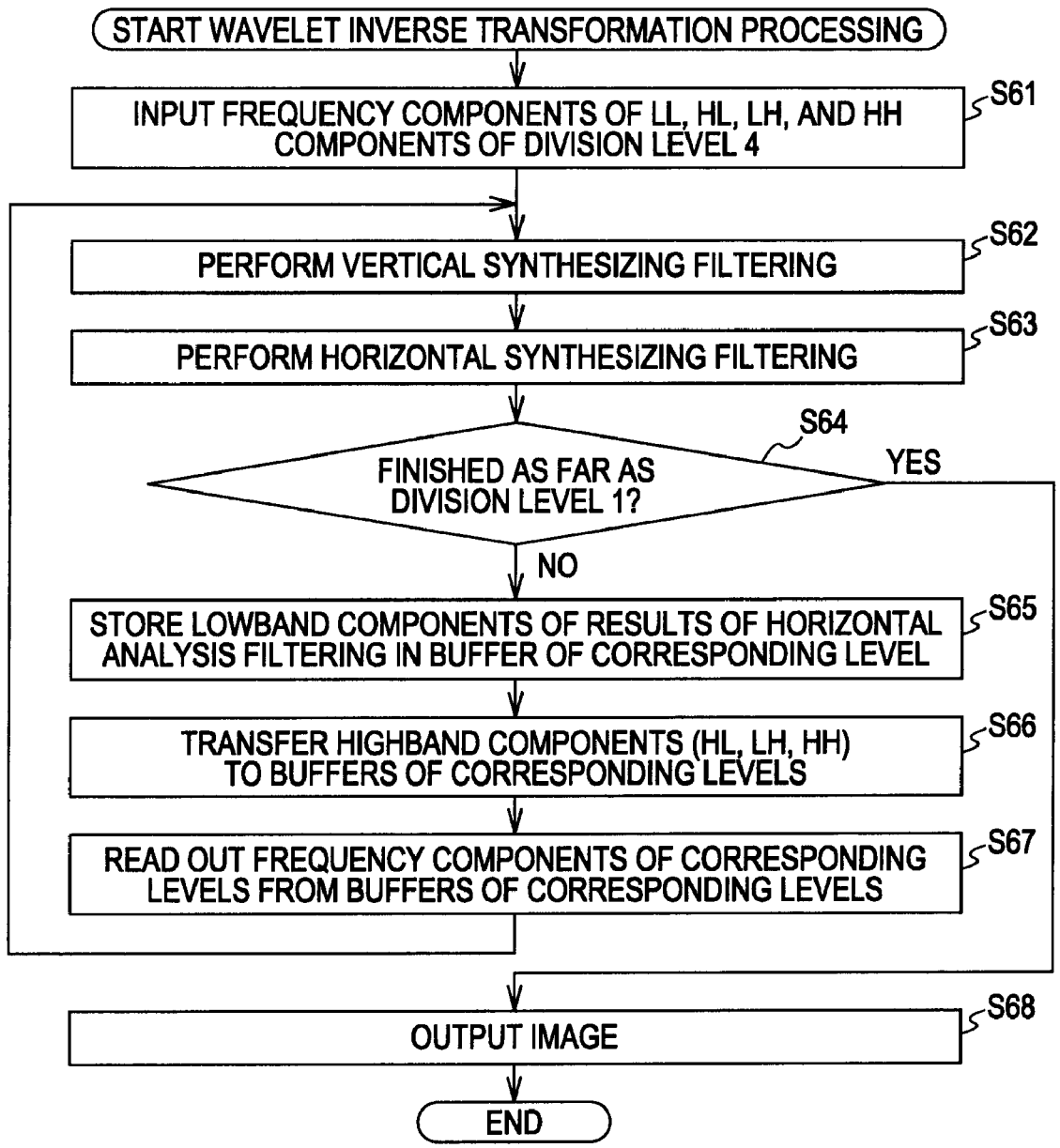
FIG. 19 is a flowchart for describing wavelet inverse transformation processing of the wavelet inverse transformation device shown in FIG. 18.

Next, the operations of the wavelet inverse transformation device 51 shown in FIG. 18 will be described with reference to the flowchart in FIG. 19. That is to say, FIG. 19 illustrates the wavelet inverse transformation processing executed by the wavelet inverse transformation device 51, in which wavelet inverse transformation processing inverse transformation is performed from the lowband component with the smallest resolution in order to the highband components. In terms of division levels, this is executed in the order of level 4, level 3, level 2, and level 1. Note that in FIG. 19, description is made without specifying either Y or C, but in reality, the processing of FIG. 19 is performed separately and in parallel for Y and C.

In step S61, the selector 64 externally inputs division level 4 frequency components (4LH, 4HH) D61 and division level 4 frequency components (4LL, 4HL) D62. The selector 64 then selects, under control of the vertical analyzing filter unit 65, output from this external source, and outputs the selected output (division level 4 frequency components (4LH, 4HH) D61 and division level 4 frequency components (4LL, 4HL) D62) to the vertical analysis filter unit 65 as frequency components (4LH, 4HH) D75 and frequency components (4LL, 4HL) D76.

In step S62, the vertical synthesizing filter unit 65 performs division level 4 vertical synthesizing filtering on the frequency components (4LH, 4HH) D75 and frequency components (4LL, 4HL) D76.

Figure 20:
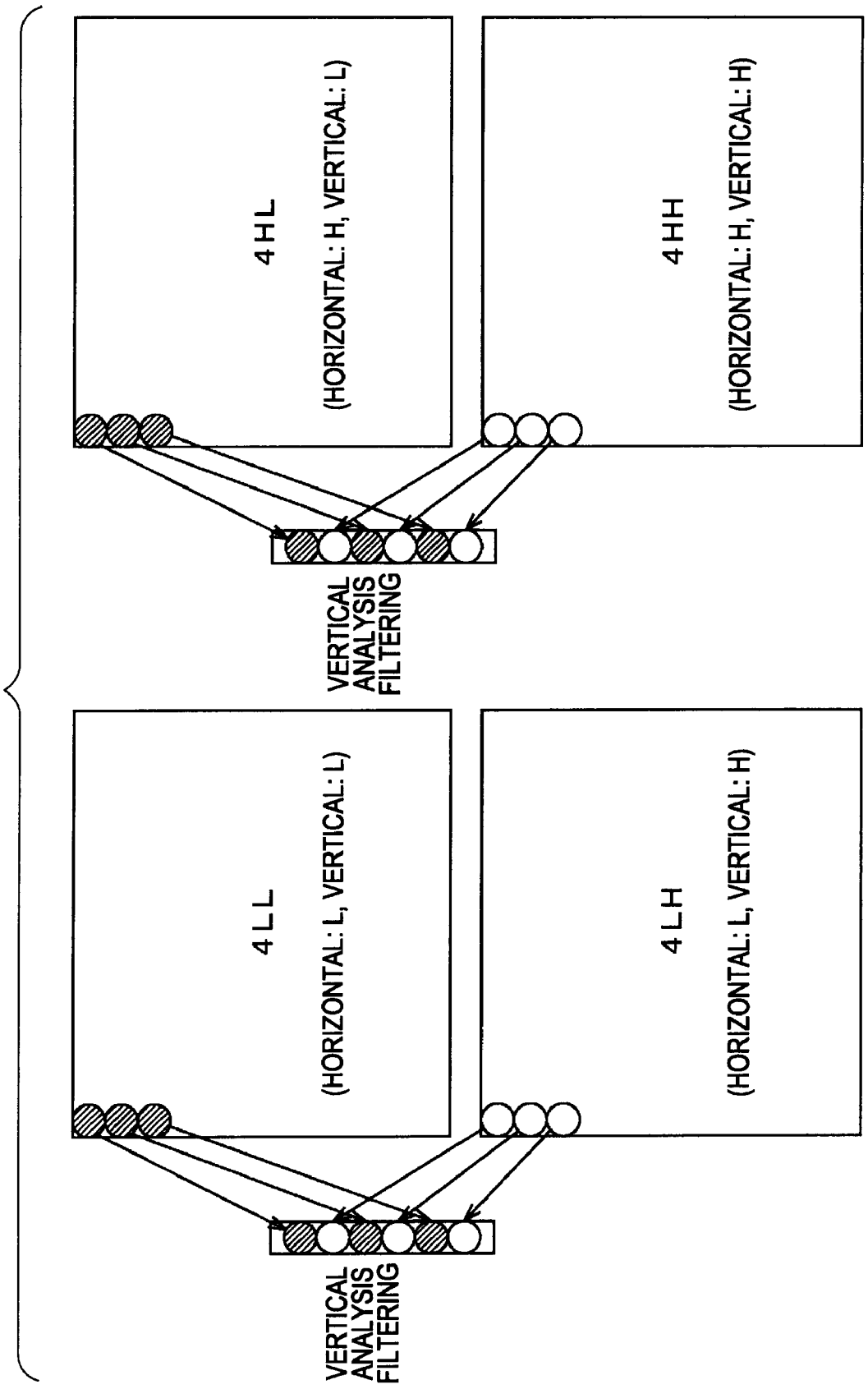
FIG. 20 is a diagram for describing vertical synthesizing filtering.

That is, as shown in FIG. 20, the vertical synthesizing filter unit 65 references coefficients (indicted by circles in the drawing) at the same position for both the frequency components 4LL having a horizontal direction band of L and vertical direction band of L, and frequency components 4LH having a horizontal direction band of L and vertical direction band of H (both having a horizontal direction band of L), collects a predetermined number in the vertical direction whereby vertical synthesizing filtering can be performed (six in the case of FIG. 20), and performs vertical synthesizing filtering.

Also, the vertical synthesizing filter unit 65 references coefficients (indicted by circles in the drawing) at the same position for both the frequency components 4HL having a horizontal direction band of H and vertical direction band of L, and frequency components 4HH having a horizontal direction band of H and vertical direction band of H (both having a horizontal direction band of H), collects a predetermined number in the vertical direction whereby vertical synthesizing filtering can be performed (six in the case of FIG. 20), and performs vertical synthesizing filtering.

In the example shown in FIG. 20, an example is illustrated wherein vertical synthesizing filtering is performed using three coefficients of the frequency components 4LL and three coefficients at the same position as the three coefficients of the frequency components 4LL at the frequency components 4HL, and an example wherein vertical synthesizing filtering is performed using the three coefficients of the frequency components of 4HL and three coefficients of the frequency components 4HH at the same positions as the frequency components 4HL.

Consequently, horizontal direction lowband (L) components D77 and horizontal direction highband (H) components D78 are generated, and output to the horizontal synthesizing filter unit 66.

In step S63, the horizontal synthesizing filter unit 66 performs division level 4 horizontal synthesizing filtering on the horizontal direction lowband (L) components D77 and horizontal direction highband (H) components D78.

Figure 21:
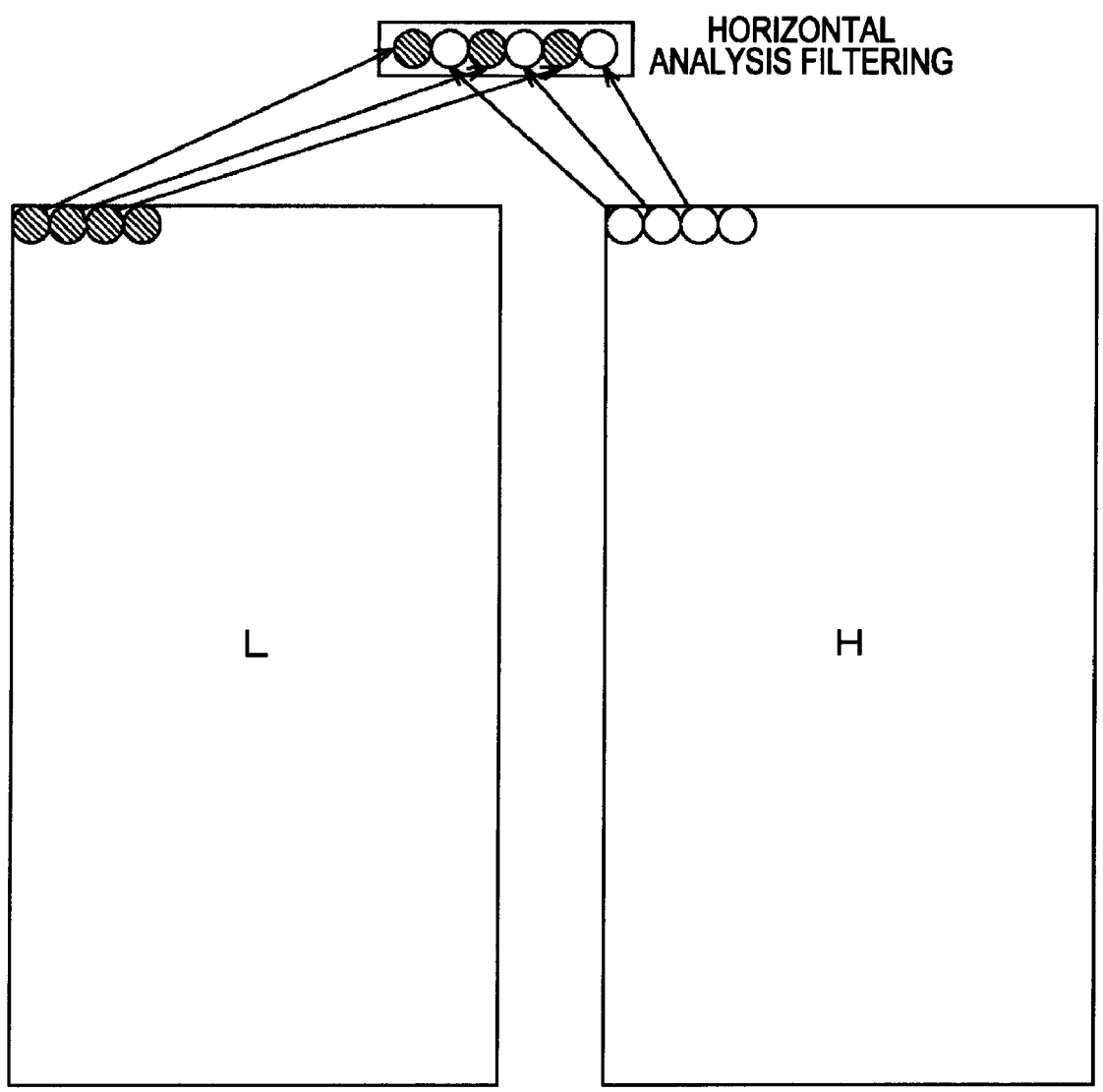
FIG. 21 is a diagram for describing horizontal synthesizing filtering.

That is, as shown in FIG. 21, the horizontal synthesizing filter unit 66 references coefficients (indicted by circles in the drawing) at the same position for the horizontal direction lowband (L) components D77 and horizontal direction highband (H) components D78, collects a predetermined number in the horizontal direction whereby horizontal synthesizing filtering can be performed (six in the case of FIG. 21), and performs horizontal synthesizing filtering.

In the example shown in FIG. 21, an example is illustrated wherein horizontal synthesizing filtering is performed using three lowband component coefficients and three coefficients in the highband components which are at the same position as the three lowband component coefficients.

Figure 22:
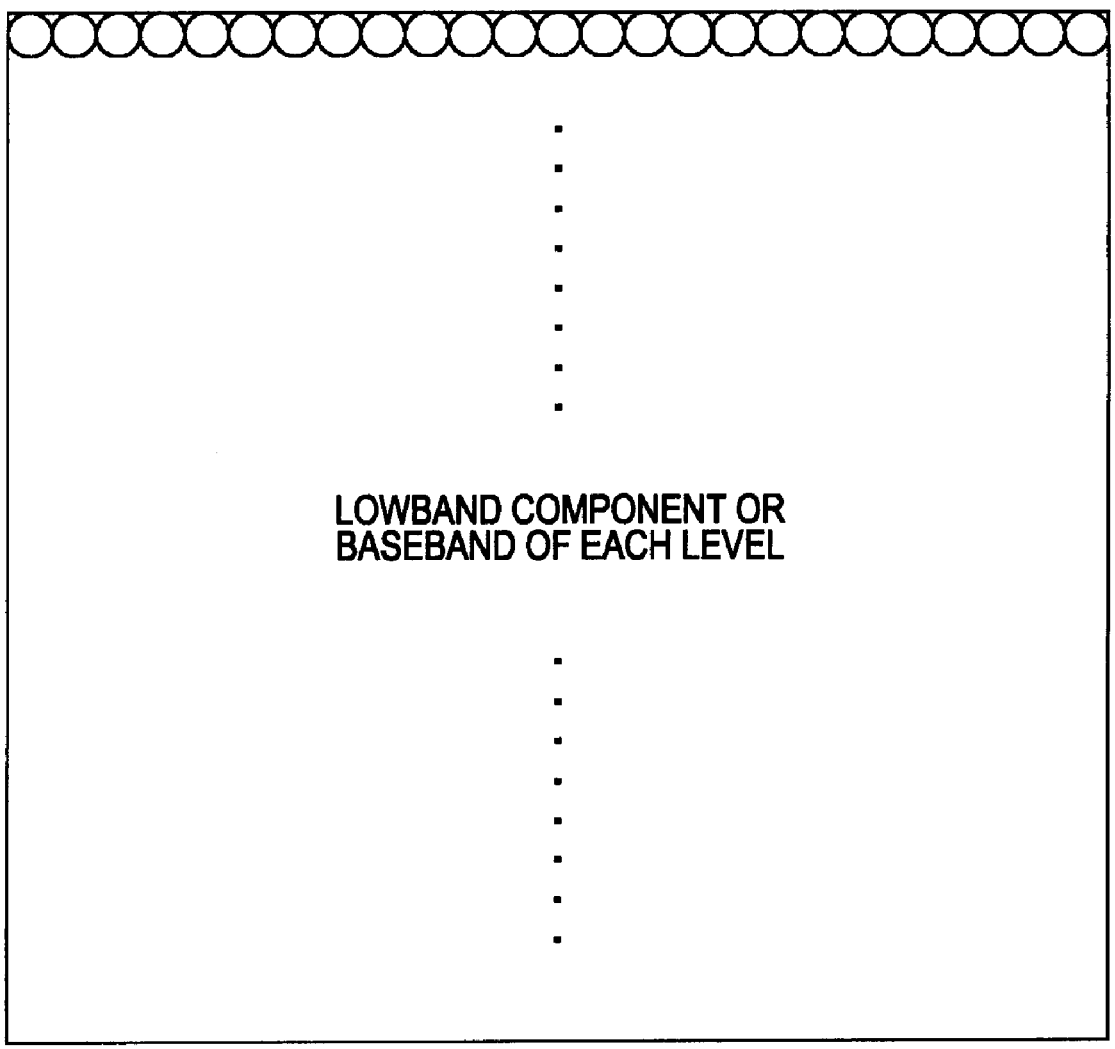
FIG. 22 is a diagram illustrating the results of performing synthesizing filtering.

Consequently, as shown in FIG. 22, a line of lowband components is generated in order from the top of the image, thereby generating division level 3 lowband components (3LL) D79, output to the selector 67. That is to say, the example in FIG. 22 shows a baseband image or lowband components of each level obtained as the result of lowband component lines being generated such that the first line of lowband components is generated in order from the top line of the image.

In step S64, the control unit 68 determines whether or not the wavelet inverse transformation has proceeded to the division level 1, which is the initial level for wavelet transformation (in other words, the final level for wavelet inverse transformation), and in the event that determination is made that the division level 1 is not ended, the processing advances to step S65.

In step S65, the control unit 68 controls the selector 67 so as to select output to the level 3 buffer 61, and stores the division level 3 lowband components (3LL) D80 obtained as the result of the horizontal synthesizing filtering, in the corresponding level buffer (in this case, the level 3 buffer 61).

In step S66, the control unit 68 transfers the division level 3 frequency components (3LH, 3HH) D63 from the external source and the division level 3 frequency components (3HL) D64 to the level 3 buffer 61, so as to be stored.

In step S67, the vertical analysis filter unit 65 controls the selector 64 so as to select output from the level 3 buffer 61, thereby reading out frequency components from the level 3 buffer 61, and the frequency components that have been read out are output to the vertical analysis filter unit 65 as frequency components (3LH, 3HH) D75 and frequency components (3LL, 3HL) D76.

That is to say, at the level 3 buffer 61, the division level 3 lowband components (3LL) D80 and the division level 3 frequency components (3HL) D64 are combined and output from the level 3 buffer 61 as division level 3 frequency components (3LL, 3HL) D70, and the division level 3 frequency components (3LH, 3HH) D63 are output from the level 3 buffer 61 as division level 3 frequency components (3LH, 3HH) D69, without change. Accordingly, division level 3 frequency components (3LL, 3HL) D70, and division level 3 frequency components (3LH, 3HH) D69, are each output to the vertical analysis filter unit 65 as frequency components (3LH, 3HH) D75 and frequency components (3LL, 3HL) D76.

Subsequently, the processing returns to step S62, and subsequent processing is repeated. That is to say, in step S62, division level 3 vertical synthesizing filtering is performed, in step S63, division level 3 horizontal synthesizing filtering is performed, and division level 2 lowband components (2LL) are generated.

In this case, in step S64 determination is made that the division level 1 has not yet ended, so the division level 2 lowband component (2LL) D80 obtained as the result of horizontal analysis filtering is stored in the corresponding level buffer (in this case, the level 2 buffer 62). In the same way, the division level 2 frequency components (2LH, 2HH) D65 and division level 2 frequency components (2HL) D66 from the external source are transferred to the level 3 buffer 61.

At this time, in the same way as with the case of the level 3 buffer 61, at the level 2 buffer 62 the division level 2 lowband components (2LL) D80 and the division level 2 frequency components (2HL) D64 are combined, and output from the level 2 buffer 62 as division level 2 frequency components (2LL, 2HL) D70, while the division level 2 frequency components (2LH, 2HH) D63 are output from the level 2 buffer 62 as division level 2 frequency components (2LH, 2HH) D69, without change.

The above series of processing is performed until the division level 1 frequency components are stored in the level 1 buffer 63 and read out. Subsequently, in step S62, division level 1 vertical synthesizing filtering is performed, and at step S63, division level 1 horizontal synthesizing filtering is performed. Consequently, a baseband image wherein synthesizing filtering has ended to division level 1 is generated, and in step S64, determination is made that through division level 1 has ended, so the flow proceeds to step S68, and in step S68 the baseband image D81 from the horizontal synthesizing filter unit 66 is output externally (e.g., to a later-described inverse quantization unit 162 shown in FIG. 26), via the selector 67.

As described above, the wavelet inverse transformation device 51 shown in FIG. 18 also is configured to be able to handle buffers for each division level other than the lowest band level with internal memory, so the horizontal synthesizing filtering results can be stored in buffers of each division level while performing the horizontal synthesizing filtering. Accordingly, vertical synthesizing filtering can be performed while reading out the results of the horizontal synthesizing filtering from the buffer of each division level. That is to say, horizontal direction and vertical direction filtering can be performed simultaneously in parallel.

Thus, wavelet transformation can be performed at high speed for moving images and images with high resolution, as well.

Also, internal memory handles the buffers for each division level other than the lowest band level, so there is no need to configure external memory as with known arrangements.

Accordingly, there is no need to exchange data with external memory, and wavelet inverse transformation can be performed at high speeds. Consequently, there is no need to raise the clock frequency in order to increase speed of data between the external memory and the wavelet inverse transformation device, thereby conserving electric power.

Further, with the wavelet inverse transformation device, Y and C are processed completely separately since vertical synthesizing filtering is performed before the horizontal synthesizing filtering, and accordingly as described above with reference to FIG. 8, necessity of an extra line buffer at the vertical synthesizing filtering is prevented, and also excess processing time can be suppressed.

While already described above with reference to FIG. 11 for the case of the wavelet transformation device, effective filtering can be performed for analyzing filtering by using the lifting technique. Accordingly, the lifting technique can be similarly used with the synthesizing filtering for wavelet inverse transformation as well.

Figure 23:
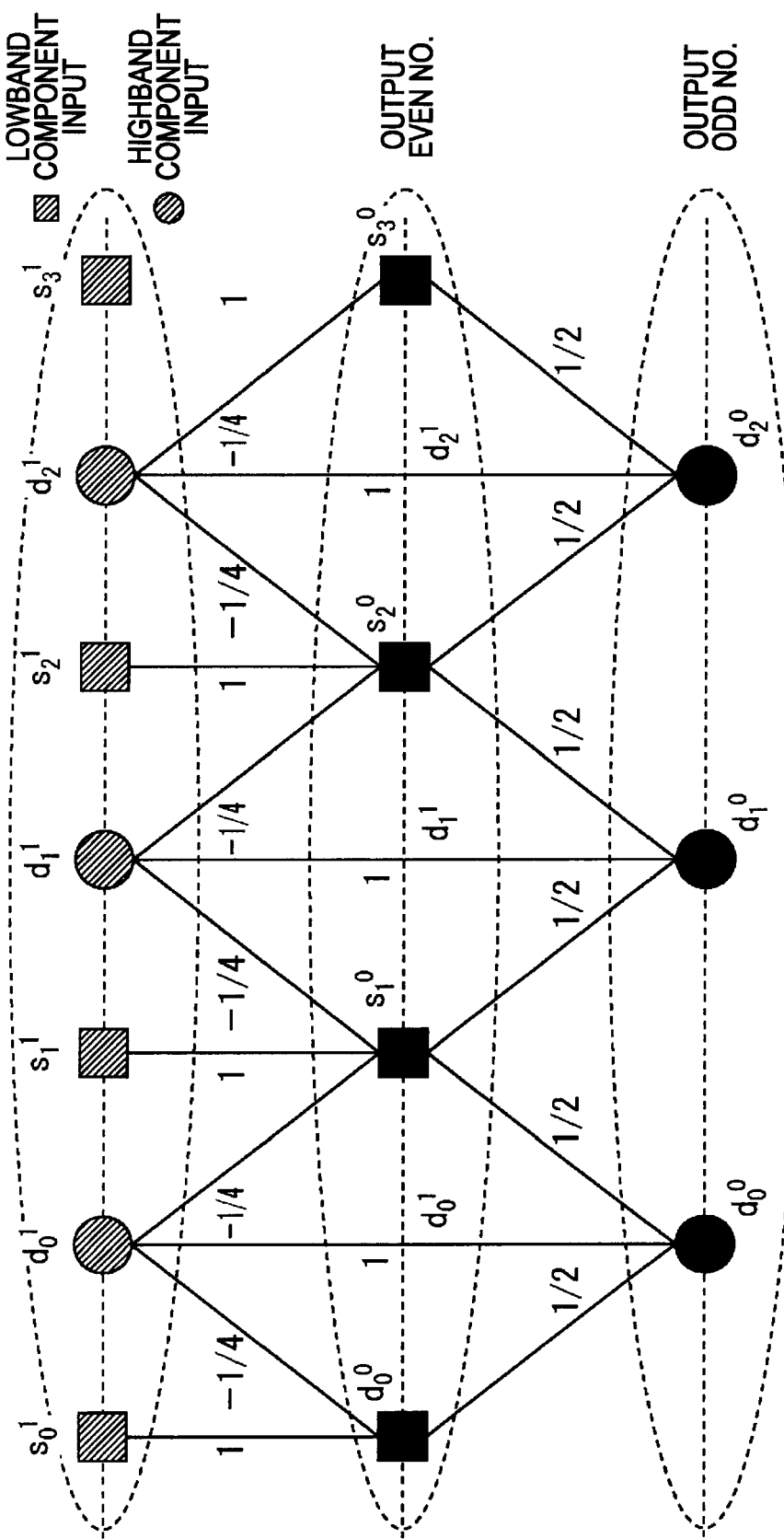
FIG. 23 is a diagram for describing another example of a lifting scheme with a 5×3 analysis filter.

FIG. 23 illustrates a lifting scheme of a 5×3 analysis filter used with the JPEG (Joint Photographic Experts Group) 2000 standard as well. Synthesizing lifting in a case of applying the lifting technique to this 5×3 analysis filter will be described.

In the example shown in FIG. 23, the top portion represents coefficients generated by wavelet transformation, with the solid circles representing highband component coefficients, and the solid squares representing lowband component coefficients.

As the first stage, even-numbered (starting from 0) coefficients are generated from the input lowband component and highband component coefficients, as shown in the following Expression (4).

$$\text{even-numbered coefficient } s_i^0 = s_i^1 - 1/4(d_{i-1}^1 + d_i^1) \quad (4)$$

Next, as the second stage, odd-numbered (starting from 0) coefficients are generated from the even-numbered coefficients generated at the first stage and the input highband component coefficients, as shown in the following Expression (5).

$$\text{odd-numbered coefficient } d_i^0 = d_i^1 + 1/2(s_i^0 + is_{+1}^0) \quad (5)$$

Thus, with synthesizing filtering, first the even-numbered coefficients are generated, following which odd-numbered coefficients are generated. The two types of filter banks used for the synthesizing filtering are of two taps in the same way as with that described above with FIG. 11, which is far shorter than the originally-necessary five taps, thereby markedly reducing the amount of calculations.

Also, while the above description has been made with reference to FIGS. 12 through 16 regarding an example of performing wavelet transformation on video signals which are moving images, there is also the need to perform wavelet inverse transformation at high speeds in cases of performing wavelet inverse transformation of frequency component coefficients generated (divided) by wavelet transformation in increments of pictures making up the video signals, as well.

Accordingly, as with the case of the Y vertical analysis filter unit 17 and C vertical analysis filter unit 18 in the wavelet transformation device 1, the vertical synthesizing filter unit 65 of the wavelet inverse transformation device 51 also performs vertical direction synthesizing filtering immediately at the point that a predetermined number of frequency component coefficients are accumulated in the vertical direction (i.e., as many as are necessary for executing the vertical synthesizing filtering).

Moreover, as with the case of the horizontal analysis filter unit 11 in the wavelet transformation device 1, the horizontal synthesizing filter unit 66 of the wavelet inverse transformation device 51 also performs horizontal direction synthesizing filtering immediately at the point that a predetermined number of frequency component coefficients are accumulated in the horizontal direction (i.e., as many as are necessary for executing the horizontal synthesizing filtering).

As described above, synthesizing filtering is performed as soon as a predetermined number of frequency component coefficients are accumulated in the vertical direction and in the horizontal direction, so synthesizing filtering of one picture of video signals can be effectively performed. That is to say, wavelet inverse transformation can be performed at high speed.

Further, description has been made above with reference to FIG. 17 regarding a case wherein, in the event of performing wavelet transformation of video signals which are moving images, with the wavelet transformation device 1 shown in FIG. 1, the end of a picture is detected by having an arrangement for detecting vertical synchronizing signals of video signals.

In the event of detecting the end of a picture as described in FIG. 17, and performing wavelet inverse transformation of frequency components generated by wavelet transformation in increments of pictures making up the video signals, an arrangement not shown in the drawings is provided downstream of the selector 67 of the wavelet inverse transformation device 51, as a vertical synchronizing signal insertion portion for inserting video vertical synchronizing signals after picture signals generated by wavelet inverse transformation (i.e., the above-described baseband image D81).

That is to say, a vertical synchronizing signal insertion portion is provided downstream of the selector 67 of the wavelet inverse transformation device 51, so as to insert video vertical synchronizing signals after picture signals, e.g., after the baseband image D81 from the selector 67, and the generated video signals are externally output.

Thus, continuously inserting video vertical synchronizing signals for subsequent pictures as well, enables generated video signals to be sequentially output. Accordingly, moving images can be reproduced.

As described above, with the wavelet transformation device of an embodiment of the invention, buffers are provided for each division level from level 1 to a predetermined number of levels, and the horizontal analysis filtering results are stored in each division level buffer while performing the horizontal analysis filtering, so vertical direction filtering can be performed while reading out the results of the horizontal analysis filtering from the buffer of each division level. That is to say, horizontal direction and vertical direction filtering can be performed simultaneously in parallel. That is to say, horizontal direction and vertical direction filtering can be performed simultaneously in parallel. Thus, wavelet transformation can be performed at high speed for moving images and images with high resolution, as well.

Also, internal memory handles the buffers for each division level from level 1 to a predetermined number of levels, so there is no need to exchange data with external memory, and wavelet transformation can be performed at high speeds. Consequently, there is no need to raise the clock frequency in order to increase speed of data between the external memory and the wavelet inverse transformation device, thereby conserving electric power.

Also, horizontal analysis filtering is performed on frequency components wherein Y and C have been interleaved, so a configuration can be made with just one horizontal analysis filter unit, which is a marked contribution to reduction in the scale of hardware.

Further, the highband components and lowband components which are the results of the horizontal analysis filtering are interleaved for each of Y and C, and stored in buffers of corresponding levels, Y and C being stored separately, so at the time of reading out, all that is necessary is to read out from the front of the buffer of that level, thereby simplifying control.

Also, vertical direction analysis filtering is performed separately for Y and C, so there is no need for the massive memory capacity which is necessary in the event of not performing the vertical direction analysis filtering separately for Y and C for example, and drastic increases in cost can be prevented. Further, the need for extra processing time can be prevented, as well.

On the other hand, with the wavelet inverse transformation device of an embodiment of the invention, buffers are provided for each division level except for the lowest level, and the horizontal synthesizing filtering results are stored in each division level buffer while performing the horizontal synthesizing filtering, so vertical direction filtering can be performed while reading out the results of the horizontal synthesizing filtering from the buffer of each division level. That is to say, horizontal direction and vertical direction filtering can be performed simultaneously in parallel. Thus, wavelet transformation can be performed at high speed for moving images and images with high resolution, as well.

Also, internal memory handles the buffers for each division level other than the lowest band level, so there is no need to configure external memory and there is no need to exchange data with external memory, and wavelet inverse transformation can be performed at high speeds. Consequently, there is no need to raise the clock frequency in order to increase speed of data between the external memory and the wavelet inverse transformation device, thereby conserving electric power.

Also, unlike wavelet transformation, Y and C are processed completely separately without interleaving Y and C, thereby preventing extra memory being necessary for C at the time of vertical synthesizing filtering, and also excess processing time can be suppressed.

Further, with the wavelet transformation device and wavelet inverse transformation device according to an embodiment of the present invention, analysis filtering and synthesizing filtering is performed as soon as a predetermined number of frequency component coefficients are accumulated, so analysis filtering and synthesizing filtering can be effectively performed. That is to say, wavelet transformation and wavelet inverse transformation can be performed at high speed, so as to be capable of handling wavelet transformation and wavelet inverse transformation of video signals input at 60 fields per second, which is each picture being input at 1/60 seconds.

Thus, parallel processing per line is enabled in a later-described transmission system including encoding processing using wavelet transformation and decoding processing using wavelet inverse transformation, thereby obtaining a decoded image with little delay.

Also, a vertical synchronizing signal detecting arrangement is provided to the wavelet transformation device according to an embodiment of the present invention, and a vertical synchronizing signal insertion arrangement is provided to the wavelet inverse transformation device according to an embodiment of the present invention, so analysis filtering can be performed on video signals in increments of pictures (fields or frames) making up the video signals.

The embodiment of the present invention as described above relates to a device or method for performing wavelet transformation of images or video signals, and also relates to a device or method for performing wavelet inverse transformation wherein synthesizing filtering of band divided information is performed so as to restore into images or video signals. Various applications can be conceived for such a device or method.

That is to say, description has been made above regarding the wavelet transformation device 1 which performs wavelet transformation of images of video signals to divide image signals and video signals into multiple frequency components, and also a wavelet inverse transformation device 51 for performing wavelet inverse transformation of the frequency components generated by the wavelet transformation device 1, but wavelet transformation is widely used as pre-processing for image compression. Accordingly, description will now be made regarding an image encoding device for performing compression encoding of frequency components generated by wavelet transformation (hereafter also referred to as "coefficient data"), and an image decoding device for decoding the coefficient data subjected to compression encoding by the image encoding device.

Figure 24:
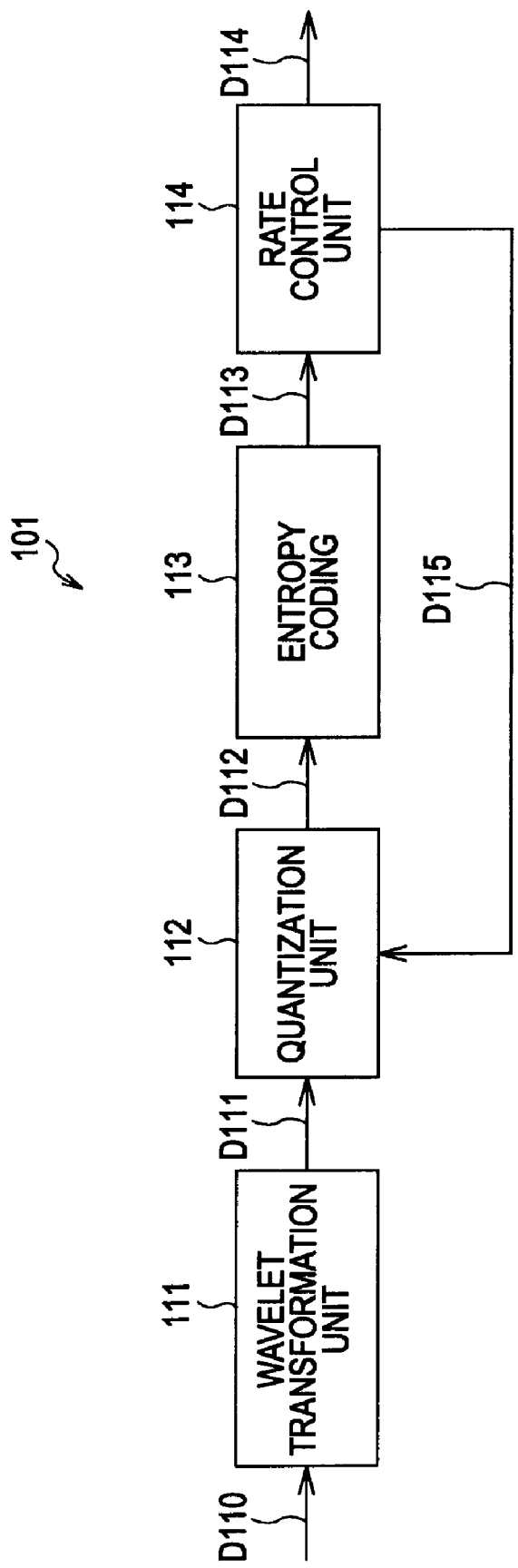
FIG. 24 is a diagram for illustrating a configuration example of an embodiment of an image encoding device to which an embodiment of the present invention has been applied.

FIG. 24 is a diagram illustrating a configuration example according to an embodiment of an image encoding device to which an embodiment of the present invention has been applied. With this image encoding device, wavelet transformation according to an embodiment of the present invention is performed as pre-processing for compression.

In the example shown in FIG. 24, the image encoding device 101 is configured of a wavelet transformation unit 111, a quantization unit 112, an entropy encoding unit 113, and a rate control unit 114.

The wavelet transformation unit 111 is configured basically in the same way as the wavelet transformation device 1 shown in FIG. 1. That is to say, the wavelet transformation device 111 has independent buffers for each division level (level 1 buffer 12 through level 4 buffer 15), wherein, at the point that input video signals D110 (equivalent to image signals D12 wherein Y and C are interleaved) being accumulated to a predetermined number of columns, horizontal analysis filtering is immediately performed on the video signals D110, and the coefficient data (frequency components) obtained as a result of the horizontal analysis filtering is stored in the buffers corresponding to each level. Upon the coefficient data which has been obtained as a result of the horizontal analysis filtering being accumulated to a predetermined number of lines in the buffers corresponding to each level, vertical analysis filtering is performed separately for Y and C as to the coefficient data, which is repeated to the predetermined division level, and the post-analysis coefficient data D111 is supplied to the quantization unit 112.

For example, with the division level 2 analysis filtering, as shown in FIG. 16, wavelet transformation is performed of the four lines of 1LL generated by division level 1 analysis filtering, thereby yielding the two lines of 2LL, 2HL, 2LH, and 2HH. At the division level 3 analysis filtering, two lines of 2LL are subjected to wavelet transformation, thereby yielding one line of 3LL, 3HL, 3LH, and 3HH. In the event that the division level 3 is the final analysis filtering, 3LL is the lowest band.

Note that as described above with reference to FIG. 17, when inputting video signals, detecting vertical synchronizing signals (i.e., picture end) in the video signals stops the analysis filtering operations at the end of the picture, with wavelet transformation being performed for each picture.

The quantization unit 112 quantizes the coefficient data D111 generated by the wavelet transformation unit 111, by dividing by a quantization step size for example, thereby generating quantized coefficient data D112.

At this time, the quantization unit 112 takes, as a line block, an increment configured of one line worth of the lowest band frequency component generated (3LL in the case in FIG. 16) and multiple lines of other frequency components necessary for generating that one line, and can set the quantization step size for each such line block. This line block comprehensively includes the coefficients of all frequency components for a certain image region (in the case of FIG. 16, the 10 frequency components of 3LL through 1HH), so performing quantization for each line block enables the feature of wavelet transformation, which is the advantage of multiple resolution analysis, to be utilized. Also, only the number of line blocks needs to be determined for the entire screen, reducing the load on the image encoding device 101.

Further, energy of image signals generally is concentrated at the lowband components, and also, deterioration in lowband components tends to be more conspicuous to human visual perception, so quantization can be advantageously weighted such that the quantization step sizes of lowband component sub-bands are ultimately smaller. This weighting appropriates a relatively greater amount of information to the lowband comments, consequently improving the overall impression of image quality.

The entropy encoding unit 113 performs source coding on the quantized coefficient data D112 generated at the quantization unit 112, thereby generating compressed encoded code stream data D113. As for source coding, Huffman coding used with JPEG or MPEG (Moving Picture Experts Group), or even higher-efficiency arithmetic coding used with JPEG 2000, can be used.

Now, coefficients of which range to apply the entropy encoding to is an extremely important issue, directly related to compression efficiency. With the JPEG and MPEG methods for example, DCT (Discrete Cosine Transform) is performed on blocks of 8×8, and Huffman encoding is performed on the generated 64 DCT coefficients, thereby compressing the information. That is to say, the 64 DCT coefficients is the range of entropy encoding.

With the wavelet transformation unit 111, wavelet transformation is performed in increments of lines, unlike DCT which is performed on blocks of 8×8, so at the entropy encoding unit 113, source coding is performed independently for each frequency band, and for each P line within each frequency band.

One line is the minimum for P, but the fewer number of lines, the less reference information is required, meaning that the memory capacity can be reduced that much. Conversely, the more lines there are, the more information amount there is accordingly, so encoding efficiency can be improved. However, in the event that P exceeds the number of lines of the line block within the frequency bands, this will require lines of the next line block. Accordingly, the processing will need to wait for quantization coefficient data for this line block to be generated by wavelet transformation and quantization, and this wait time will become delay time.

Accordingly, if reducing delay time is desired, there is the need to keep P within the number of lines of the line block. For example, in the case shown in FIG. 16, for the frequency bands of 3LL, 3HL, 3LH, and 3LL, the number of lines of the line blocks is 1, so P=1. Also, for the sub-bands of 2HL, 2LH, and 2HH, the number of lines of the line blocks is 2, so P=1 or 2.

The rate control unit 114 performs control for ultimately matching the target bit rate or compression rate, and externally outputs the post-rate-control encoded code stream D114. For example, the rate control unit 114 transmits control signals D115 to the quantization unit 112 so as to reduce the quantization step size in the event of raising the bit rate, and increase the quantization step size in the event of lowering the bit rate.

Figure 25:
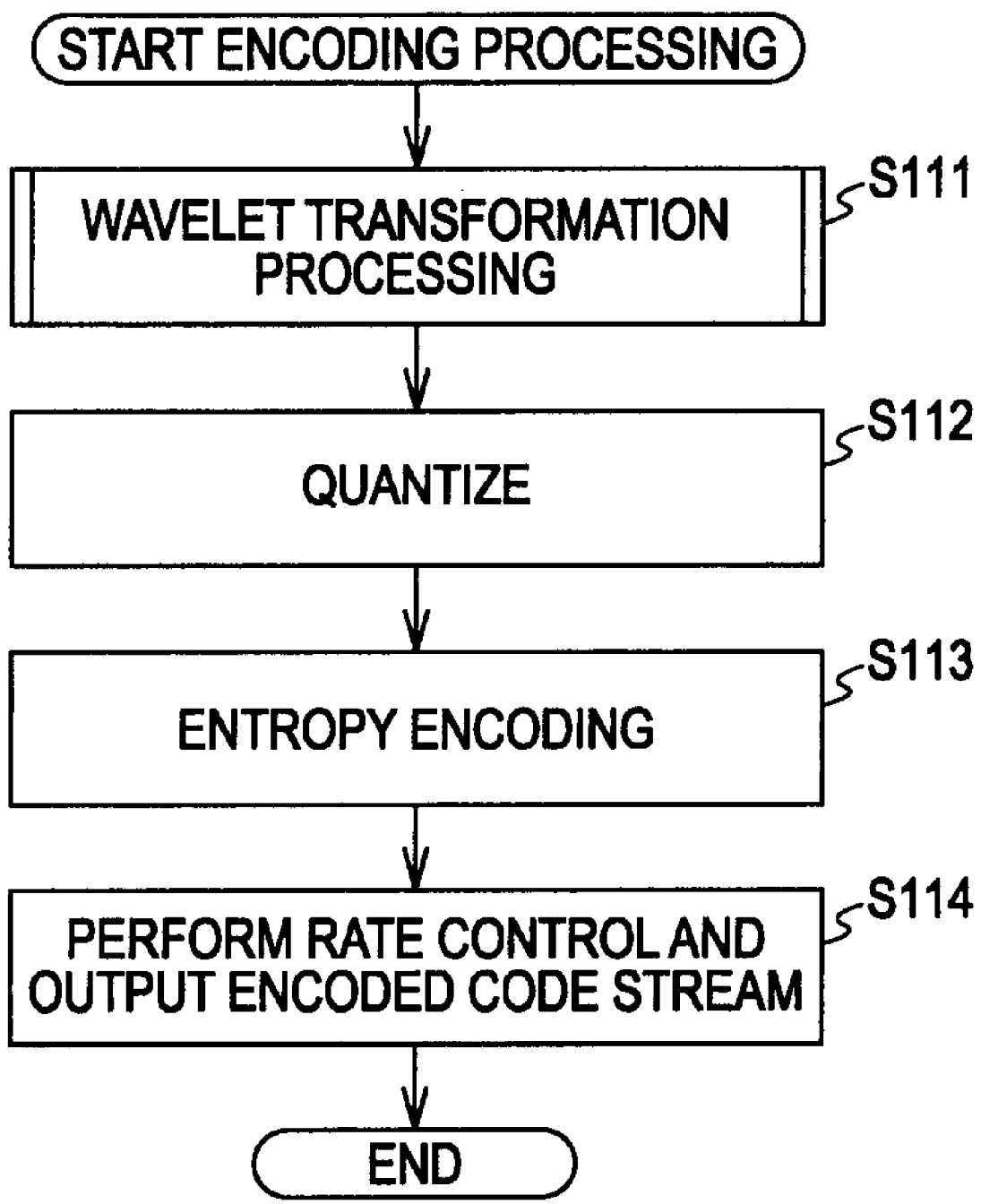
FIG. 25 is a flowchart for describing image encoding processing with the image encoding device shown in FIG. 24.

Next, the image encoding processing of the image encoding device 101 shown in FIG. 24 will be described with reference to the flowchart shown in FIG. 25.

Video signals D110 are input to the wavelet transformation unit 111 externally (e.g., from a later-described video camera unit 303 shown in FIG. 28). In step S111, the wavelet transformation unit 111 performs wavelet transformation processing on the image signals D110. Note that this wavelet transformation processing is processing which is performed for each picture from which a vertical synchronizing signal is detected form the video signals D110, in increments of lines, but the processing is generally the same as the wavelet transformation processing described above with reference to FIG. 2, so description thereof will be omitted.

With the wavelet transformation processing of step S111, at the point that input video signals D110 (equivalent to image signals D12 wherein Y and C have been interleaved) are accumulated to a predetermined number of columns, horizontal analysis filtering is immediately performed on the video signals D110, and the coefficient data (frequency components) obtained as a result of the horizontal analysis filtering is stored in the buffers corresponding to each level. Upon the coefficient data which has been obtained as a result of the horizontal analysis filtering being accumulated to a predetermined number of lines of the buffers corresponding to each level, vertical analysis filtering is immediately performed separately for Y and C as to the coefficient data, which is repeated to a predetermined division level, and the post-analysis coefficient data D111 is supplied to the quantization unit 112.

That is to say, as described above with reference to FIGS. 13 through 16, the wavelet transformation unit 111 performs filtering processing whereby coefficient data of one line of the lowest band can be obtained, multiple times in stages for all lines of the entire screen.

In step S112, the quantization unit 112 quantizes the coefficient data D111 generated by the wavelet transformation unit 111, by dividing by a quantization step size for example, thereby generating quantized coefficient data D112.

At this time, the quantization unit 112 takes, as a line block, an increment configured of one line worth of the lowest band frequency component generated (3LL in the case in FIG. 16) and multiple lines of other frequency components necessary for generating that one line, and sets the quantization step size for each such line block. That is to say, upon the predetermined number of lines being accumulated, the quantization unit 112 also performs quantization immediately, for each line block.

In step S113, the entropy coding unit 113 performs entropy encoding (source coding) of the quantization coefficient data D112 generated at the quantization unit 112, and generates a compressed encoded code stream D113.

Now, at the wavelet transformation unit 111, wavelet transformation is performed in increments of lines, so the entropy encoding unit 113 also performs source coding independently for each frequency band, and for each P line within each frequency band. That is to say, upon P lines (within the number of lines in a line block) being accumulated, the entropy encoding unit 113 also performs source coding immediately, for each line block.

In step S114, the rate control unit 114 performs rate control (i.e., control for ultimately matching the target bit rate or compression rate) and externally outputs the post-rate-control encoded code stream D114.

As described above, with the image encoding device, wavelet transformation is performed in increments of lines, quantization is performed in increments of line blocks, and source coding is performed for every P lines which is a number within the number of lines in a line block, and the encoded code stream D114 which has been encoded for each P line, is externally output. That is to say, wavelet transformation processing, quantization processing, and source coding processing, can be operated in parallel in predetermined increments of lines.

Accordingly, in the event that encoded data encoded by the information encoding device is transmitted for example, data encoded every P lines is sequentially transmitted, so a decoded image can be obtained at the image decoding device which receives and decodes the encoded data (image decoding device 151 in FIG. 26), with little delay.

Figure 26:
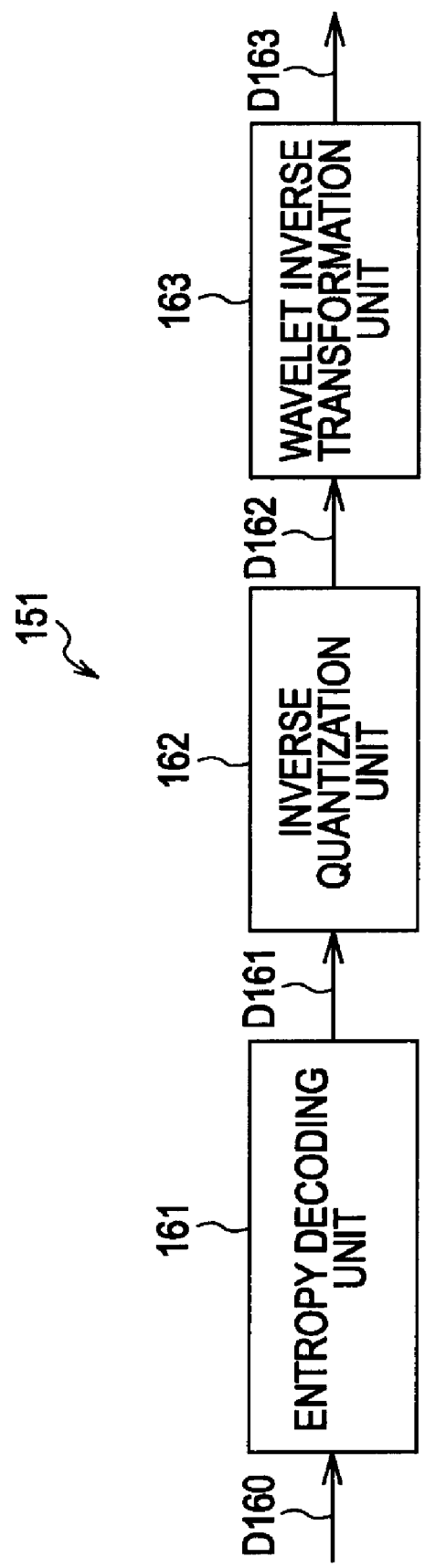
FIG. 26 is a diagram illustrating a configuration example of an embodiment of an image decoding device corresponding to the image encoding device shown in FIG. 24.

FIG. 26 is a diagram illustrating a configuration example according to an embodiment of an image decoding device shown in FIG. 24, corresponding to the image encoding device.

In the example shown in FIG. 26, the image decoding device 151 is configured of an entropy decoding unit 161, an inverse quantization unit 162, and a wavelet inverse transformation unit 163.

The entropy decoding unit 161 performs source decoding on the input encoded code stream D160, and generates quantized coefficient data D161. As for source decoding, Huffman coding, or even higher-efficiency arithmetic coding, or the like can be used corresponding to the source coding performed by the image encoding device 101. In the event that source coding has been performed at the image encoding device 101 independently for each P line, as described above with FIG. 24, the entropy decoding unit 161 also performs source decoding independently for each frequency band, and for each P line within each frequency band.

The inverse quantization unit 162 performs inverse quantization by multiplying the quantized coefficient data D161 by the quantization step size, thereby generating coefficient data D162. This quantization step size is normally described in the header of the encoded code stream or the like. Note that, in the event that the quantization step size is set at the image encoding device 101 for each line block as described above with reference to FIG. 24, the inverse quantization unit 162 correspondingly sets the inverse quantization step size for each line block, and performs inverse quantization.

The wavelet inverse transformation unit 163 is configured basically in the same way as the wavelet inverse transformation device 51 shown in FIG. 18. That is to say, the wavelet inverse transformation device 163 has independent buffers for each division level (level 3 buffer 61 through level 1 buffer 63) other than the lowest band level, wherein vertical synthesizing filtering and horizontal synthesizing filtering is performed on the coefficient data D162, and coefficient data obtained as a result of the horizontal analysis filtering is stored in the buffers corresponding to each level. Upon the coefficient data being accumulated to a predetermined number in the buffers corresponding to each level, the vertical synthesizing filtering and horizontal synthesizing filtering is immediately performed, which is repeated to level 1, thereby generating the baseband image. Further, the wavelet inverse transformation device 163 inserts vertical synchronizing signals in the baseband image so as to generate video signals D163, which are externally output.

Next, the image decoding processing of the image decoding device 151 shown in FIG. 26 will be described with reference to the flowchart shown in FIG. 27.

The entropy decoding unit 161 has input thereto an encoded code stream D160 that has been encoded by the image encoding processing described above with reference to FIG. 25, from an external source (e.g., from a digital decoding unit 313 shown in FIG. 28, which will be described later). In step S161, the entropy decoding unit 161 performs entropy decoding (source decoding) of the input encoded code stream D160, thereby generating quantized coefficient data D161.

At this time, source coding has been performed for each P line at the image encoding unit 101, so the entropy decoding unit 161 also performs source decoding independently for each frequency band, and for each P line within each subband.

The inverse quantization unit 162 performs inverse quantization by multiplying the quantized coefficient data D161 by the quantization step size, thereby generating coefficient data D162.

Now, the quantization step size is set at the image encoding device 101 for each line block, so the inverse quantization unit 162 correspondingly sets the inverse quantization step size for each line block, and performs inverse quantization.

In step S163, the wavelet inverse transformation device 163 performs wavelet inverse transformation processing on the coefficient data D162. Note that this wavelet inverse transformation processing is processing which is performed in increments of lines, with vertical synchronizing signals being inserted following the image being generated, but the processing is generally the same as the wavelet inverse transformation processing described above with reference to FIG. 19, so description thereof will be omitted.

With the wavelet inverse transformation processing in step S163, vertical synthesizing filtering and horizontal synthesizing filtering is performed on the coefficient data D162, and coefficient data obtained as a result of the horizontal synthesizing filtering is stored in the buffers corresponding to each level, wherein, upon the coefficient data stored in the buffers corresponding to each level being accumulated to a predetermined number, vertical synthesizing filtering and horizontal synthesizing filtering is immediately performed, which is repeated to level 1, thereby generating the baseband image. Further, vertical synchronizing signals are inserted in the generated baseband image so as to generate video signals D163, which are externally output (e.g., to a video camera unit 303 shown in FIG. 28, which will be described later).

That is to say, the image encoding device 101 performs wavelet transformation processing in increments of lines, so in the same way, the image decoding device 163 performs wavelet inverse transformation processing in increments of lines.

As described above, with the image decoding device 151, the input encoded code stream is subjected to source decoding for each P line, inverse quantization is performed in increments of line blocks, and wavelet inverse transformation is performed in increments of lines, thereby generating the baseband image. Vertical synchronizing signals are further inserted in the baseband image so as to generate video signals D163, which are externally output. That is to say, decoding processing, inverse quantization processing, and wavelet inverse transformation processing can be operated in parallel in predetermined increments of lines.

Accordingly, in the event that encoded data is transmitted, encoded data which is sequentially transmitted is decoded every P lines and generated in increments of lines, so a decoded image can be obtained with little delay.

As described above, the processing of each of the image encoding device 101 and image decoding device 151 described with reference to FIGS. 24 and 26 can be operated in parallel in increments of lines, whereby image compression encoding and decoding processing can be performed with less delay.

Next, examples of applying the image encoding device 101 and image decoding device 151 described with reference to FIGS. 24 and 26 to various systems will be described.

Figure 28:
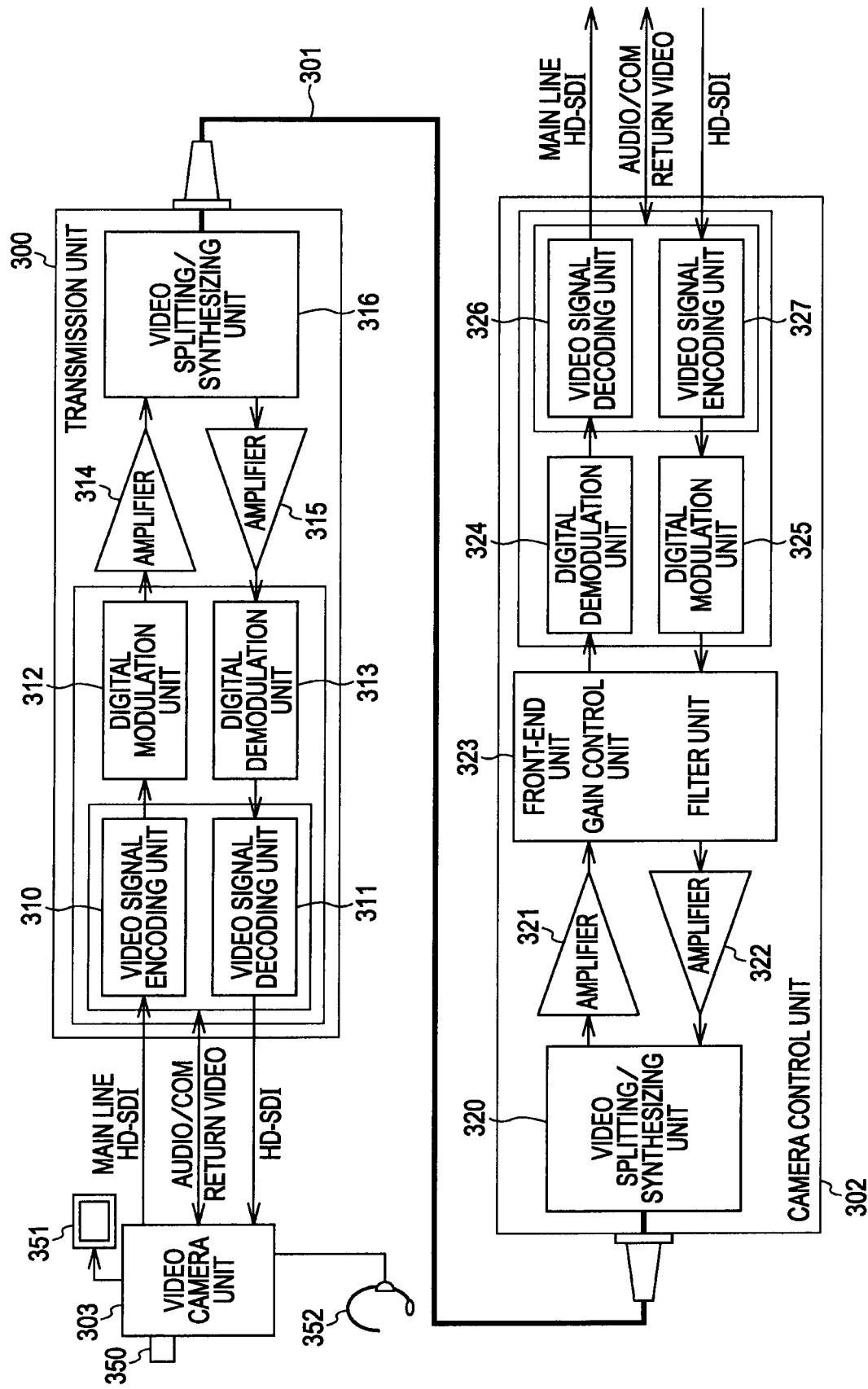
FIG. 28 is a block diagram illustrating the configuration of an example of a digital triax system to which an embodiment of the present invention has been applied.

FIG. 28 illustrates the configuration of an example of a digital triax system to which the image encoding including the wavelet transformation, and image decoding including the wavelet inverse transformation, according to an embodiment of the present invention, can be applied.

A triax system is a system used in television broadcasting stations, production studios, and so forth. With such a system, at the time of recording in the studio or broadcasting live from a remote location, a single triaxial cable connecting a video camera and a camera control unit or a switcher is used to transmit multiplex signals such as picture signals, audio signals, return picture signals, synchronizing signals, and so forth, and also to supply power.

Many known triax systems have been arranged to transmit the above-described signals in the form of analog signals. On the other hand, in recent years, entire systems are becoming digital, and accordingly, triax systems used in television broadcasting stations are also becoming digital.

With known digital triax systems, the digital video signals transmitted over the triax cable have been uncompressed video signals. The reason for this is that the specs demanded regarding signal delay time are particularly severe with television broadcasting stations; basically, the delay time from shooting to monitor output, for example, is required to be within one field (16.67 msec). Compression encoding systems such as MPEG2 and MPEG4 which have realized high compression rates and high image quality have not been used in triax systems since time equivalent to several frames worth is required for video signal compression and encoding, and decoding of compressed video signals, meaning that delay time is great.

Image encoding including the wavelet transformation, and image decoding including the wavelet inverse transformation, according to an embodiment of the present invention, is capable of parallel operations for the horizontal filtering and vertical filtering as described above with reference to FIGS. 2 and 19, and also is capable of parallel operations due to operations being performed in increments of lines, as described above with reference to FIGS. 25 and 27; accordingly, the delay time from image data input till obtaining of an output image can be reduced, such that application can be made to a digital triax system.

The digital triax system shown in FIG. 28 is configured with a transmission unit 300 and camera control unit 302 connected via a triax cable (triaxial cable) 301. Digital video signals and digital audio signals (hereafter referred to as "main line signals") from the transmission unit 300 to the camera control unit 302 which are actually broadcast, or used as contents, and intercom audio signals and return digital video signals from the camera control unit 302 to the transmission unit 300, are transmitted over the triax cable 301.

The transmission unit 300 is built into an unshown video camera device, for example. Of course, other arrangements may be made, such as the transmission unit 300 being connected to the video camera device as an external device of the video camera device. The camera control unit 302 may be a device commonly called a CCU (Camera Control Unit), for example.

Digital audio signals have little bearing on the essence of the present invention, so description thereof will be omitted for the sake of simplicity in description.

The video camera unit 303 is configured within an unshown video camera device for example, and performs photoreception with an unshown image-taking device such as a CCD (Charge Coupled Device), of light from a subject that has been taken in via an optical system 350 including a lens, focusing mechanism, zooming mechanism, iris adjusting mechanism, and so forth. The image-taking device converts the received light into electrical signals by photoelectric conversion, and further performs predetermined signals processing, so as to output as baseband digital video signals. These digital video signals are mapped to an HD-SDI (High Definition Serial Data Interface) format for example, and output.

Also connected to the video camera unit 303 are a display unit 351 used as a monitor, and an intercom 352 used for exchanging audio externally.

The transmission unit 300 has a video signal encoding unit 310 and video signal decoding unit 311, digital modulation unit 312 and digital demodulation unit 313, amplifiers 314 and 315, and a video splitting/synthesizing unit 316.

Baseband digital video signals mapped to the HD-SDI format for example, and supplied from the video camera unit 303 to the transmission unit 300. The digital video signals are compressed and encoded at the video signal encoding unit 310 so as to become a code stream, which is supplied to the digital modulation unit 312. The digital modulation unit 312 modulates the supplied code stream into a format suitable for transmission over the triax cable 301, and outputs. The signals output from the digital modulation unit 312 are supplied to the video splitting/synthesizing unit 316 via an amplifier 314. The video splitting/synthesizing unit 316 sends the supplied signals to the triax cable 301. These signals are received at the camera control unit 302 via the triax cable 302.

The signals output from the camera control unit 302 are received at the transmission unit 300 via the triax cable 301. The received signals are supplied to the video splitting/synthesizing unit 316, and the portion of digital video signals and the portion of other signals are separated. Of the received signals, the portion of the digital video signals is supplied via an amplifier 315 to the digital demodulation unit 313, the signals modulated into a format suitable of transmission over the triax cable 301 are demodulated at the camera control unit 302 side, and the code stream is restored.

The code stream is supplied to the video signal decoding unit 311, the compression coding is decoded, and the baseband digital video signals are obtained. The decoded digital video signals are mapped to the HD-SDI format and output, and supplied to the video camera unit 303 as return digital video signals. The return digital video signals are supplied to the display unit 351 connected to the video camera unit 303, and used for monitoring by the camera operator.

The cameral control unit 302 has a video splitting/synthesizing unit 320, amplifiers 321 and 322, a front-end unit 323, a digital demodulation unit 324 and digital modulation unit 325, and a video signal decoding unit 326 and video signal encoding unit 327.

Signals output from the transmission unit 300 are received at the camera control unit 302 via the triax cable 301. The received signals are supplied to the video splitting/synthesizing unit 320. The video splitting/synthesizing unit 320 supplies the signals supplied thereto to the digital demodulation unit 324 via the amplifier 321 and front end unit 323. Note that the front end unit 323 has a gain control unit for adjusting gain of input signals, a filter unit for performing predetermined filtering on input signals, and so forth.

The digital demodulation unit 324 demodulates the signals modulated into a format suitable of transmission over the triax cable 301 at the transmission unit 300 side, and restores the code stream. The code stream is supplied to the video signal decoding unit 326 where compression encoding is decoded, so as to obtain the baseband digital video signals. The decoded digital video signals are mapped to the HD-SDI format and output, and externally output as main line signals.

The return digital video signals and digital audio signals are supplied externally to the camera control unit 302. The digital audio signals are supplied to the intercom 352 of the camera operator for example, to be used for transmitting external audio instructions to the camera operator.

The return digital video signals are supplied to the video signal encoding unit 327 and compression encoded, and supplied to the digital modulation unit 325. The digital modulation unit 325 modulates the supplied code stream into a format suitable for transmission over the triax cable 301, and outputs. The signals output from the digital modulation unit 325 are supplied to the video splitting/synthesizing unit 320 via the front end unit 323 and amplifier 322. The video splitting/synthesizing unit 320 multiplexes these signals with other signals, and sends out to the triax cable 301. The signals are received at the transmission unit 300 via the triax cable 301.

In the example shown in FIG. 28, the image encoding device 101 in FIG. 24 and the image decoding device 151 shown in FIG. 26 are respectively applied to the video signal encoding units 310 and 327, and the video signal decoding units 311 and 326. That is to say, the video signal encoding units 310 and 327 are basically configured the same as with the image encoding device 101 in FIG. 24, and video signal decoding units 311 and 326 are basically configured the same as with the image decoding device 151 in FIG. 26.

That is to say, at the transmission unit 300 side, the video signal encoding unit 310 performs the wavelet transformation and entropy encoding described above with reference to FIG. 25, on the digital video signals supplied thereto, and outputs a code stream. As described above with reference to FIGS. 13 through 16, upon a number of lines corresponding to the number of taps of the filter used for wavelet transformation and according to the number of division levels of wavelet transformation being input, the video signal encoding unit 310 starts wavelet transformation. Further, as described above with reference to FIGS. 25 and 27, upon coefficient data necessary for the components being accumulated at the image encoding device and image decoding device, processing is sequentially performed by the components. Upon processing ending to the bottom line of one frame or one field, processing of the next one frame or one field is started.

Figure 27:
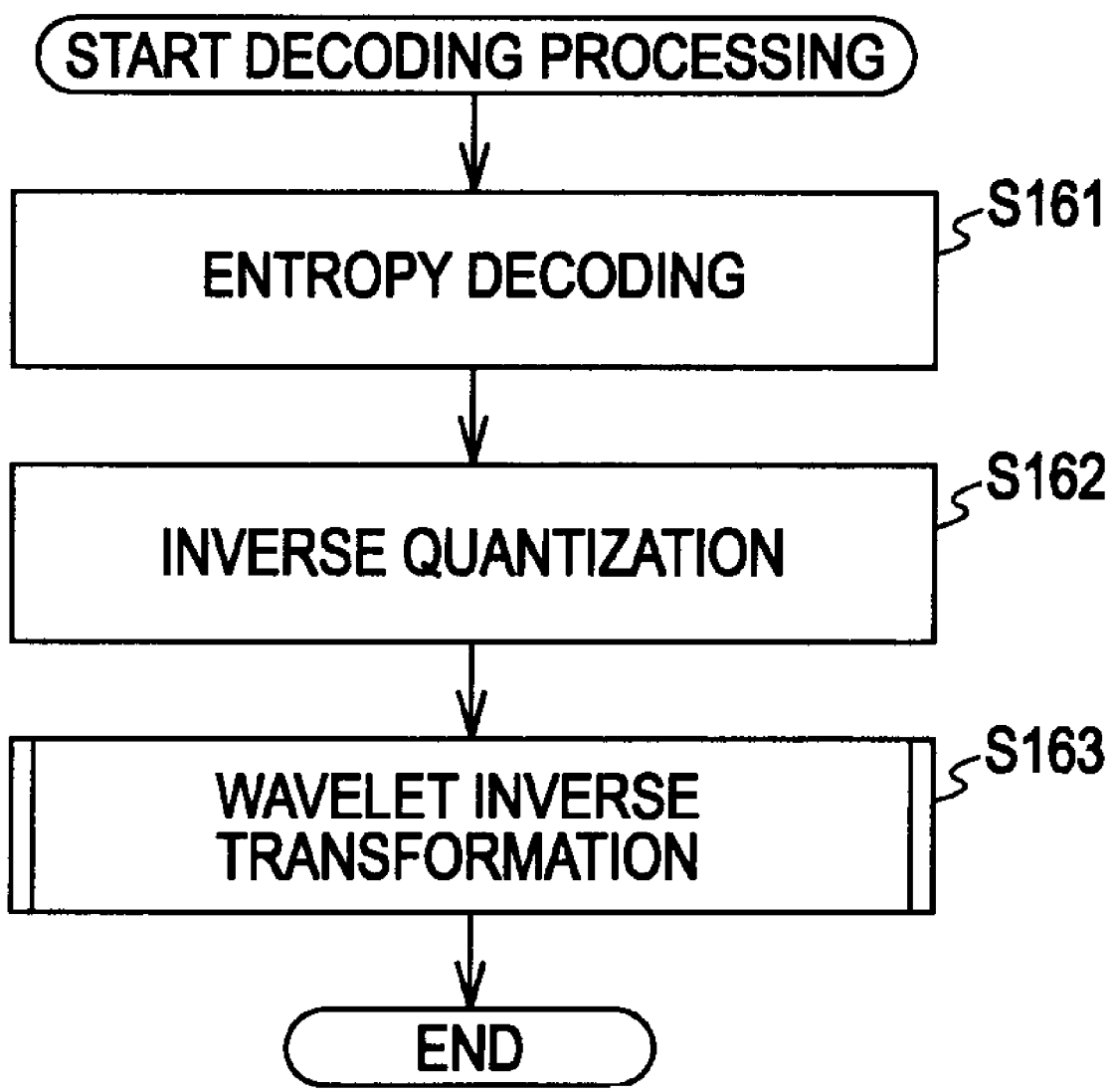
FIG. 27 is a flowchart for describing image decoding processing with the image decoding device shown in FIG. 26.

As described above, with the image encoding device 101 and image decoding device 151 shown in FIGS. 24 and 26, the components thereof perform processing in parallel, so the image encoding device 101 and image decoding device 151 can suppress delay of output of pictures taken by the video camera unit 303 from the camera control unit 302, and delay of return digital video signals supplied externally and transmitted from the cameral control unit 302 to the video camera unit 303, and accordingly are advantageously used in the digital triax system shown in FIG. 27.

This also holds true for transmitting return digital video signals from the camera control unit 302 side to the transmission unit 300 side. That is to say, the above-described wavelet transformation and entropy encoding in FIG. 25 is performed on the externally supplied return digital video signals by the video signal encoding unit 327, and a code stream is output.

Now, there are many cases wherein it is permissible for the return digital video signals to be of a lower image quality than the digital video signals of the main line signals. In this case, the bit rate at the time of encoding at the video signal encoding unit 327 can be lowered.

For example, the video signal encoding unit 327 performs control with the rate control unit 114 such that the bit rate of entropy encoding processing at the entropy encoding unit 113 is lower. Also, an arrangement can be conceived, wherein, for example, at the camera control unit 302 side, transformation processing is performed to a higher division level with the wavelet transformation unit 111 at the video signal encoding unit 327, and at the transmission unit 300 side, the wavelet inverse transformation at the wavelet inverse transformation unit 163 of the video signals encoding unit 311 is stopped at a lower division level. Processing at the video signal encoding unit 327 of the camera control unit 302 is not restricted to this example; and various other types of processing can be conceived, such as keeping the division level for wavelet transformation low so as to alleviate the load of transformation processing.

Figure 29:
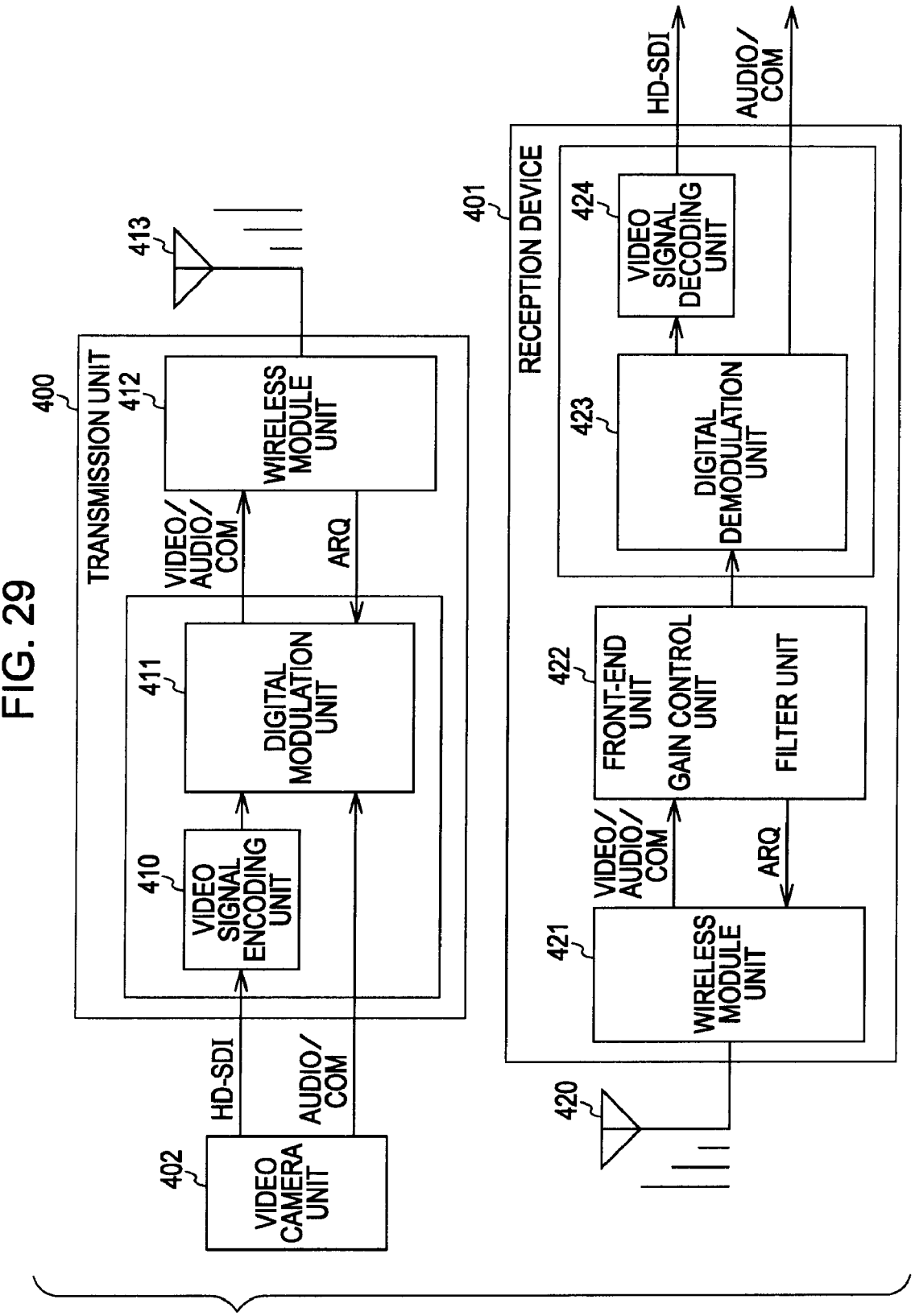
FIG. 29 is a block diagram illustrating the configuration of an example of a wireless transmission system to which an embodiment of the present invention has been applied.

FIG. 29 illustrates the configuration of an example of a wireless transmission system to which the image encoding including the wavelet transformation, and image decoding including the wavelet inverse transformation, according to an embodiment of the present invention, can be applied. That is to say, with the example shown in FIG. 29, transmission of coded data encoded at the image encoding device including the wavelet transformation according to an embodiment of the present invention, to an image decoding device side, is performed wirelessly.

Note that in the example in FIG. 29, video signals are transmitted unidirectionally from the video camera or transmission unit 400 side (hereafter abbreviated as "transmission unit 400") to the reception device 401 side. Bidirectional communication between the transmission unit 400 and reception unit 401 can be performed for audio signals and other signals.

The transmission unit 400 is built into an unshown video camera device having a video camera unit 402, for example. Of course, other arrangements may be made, such as the transmission unit 400 being connected to the video camera device as an external device of the video camera device having the video camera unit 402.

The video camera unit 402 has a predetermined optical system, an image-taking device such as a CCD, and a signal processing unit for outputting signals output from the image-taking device as digital video signals, for example. These digital video signals are mapped to an HD-SDI format for example, and output from the video camera unit 402, for example. Of course, the digital video signals output from the video camera unit 402 are not restricted to this example, and may be of other formats as well.

The transmission unit 400 has a video signal encoding unit 410, digital modulation unit 411, and a wireless module unit 412. The video signal encoding unit 410 is configured basically in the same way as the image encoding device 101 shown in FIG. 24.

At the transmission unit 400, the baseband digital video signals mapped to the HD-SDI format for example, and output. The digital video signals are subjected to wavelet transformation and compression encoding by entropy encoding described above with reference to FIG. 25 at the video signal encoding unit 410, so as to become a code stream which is supplied to the digital modulation unit 411. The digital modulation unit 411 performs digital modulation of the supplied code stream into signals of a format suitable for wireless communication, and outputs.

Also, digital audio signals and other signals, such as predetermined commands and data for example, are also supplied to the digital modulation unit 411. For example, the video camera unit 402 has a microphone whereby collected sound is converted into audio signals, and further the audio signals are subjected to A/D conversion and output as digital audio signals. Further, the video cameral unit 402 is capable of outputting certain commands and data. The commands and data may be generated within the video camera unit 402, or an operation unit may be provided to the video camera unit 402 with the commands and data being generated in response to user operations made at the operating unit. Also, an arrangement may be made wherein an input device, for inputting commands and data, is connected to the video camera unit 402.

The digital modulation unit 411 performs digital modulation of these digital audio signals and other signals, and outputs. The digital modulated signals output from the digital modulation unit 411 are supplied to the wireless module unit 412 and wirelessly transmitted from an antenna 413 as airwaves.

Upon receiving an ARQ (Auto Repeat Request) from the reception unit 401 side, the wireless module unit 412 makes notification of this ARQ to the digital modulation unit 411, so as to request a data resend.

The airwaves transmitted from the antenna 413 are received at an antenna 420 of the reception device 401 side, and supplied to a wireless module unit 421. The reception device 401 has the wireless module unit 421 front end unit 422, digital demodulation unit 423, and video signal decoding unit 424. The video signal decoding unit 424 is basically configured the same way as with the image decoding unit 151 shown in FIG. 26.

The wireless module unit 421 supplies digital modulated signals based on the received airwaves to the front end unit 422. The front end unit 422 performs predetermined signal processing such as gain control to the supplied digital modulated signals, for example, and supplies to the digital demodulation unit 423. The digital demodulation unit 423 demodulates the supplied digital modulated signals, and restores the code stream.

The code stream restored at the digital demodulation unit 423 is supplied to the video signal decoding unit 424, the compressed encoding is decoded with the decoding method described above with reference to FIG. 27, and the baseband digital video signals are obtained. The decoded digital video signals are mapped to the HD-SDI format for example, and output.

The digital demodulation unit 423 is also supplied with the digital audio signals and other signals subjected to digital modulation at the transmission unit 400 side and transmitted. The digital demodulation unit 423 demodulates the signals wherein these digital audio signals and other signals have been subjected to digital modulation, and restores and outputs the digital audio signals and other signals.

Also, the front end unit 422 performs error detection according to a predetermined method regarding the received signals supplied from the wireless module unit 421, and in the event that an error is detected such as an erroneous frame having been received for example, outputs an ARQ. The ARQ is supplied to the wireless module unit 421, and transmitted form the antenna 420.

With such a configuration, the transmission unit 400 is built into a relatively small-sized video camera device having a video camera unit 402 for example, a monitor device is connected to the reception device 401, and the digital video signals output from the video signal decoding unit 424 are supplied to the monitor device. As long as the reception device 401 is within the airwave range of the airwaves transmitted from the video camera device having the built-in transmission unit 400, the pictures taken with the video camera device can be watched on the monitor device with little delay, e.g., with a delay within one field or one frame.

Note that in the example shown in FIG. 29, communication between the transmission unit 400 and the reception device 401 is performed using wireless communication, so as to transmit video signals via wireless communication, but this arrangement is not restricted to this example. For example, the transmission unit 400 and the reception device 401 may be connected via a network such as the Internet. In this case, the wireless module unit 412 at the transmission unit 400 side and the wireless module unit 421 at the reception device side 401 side are each communication interfaces capable of communication using IP (Internet Protocol).

Various applications can be conceived for the wireless transmission system shown in FIG. 29. For example, this wireless transmission system can be applied to a videoconferencing system. An example of an arrangement would be to connect a simple video camera device capable of USB (Universal Serial Bus) connection to a computer device such as a personal computer, with the computer device side implementing the video signal encoding unit 410 and video signal decoding unit 424. The video signal encoding unit 410 and video signal decoding unit 424 implemented at the computer device may be a hardware configuration, or may be realized by software running on the computer device.

For example, each of the members participating in the videoconference would be provided with a computer device and a video camera device to be connected to the computer device, with the computer device being connected to a server device for providing the videoconference system service, by either cable or wireless network. Video signals output from the video camera device are supplied to the computer device via USB cable, and the encoding processing described above with reference to FIG. 25 is performed at the video signal encoding unit 410 within the computer device. The computer device transmits the code steam wherein the videos signals have been encoded, to the server device or the like, via the network.

The server device transmits the received code stream to the computer device of each of the participating members, via the network. This code stream is received at the computer device of each of the participating members, and is subjected to the decoding processing at the video signal decoding unit 424 within the computer device described above with reference to FIG. 27. The image data output from the video signal decoding unit 424 is displayed on the display unit of the computer device as a picture.

That is to say, video pictures taken by the video camera devices of the other participating members are displayed on the display units of the computer devices of each of the participating members. Accordingly, applying an embodiment of the present invention to the wireless transmission system means that the delay time from encoding video signals taken with a video camera device to decoding thereof at the computer device of other participating members is short, so the unnatural sensation of the pictures of other participating members being displayed on the display units of the computer devices of the participating members being delayed, can be reduced.

Further, an arrangement can be conceived wherein the video signal encoding unit 410 is installed at the video camera device side. For example, the transmission unit 400 is built into a video camera device. Such a configuration does away with the need for the video camera device to be connected to another device such as a computer device or the like.

Such a system mode up of the video camera device with the transmission unit 400 built in, and the reception device 401, can be applied to various applications other than the above-described videoconferencing system. For example, as schematically shown in FIG. 30, this system can be applied to a home gaming console. In FIG. 30, the transmission unit 400 shown in FIG. 29 is built into a video camera device 500.

In the main unit 501 of the home gaming console, a bus for example connects a CPU, RAM, ROM, a disk drive device compatible with CD-ROMs (Compact Disc Read Only Memory) and DVD-ROMs (Digital Versatile Disc-ROM), a graphics control unit for converting display control signals generated by the CPU into vide signals and outputting, an audio playback unit for playing audio signals, and so forth, i.e., having a configuration generally like that of a computer device.

The main unit 501 of the home gaming console is controlled overall by the CPU, following programs stored in the ROM beforehand, or programs recorded in a CD-ROM or DVD-ROM mounted to the disk drive device. The RAM is used as work memory for the CPU. The main unit 501 of the home gaming console has built in the reception device 401. digital video signals output from the reception device 401, and other signals, are supplied to the CPU via the bus, for example.

Let us say that with such a system, e.g., the main unit 501 of the home gaming console, software is running which can take images in the form of digital video signals supplied externally, as images within the game. For example, this game software is capable of using images in the form of digital video signals supplied externally as images within the game, and also recognize the movements of persons (players) within the image, and perform operations corresponding to the recognized motions.

The video camera device 500 encodes the shot digital video signals with the encoding method described above with reference to FIG. 25 at the video signal encoding unit 410 within the built-in transmission unit 400, modulates the code stream and the digital modulation unit 411 and supplies to the wireless module unit 412, so s to be transmitted from the antenna 413. The transmitted airwaves are received at the antenna 420 of the reception device 401 built into the main unit 501 of the home gaming console, the received signals being supplied to the digital demodulation unit 423 via the wireless module unit 421 and the front end unit 422.

The received signals are demodulated at the digital demodulation unit 423 into a code stream, and supplied to the video signal decoding unit 424. The video signal decoding unit 424 decodes the supplied code stream with the decoding method described above with reference to FIG. 27, and outputs the baseband digital video signals.

The baseband digital video signals output from the video signals decoding unit 424 are sent over the bus in the main unit 501 of the home gaming console, and temporarily stored in the RAM, for example. Upon the digital video signals stored in the RAM being read out following a predetermined program, the CPU can detect movement of persons within the image provided by the digital video signals, and use the image within the game.

Due to the delay time, from the images being shot with the video camera device 500 and the obtained digital video signals being encoded to the code stream being decoded at the main unit 501 of the home gaming console and the images being obtained thereat, being short, responsivity of the game software running on the main unit 501 of the home gaming console as to the movement of the player improves, thereby improving operability of the game.

Note that such a video camera device 500 used with a home gaming console often has a simple configuration due to restrictions on price, size, and so forth, and assumptions must be made that a CPU with high processing capabilities and large-capacity memory may be unaffordable. Accordingly, using the encoding processing including the wavelet transformation processing according to an embodiment of the present invention allows for operation with a small memory capacity, since there is no need for large-capacity external memory. Also, an arrangement may be conceived wherein wavelet transformation is performed at a low division level at the video signal encoding unit 410 of the transmission unit 400 built into the video camera device 500. This further reduces the need for memory capacity.

Note that the video camera device 500 and the main unit 501 of the home gaming console have been described above as being connected by wireless communication, but this arrangement is not restricted to this example. That is to say, the video camera device 500 and the main unit 501 of the home gaming console may be connected by cable, via interfaces such as USB, IEEE 1394, or the like.

The present invention has been described above by way of embodiments, whereby it is apparent that a wide range of applications thereof can be made as long as belonging to a device or method for performing wavelet transformation of images or video signals, and a device or method for performing wavelet inverse transformation for synthesizing filtering of band-analyzed information so as to restore image or video signals.

That is to say, embodiments of the present invention are advantageously applied to devices or systems, wherein image signals or images of video signals are compressed, transmitted received, decompressed, and output, as described above with reference to FIGS. 28 through 30, by providing an encoding arrangement is provided downstream of the wavelet transformation, as with the image encoding device 101 shown in FIG. 24. Embodiments of the present invention are particularly advantageous with devices or systems wherein short delay from compression encoding to decoding and output of images is demanded.

Another application is remote medical diagnosis and treatment using remotely operable instruments or devices, while viewing images taken with a video camera, for example.

Another application is compression encoding and transmission of digital video signals, and decoding of digital video signals subjected to compression encoding, in systems such as used in broadcasting stations and the like.

Another application is to systems for distributing video of live coverage.

Another application is to remote educational systems, wherein students and teachers can communicate interactively.

Further applications include, but are not restricted to, systems for transmitting image data taken with mobile terminals having image-taking functions, such as cellular phones with camera functions; videoconferencing systems; surveillance systems for recording images taken with a monitoring camera with a recorder; wireless image transmission systems; interactive gaming applications; and so forth.

The series of processing in these various applications can be realized by hardware or by software, as with the case illustrated in FIG. 30.

In the case of realizing the series of processing by software, a program making up the software is installed in a computer which has dedicated hardware built in, or installed in a general-purpose computer for example, capable of executing various functions by various types of programs being installed therein, from a program recording medium.

FIG. 31 is a block diagram illustrating an example of the configuration of a personal computer 701 for executing the above-described series of processing with a software program. A CPU 711 executes various types of programs according to programs stored in ROM 712 or a storage unit 718. RAM 713 stores programs and data used by the CPU 711 as necessary. The CPU 711, ROM 712, and RAM 713 are mutually connected by a bus 714.

An input/output interface 715 is also connected to the CPU 711 via the bus 714. Connected to the input/output interface 715 are an input unit 716 including a keyboard mouse, microphone, and so forth, and an output unit 717 including a display, speaker, and so forth. The CPU 711 executes various types of processing in response to commands input form the input unit 716. The CPU 711 outputs the results of processing to the output unit 717.

The storage unit 718 connected to the input/output interface 715 is configured of a hard disk for example, and stores various types of programs and data which the CPU 711 executes or uses. A communication unit 719 communicates with external devices via a network such as the Internet, a Local Area Network, or the like.

Programs may also be obtained via the communication unit 719 and stored in the storage unit 718.

A drive 720 connected to the input/output interface 715 drives a removable media 721 mounted thereto, such as a magnetic disk optical disk magneto-optical disk, semiconductor memory, or the like, so as to obtain programs or data recorded therein. The programs and data obtained are transferred to the storage unit 718 as necessary and stored.

A program recording medium for storing programs which are installed in the computer in a computer-executable form includes the removable media 721 shown in FIG. 31 which is packaged media including magnetic disks (including flexible disks), optical disks (including CD-ROM and DVD), magneto-optical disks, semiconductor memory, etc., the ROM 712 where programs or temporarily or permanently stored, a hard disk making up the storage unit 718, and so forth. Storing of programs to the program recording medium can also be performed using wire or wireless communication media such as a Local Area Network, the Internet, digital satellite broadcast, etc., via the communication unit 719 serving as an interface with a router, modem, etc., as necessary.

While the steps describing the program stored in the program recording medium in the present Specification may of course be performed in the time-sequence described of course, but is not restricted to this time-sequence, and may be executed in parallel, or individually.

Further, the term "system" as used in the present Specification refers to the entirety of equipment configured of multiple devices.

It should be understood by those skilled in the art that various modifications, combinations, sub-combinations and alterations may occur depending on design requirements and other factors insofar as they are within the scope of the appended claims or the equivalents thereof.

What is claimed is:

1. A wavelet transformation device for performing wavelet transformation at a plurality of division levels as to image signals, the wavelet transformation device comprising:
    horizontal filtering means for subjecting the image signals to horizontal direction lowband analysis filtering and highband analysis filtering;
    buffering means comprising a plurality of buffers which are independent for each of the division levels, for holding frequency components, which are generated as the results of the horizontal direction analysis filtering by the horizontal filtering means, for each of the division levels; and
    interleaving means comprising at least one interleaving unit for interleaving brightness components and color difference components of the image signals and for interleaving highband components and lowband components of buffered filter results.

2. The wavelet transformation device according to claim 1, wherein the lowband components and highband components in the frequency components obtained as the results of the horizontal direction analysis filtering are reordered and held in the buffer.

3. The wavelet transformation device according to claim 1, further comprising:
    reordering means for performing reordering of brightness signals and color difference signals, which are elements of the image signals,
    wherein the horizontal filtering means subject the image signals reordered by the reordering means to horizontal direction lowband analysis filtering and highband analysis filtering.

4. The wavelet transformation device according to claim 3, wherein
    the frequency components of the brightness signals and
    the frequency components of the color difference signals
    generated as a result of the horizontal analysis filtering performed by the horizontal filtering means are each held separately in the buffers.

5. The wavelet transformation device according to claim 1, further comprising:
    vertical filtering means for subjecting the frequency components, generated as a result of the horizontal direction analysis filtering, that are held in the buffers, to vertical direction lowband analysis filtering and highband analysis filtering.

6. The wavelet transformation device according to claim 5, the vertical filtering means further comprising:
    brightness signal vertical filtering means for subjecting frequency components of brightness signals, which are elements of the image signals, to vertical direction lowband analysis filtering and highband analysis filtering; and
    color difference signal vertical filtering means for subjecting frequency components of color difference signals, which are elements of the image signals, to vertical direction lowband analysis filtering and highband analysis filtering.

7. The wavelet transformation device according to claim 6, wherein the brightness signal vertical filtering means and the color difference signal vertical filtering means are operated in parallel.

8. The wavelet transformation device according to claim 7, further comprising:
    reordering means for performing reordering of the lowband components of
    the frequency components of the brightness signals generated as a result of the vertical direction analysis filtering performed by the brightness signal vertical filtering means, and
    the frequency components of the color difference signals generated as a result of the vertical direction analysis filtering performed by the color difference signal vertical filtering means;

wherein the horizontal filtering means subject the lowband components reordered by the reordering means to horizontal direction lowband analysis filtering and highband analysis filtering.

9. The wavelet transformation device according to claim 8, wherein prior to reordering by the reordering means, one of the brightness signal vertical filtering means and the color difference signal vertical filtering means stands by until the analysis filtering of the other ends.

10. The wavelet transformation device according to 8, wherein the horizontal filtering means perform the horizontal direction lowband analysis filtering and highband analysis filtering to a predetermined number of levels.

11. The wavelet transformation device according to claim 8, wherein the frequency components of the brightness signals and the frequency components of the color difference signals generated as a result of the horizontal direction analysis filtering performed by the horizontal filtering means are separately held in the buffers.

12. The wavelet transformation device according to claim 5, wherein the horizontal filtering means and the vertical filtering means perform analysis filtering on the lowest band frequency components in a hierarchical manner.

13. The wavelet transformation device according to claim 5, wherein the horizontal filtering means and the vertical filtering means are realized by a lifting scheme of the wavelet transformation.

14. The wavelet transformation device according to claim 5,
wherein the horizontal filtering means input the image signals in increments of lines, and perform the horizontal direction lowband analysis filtering and highband analysis filtering each time the number of samples in the horizontal direction reaches a predetermined number, and
wherein the vertical filtering means perform the vertical direction lowband analysis filtering and highband analysis filtering each time the number of lines in the vertical direction of the frequency component in the results of the horizontal direction analysis filtering performed by the horizontal filtering means reach a predetermined number.

15. The wavelet transformation device according to claim 5,
wherein the image signals are video signals comprising a plurality of pictures,
wherein the wavelet transformation device further comprises detecting means for detecting the end of each picture by detecting vertical synchronization signals of the video signals, and
wherein the horizontal filtering means and the vertical filtering means perform analysis filtering for each picture.

16. A wavelet transformation method of a wavelet transformation device for performing wavelet transformation at a plurality of division levels as to image signals, the method comprising:
subjecting the image signals to horizontal direction lowband analysis filtering and highband analysis filtering;
holding frequency components, which are generated as the results of the horizontal direction analysis filtering, for each of the division levels, in a plurality of buffers which are independent for each of the division levels;
interleaving brightness components and color difference components of the image signals; and
interleaving highband components and lowband components of buffered filter results.

17. A wavelet transformation device for performing wavelet transformation at a plurality of division levels as to image signals, the wavelet transformation device comprising:
a horizontal filtering unit for subjecting the image signals to horizontal direction lowband analysis filtering and highband analysis filtering;
a plurality of buffers which are independent for each of the division levels, for holding frequency components, which are generated as the results of the horizontal direction analysis filtering by the horizontal analysis filtering unit, for each of the division levels; and
at least one interleaving unit for interleaving brightness components and color difference components of the image signals and for interleaving highband components and lowband components of buffered filter results.

18. A wavelet inverse transformation device for performing wavelet inverse transformation as to frequency components, generated by a plurality of division levels of wavelet transformations having been performed as to image signals, thereby reconstructing an image, the wavelet inverse transformation device comprising:
horizontal filtering means for subjecting the frequency components to horizontal direction lowband synthesizing filtering and highband synthesizing filtering;
buffering means comprising a plurality of buffers which are independent for each of the division levels except for the lowest band, for holding frequency components, which are generated as the results of the horizontal direction synthesizing filtering by the horizontal filtering means, for each of the division levels; and
interleaving means comprising at least one interleaving unit for interleaving brightness components and color difference components of the image signals and for interleaving highband components and lowband components of buffered filter results.

19. The wavelet inverse transformation device according to claim 18, further comprising:
vertical filtering means for subjecting the frequency components to vertical direction lowband analysis filtering and highband analysis filtering,
wherein the horizontal filtering means subject the frequency components generated as a result of the vertical direction synthesizing filtering to the horizontal direction lowband synthesizing filtering and highband synthesizing filtering.

20. The wavelet inverse transformation device according to claim 19, wherein the vertical filtering means and the horizontal filtering means are realized by a lifting scheme of the wavelet inverse transformation.

21. The wavelet inverse transformation device according to claim 19,
wherein the horizontal filtering means input the frequency components in increments of lines, and perform the horizontal direction lowband synthesizing filtering and highband synthesizing filtering each time the number of samples in the horizontal direction reaches a predetermined number, and
wherein the vertical filtering means perform the vertical direction lowband synthesizing filtering and highband synthesizing filtering each time the number of lines in the vertical direction of the frequency component in the results of the horizontal direction synthesizing filtering performed by the horizontal filtering means reach a predetermined number.

22. The wavelet inverse transformation device according to claim 19,
wherein the image signals are video signals comprising a plurality of pictures, divided into a plurality of frequency components by performing analysis filtering on the lowest band frequency components in a hierarchical manner, and
wherein the vertical filtering means and the horizontal filtering means perform synthesizing filtering in a hierarchical manner from, of a plurality of frequency components, a predetermined number of frequency components including the lowest band frequency components, ultimately generating a picture.

23. The wavelet inverse transformation device according to claim 22, further comprising:
vertical synchronizing signal insertion means for inserting vertical synchronizing signals between the pictures generated by the vertical filtering means and the horizontal filtering means, thereby generating video signals.

24. The wavelet inverse transformation device according to claim 19,
wherein the vertical filtering means, the horizontal filtering means, and the buffers, are provided separately for brightness signals and for color difference signals, which are elements of the image signals, and
wherein
the vertical filtering means,
the horizontal filtering means, and
the buffers,
for brightness signals, and
the vertical filtering means,
the horizontal filtering means, and
the buffers,
for color difference signals,
are operated in parallel.

25. A wavelet inverse transformation method for performing wavelet inverse transformation as to frequency components generated by a plurality of division levels of wavelet transformations being performed as to image signals, thereby reconstructing an image, the method comprising:
subjecting the frequency components to horizontal direction lowband synthesizing filtering and highband synthesizing filtering;
holding frequency components, which are generated as the results of the horizontal direction synthesizing filtering by the horizontal filtering means, for each of the division levels, in a plurality of buffers which are independent for each of the division levels except for the lowest band;
interleaving brightness components and color difference components of the image signals; and
interleaving highband components and lowband components of buffered filter results.

26. A wavelet inverse transformation device for performing wavelet inverse transformation as to frequency components, generated by a plurality of division levels of wavelet transformations having been performed as to image signals, thereby reconstructing an image, the wavelet inverse transformation device comprising:
a horizontal filtering unit for subjecting the frequency components to horizontal direction lowband synthesizing filtering and highband synthesizing filtering;
a plurality of buffers which are independent for each of the division levels except for the lowest band, for holding frequency components, which are generated as the results of the horizontal direction synthesizing filtering by the horizontal filtering unit, for each of the division levels; and
at least one interleaving unit for interleaving brightness components and color difference components of the image signals and for interleaving highband components and lowband components of buffered filter results.

* * * * *